United States Patent [19]

Hirakawa et al.

[11] Patent Number: 5,664,126
[45] Date of Patent: Sep. 2, 1997

[54] HUMAN INTERFACE SYSTEM FOR COMMUNICATING NETWORKED USERS

[75] Inventors: Hideki Hirakawa, Yokohama; Etsuo Ito, Kumagaya; Toshio Okamoto, Tokyo; Kazuo Sumita, Yokohama; Shuichi Tsujimoto, Yokohama, all of Japan

[73] Assignee: Kabushiki Kaisha Toshiba, Kawasaki, Japan

[21] Appl. No.: 713,959

[22] Filed: Sep. 12, 1996

Related U.S. Application Data

[63] Continuation of Ser. No. 95,981, Jul. 23, 1993, abandoned.

[30] Foreign Application Priority Data

| Jul. 24, 1992 | [JP] | Japan | 4-197943 |
| Jul. 24, 1992 | [JP] | Japan | 4-198329 |
| Jul. 24, 1992 | [JP] | Japan | 4-198330 |
| Aug. 31, 1992 | [JP] | Japan | 4-253439 |
| Sep. 11, 1992 | [JP] | Japan | 4-243694 |

[51] Int. Cl.$^6$ ............................ G06F 15/163; G06F 3/00
[52] U.S. Cl. ............... 345/329; 395/200.34; 395/610; 395/329; 395/331; 395/349; 345/331; 345/349
[58] Field of Search ........................ 395/331, 330, 395/329, 332, 357, 356, 349, 351, 335, 968, 200.04, 200.03, 200.06, 200.09, 610, 609, 614, 615

[56] References Cited

U.S. PATENT DOCUMENTS

| 4,819,191 | 4/1989 | Scully et al. | 395/329 |
| 4,974,173 | 11/1990 | Stefik et al. | 395/331 |
| 5,008,853 | 4/1991 | Bly et al. | 395/331 |
| 5,247,615 | 9/1993 | Mori et al. | 395/200.04 |
| 5,257,306 | 10/1993 | Watanabe | 395/330 X |
| 5,363,507 | 11/1994 | Nakayama et al. | 395/330 X |
| 5,367,635 | 11/1994 | Bauer et al. | 395/200.09 X |
| 5,392,400 | 2/1995 | Berkowitz et al. | 395/332 X |
| 5,465,370 | 11/1995 | Ito et al. | 395/200.04 |
| 5,488,686 | 1/1996 | Murphy et al. | 395/330 |

*Primary Examiner*—Raymond J. Bayerl
*Attorney, Agent, or Firm*—Oblon, Spivak, McClelland, Maier & Neustadt, P.C.

[57] ABSTRACT

A human interface system constructed by connecting systems containing a plurality of computers via a network includes site building means for building a plurality of sites that either retain or manage a plurality pieces of data and a plurality of programs, and access managing means for managing users' access to each site. The access managing means has a communication channel between the users established by accessing the sites via the data and programs.

14 Claims, 68 Drawing Sheets

FIG. 6
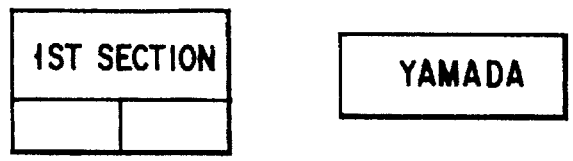
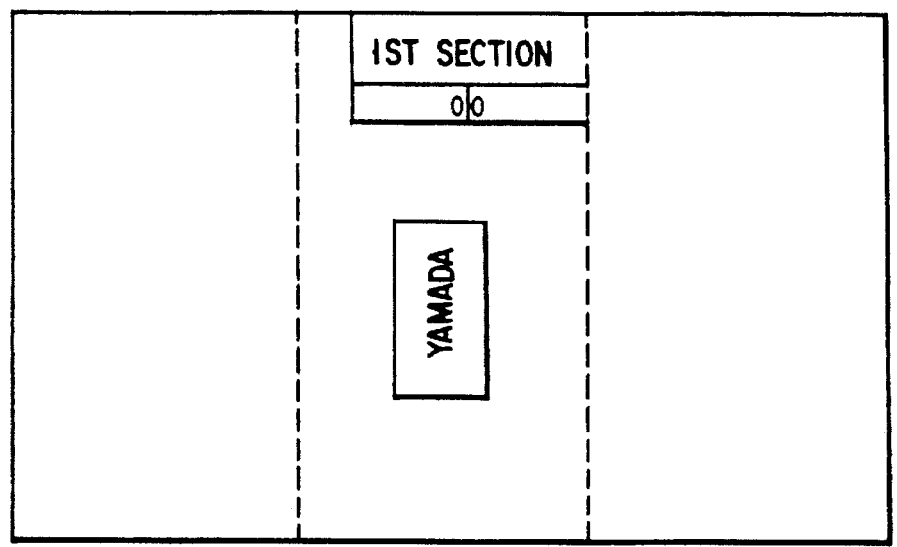
FIG. 7
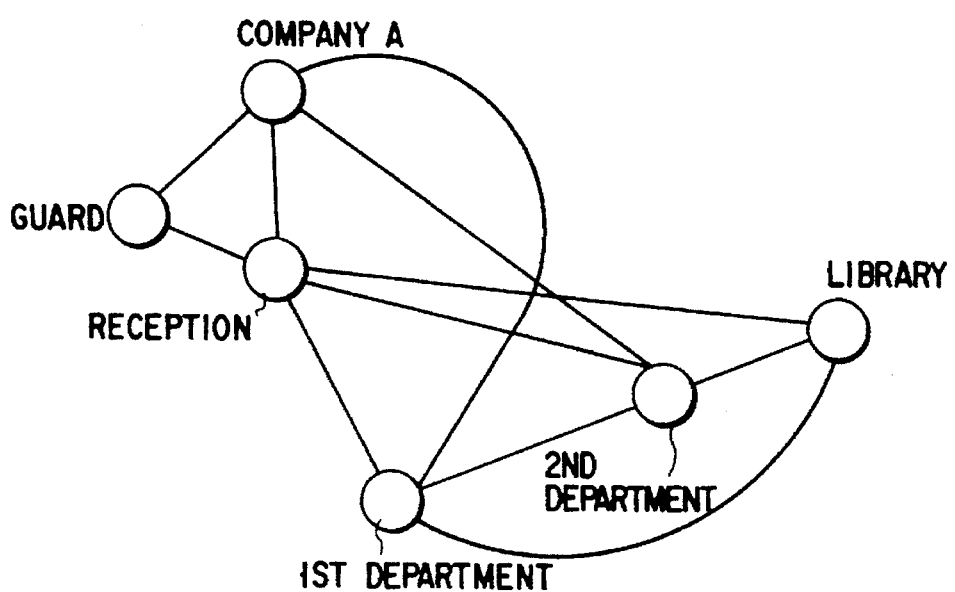
FIG. 8

AREA SITE SCREEN

ACCESS SCREEN

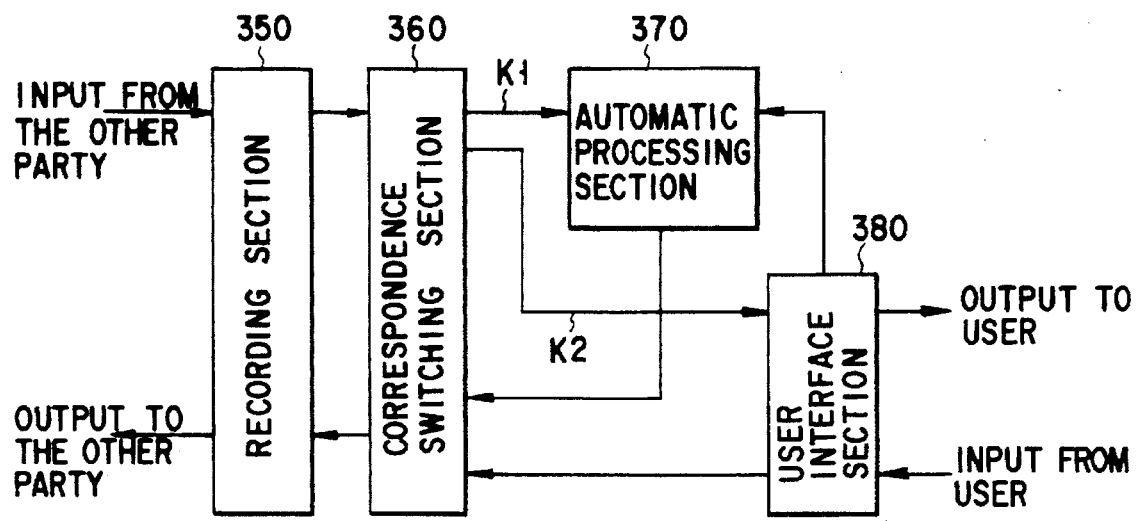
F I G. 19
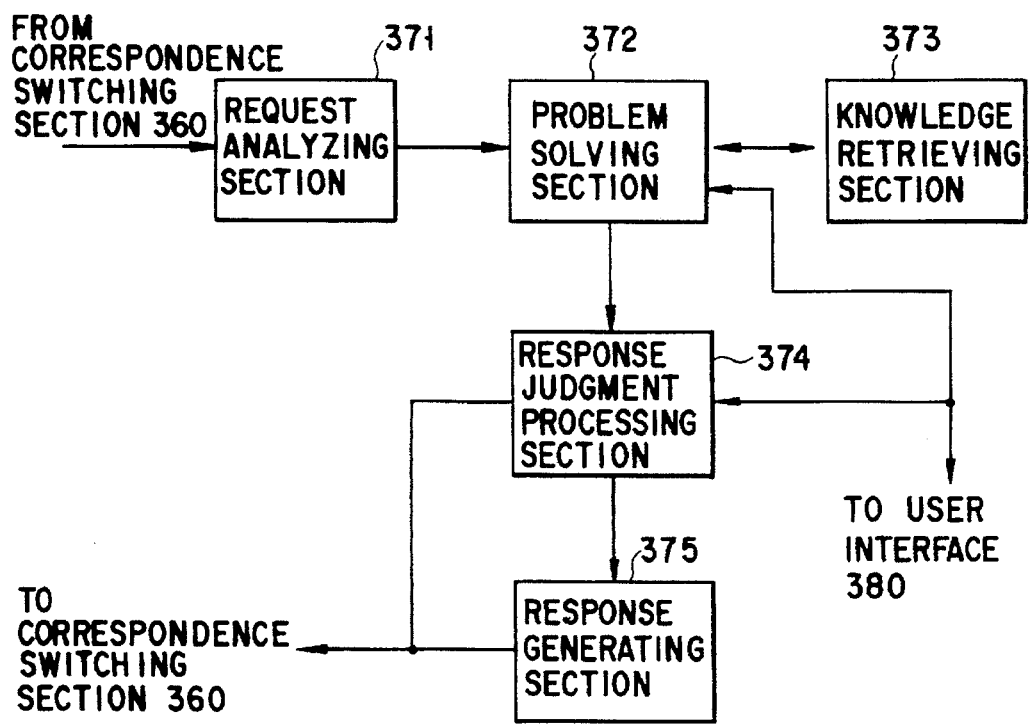
F I G. 20

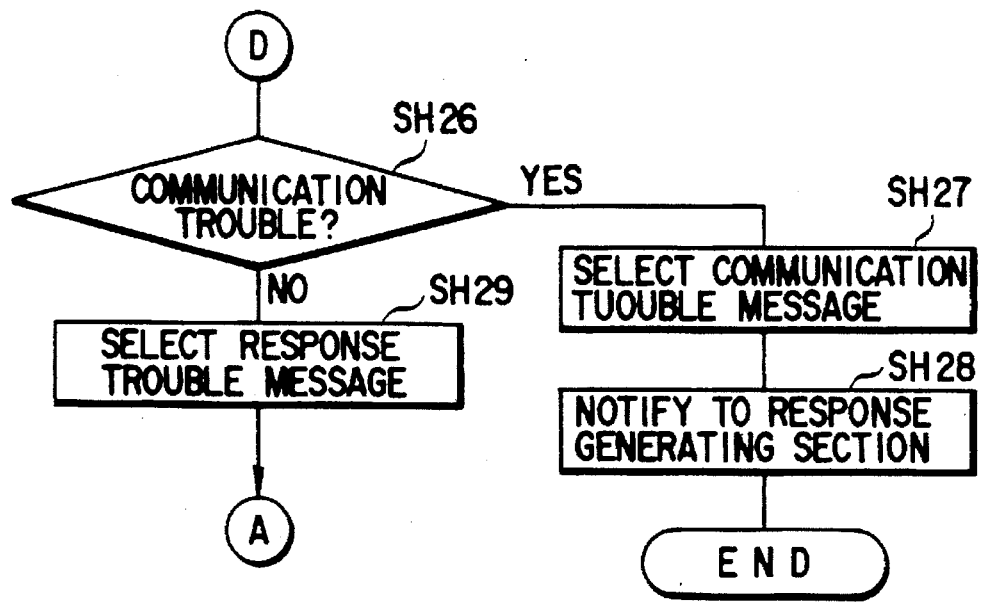
FIG. 23C
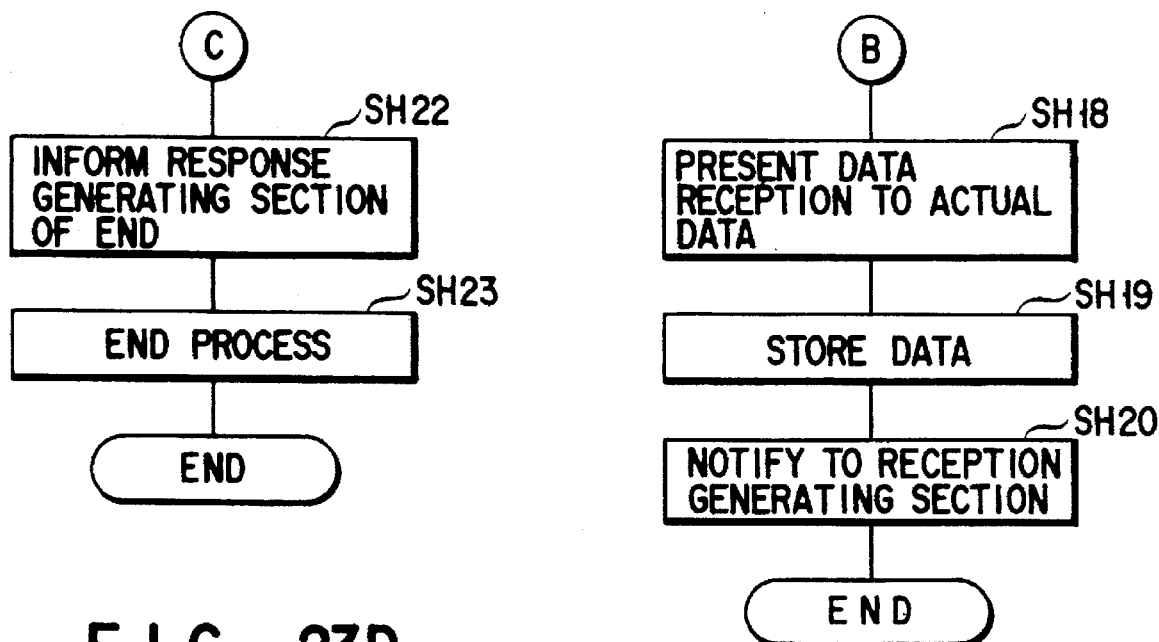
FIG. 23D
FIG. 23E

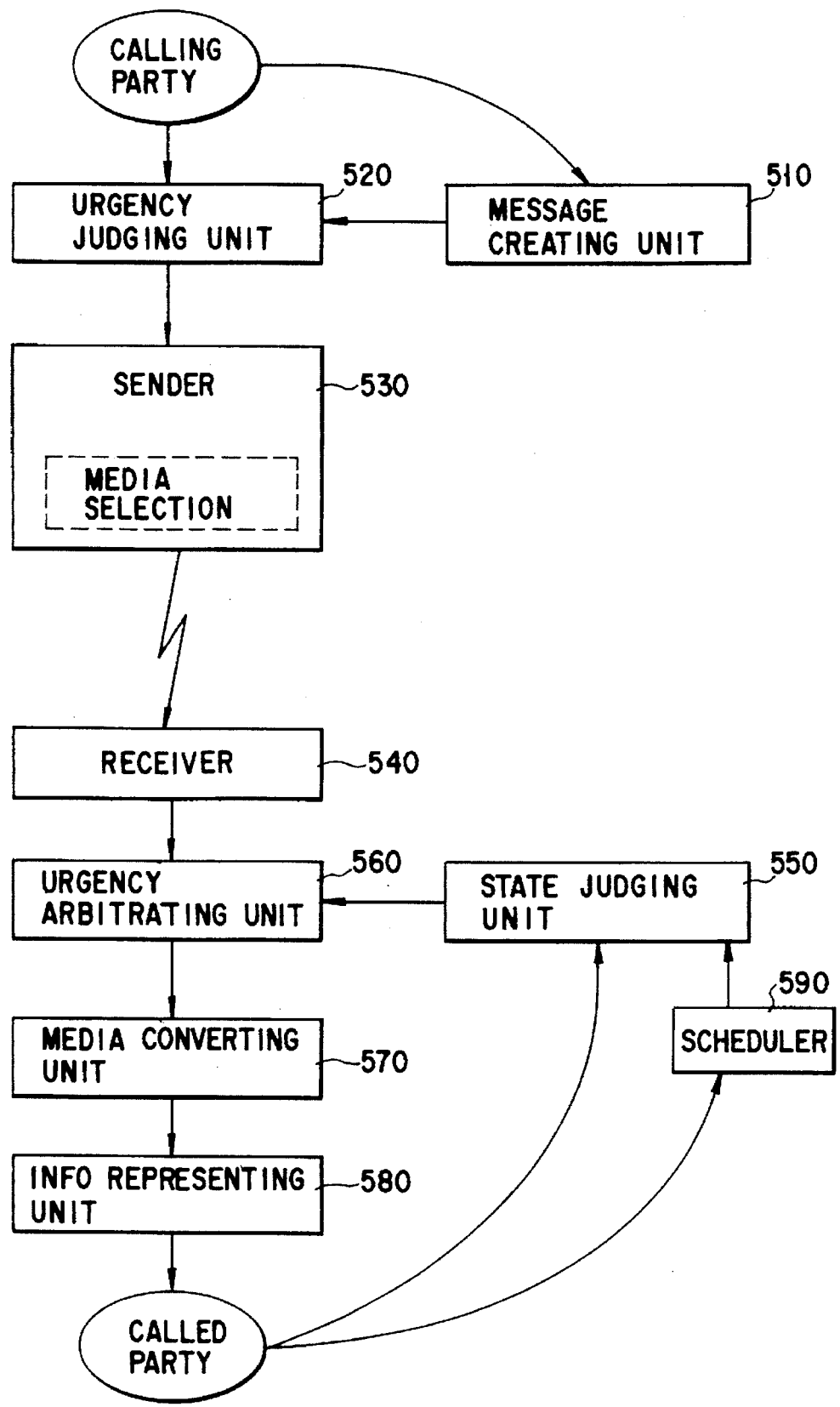
F I G. 24

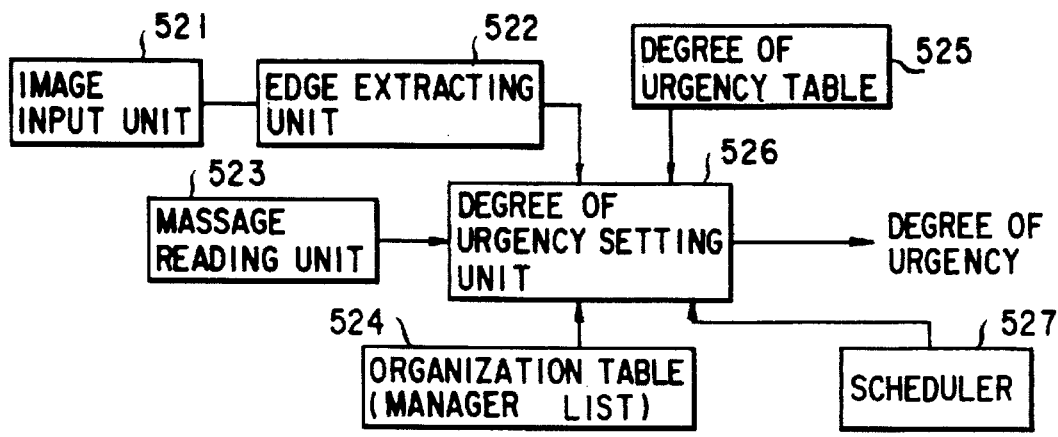
FIG. 26A
```
DEAD LINE              100
RELIABILITY             10
DUTY                    50
PERSONNEL                0
EMOTION                  0
DIFFICULTY              50
PERSONAL BUS. FLAG      ON
REPLY FLAG             OFF
```
FIG. 26B
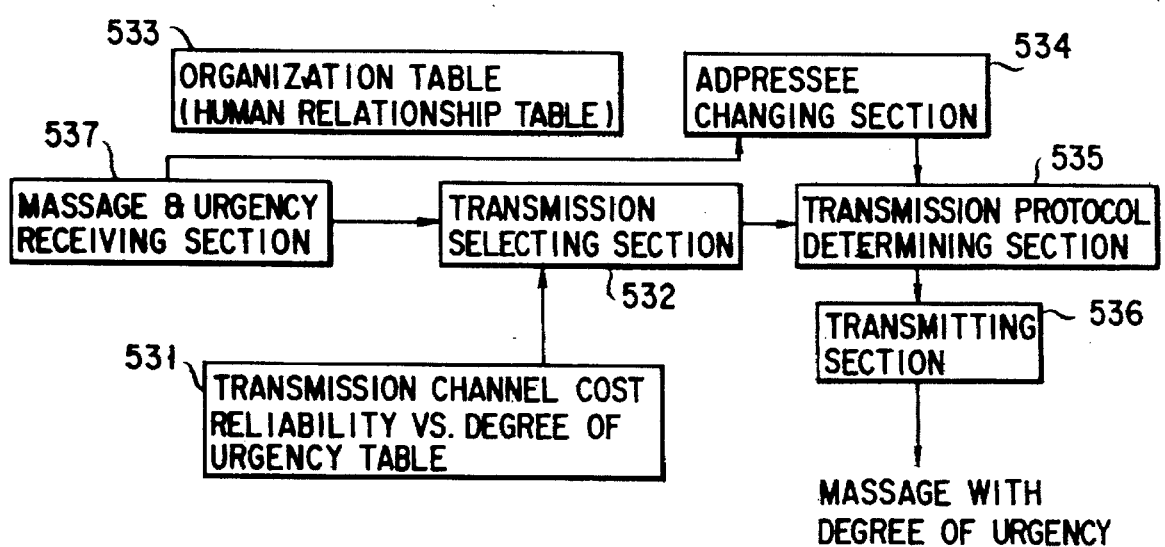
FIG. 28

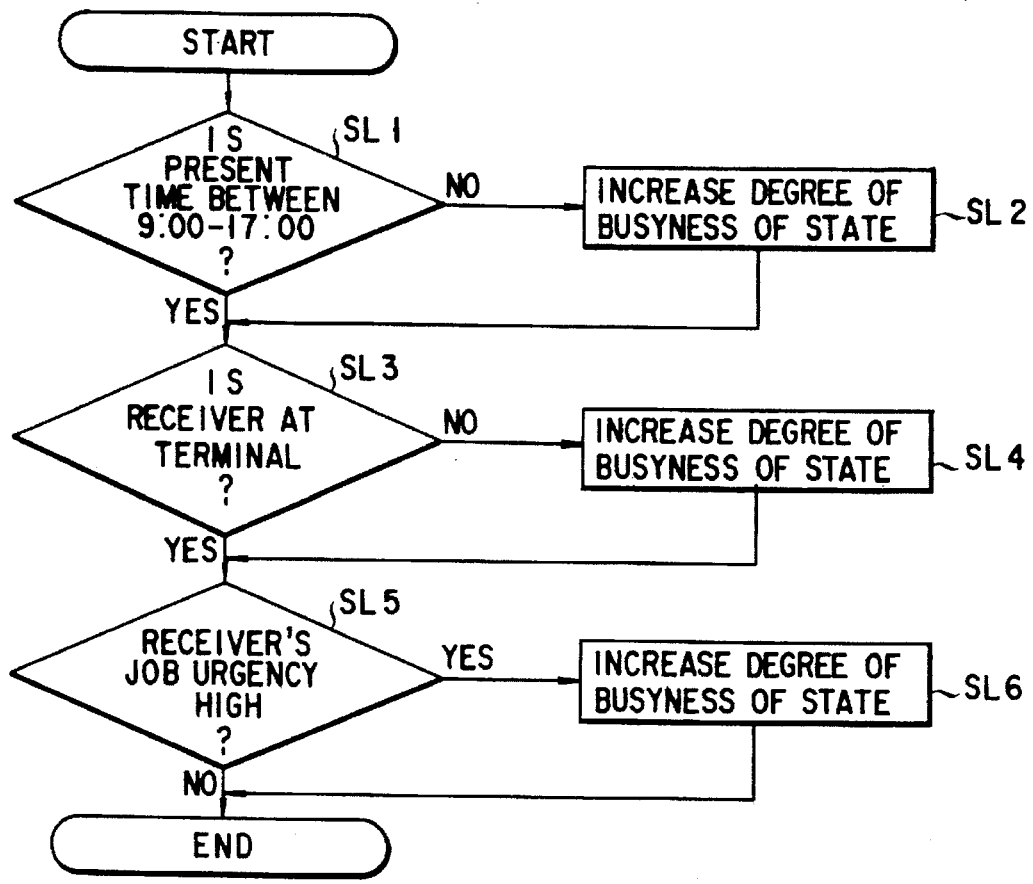
F I G. 29
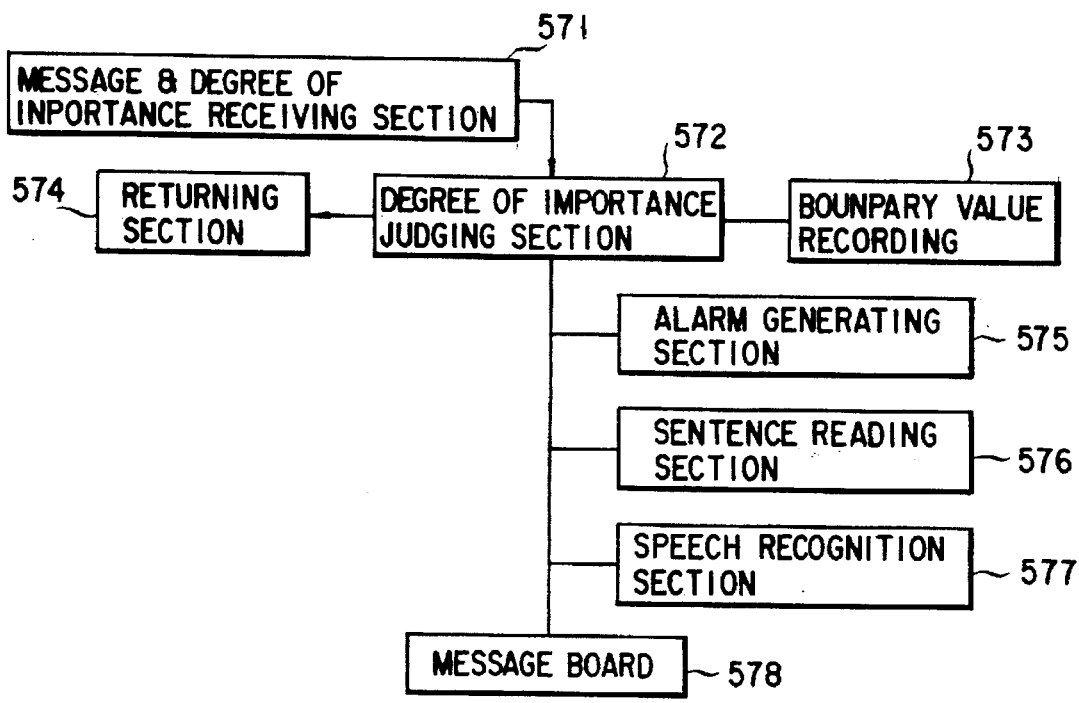
F I G. 33

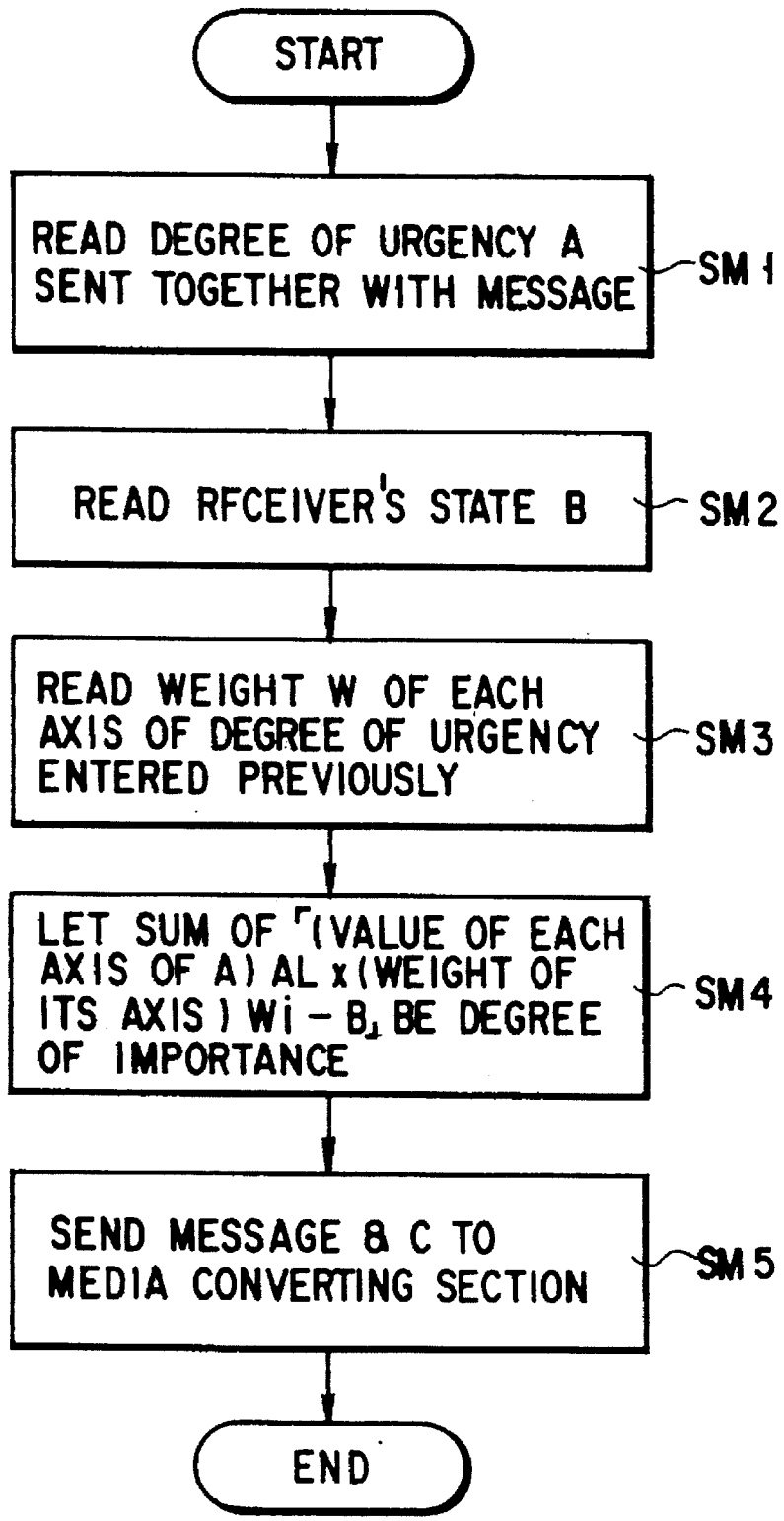
F I G. 30

| | SENDER | GENERAL | A | B |
|---|---|---|---|---|
| $W_1$ | PEADLINE | 1.0 | 1.0 | 0.5 |
| $W_2$ | RELIABILITY | 1.0 | 1.0 | 0.3 |
| $W_3$ | DUTY | 0.5 | 1.0 | 0.3 |
| $W_4$ | PERSONNEL | 0.3 | 0.5 | 0.1 |
| $W_5$ | EMOTION | 0.1 | 0.1 | 0.3 |
| $W_6$ | DIFFICULTY | 0.8 | 0.5 | 0.1 |
| $W_7$ | PERSONAL BUS. FLAG | 0.5 | 0.1 | 0.1 |
| $W_8$ | REPLY FLAG | 1.0 | 1.0 | 0.1 |

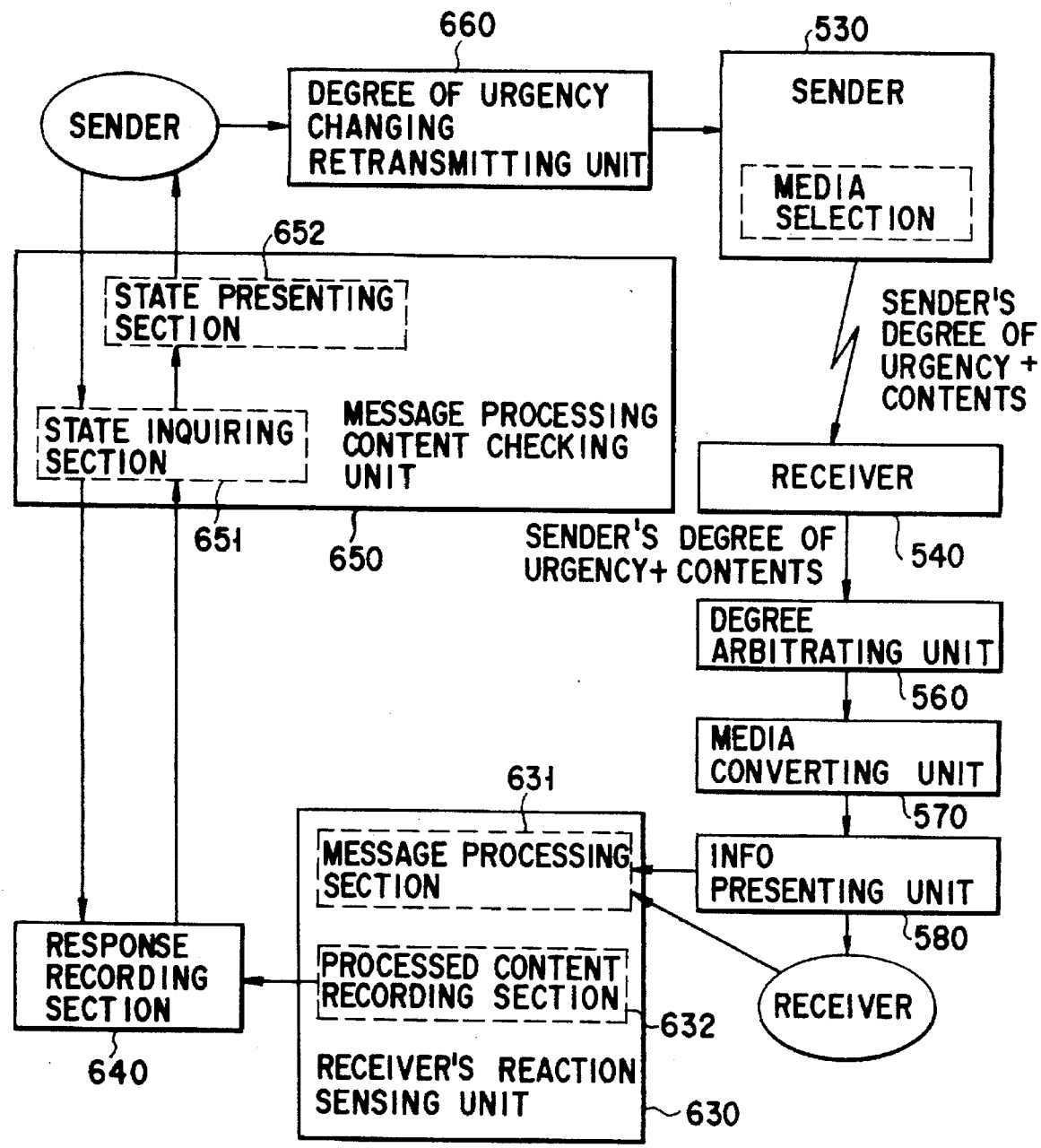
F I G. 38

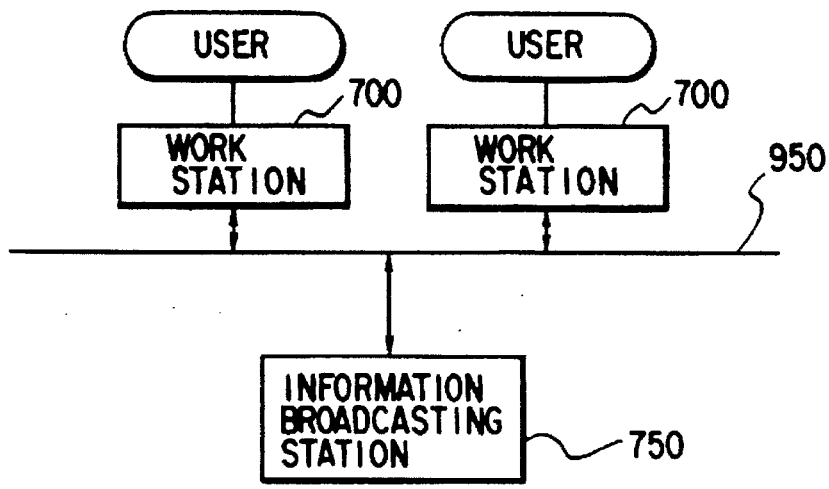
F I G. 44
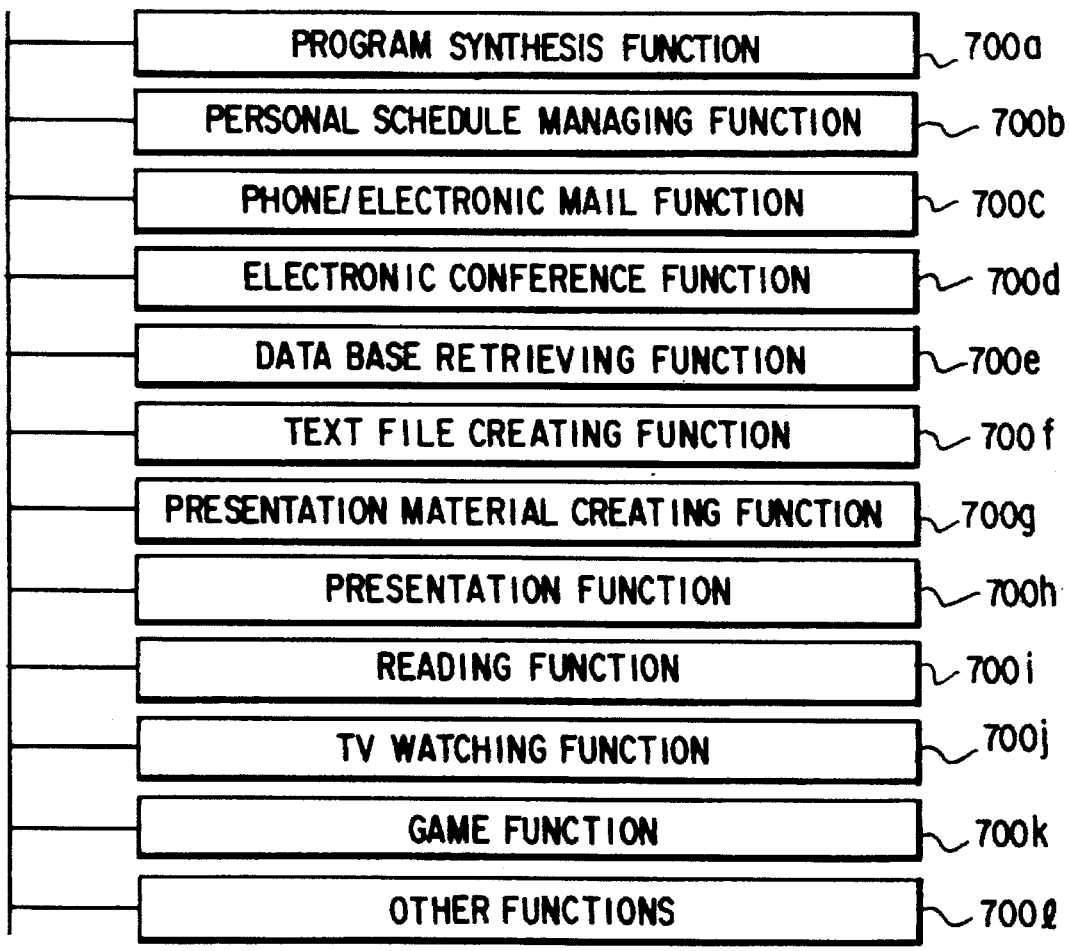
F I G. 45

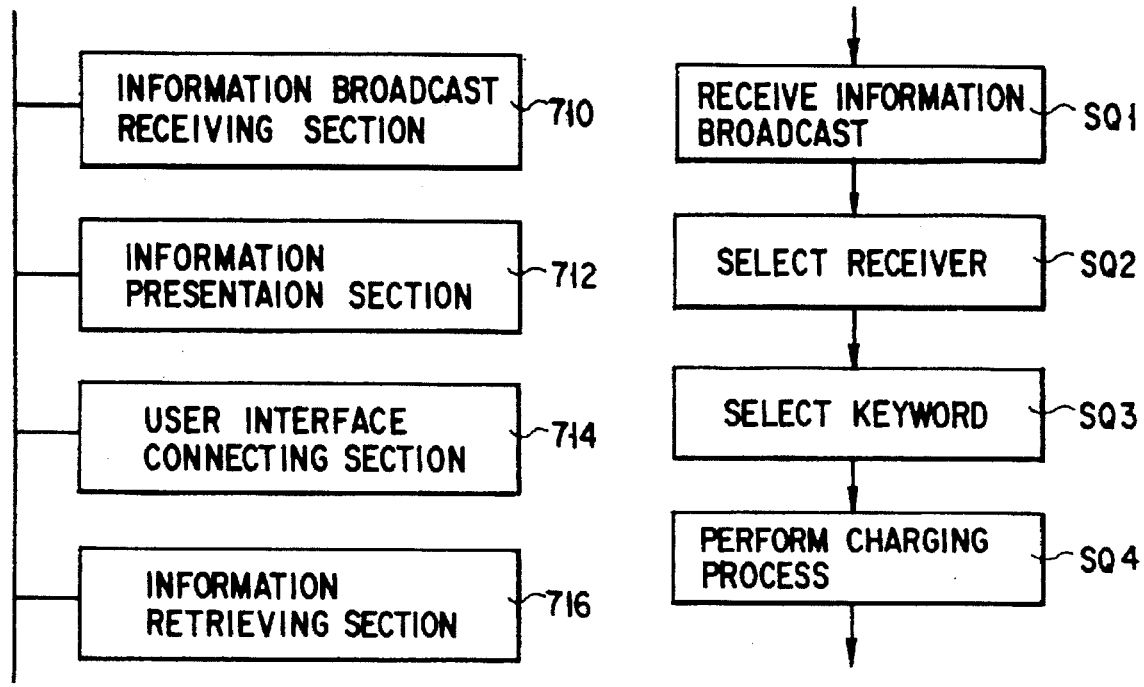
FIG. 46
FIG. 47
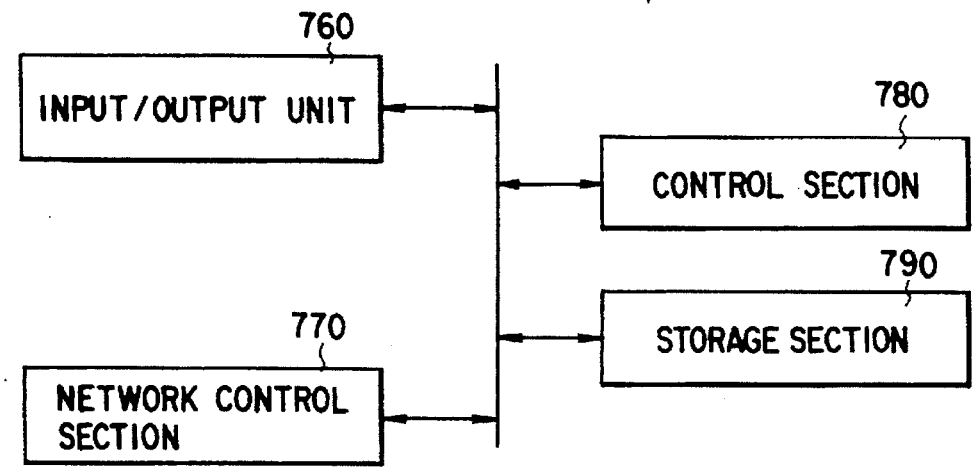
FIG. 48
FIG. 49

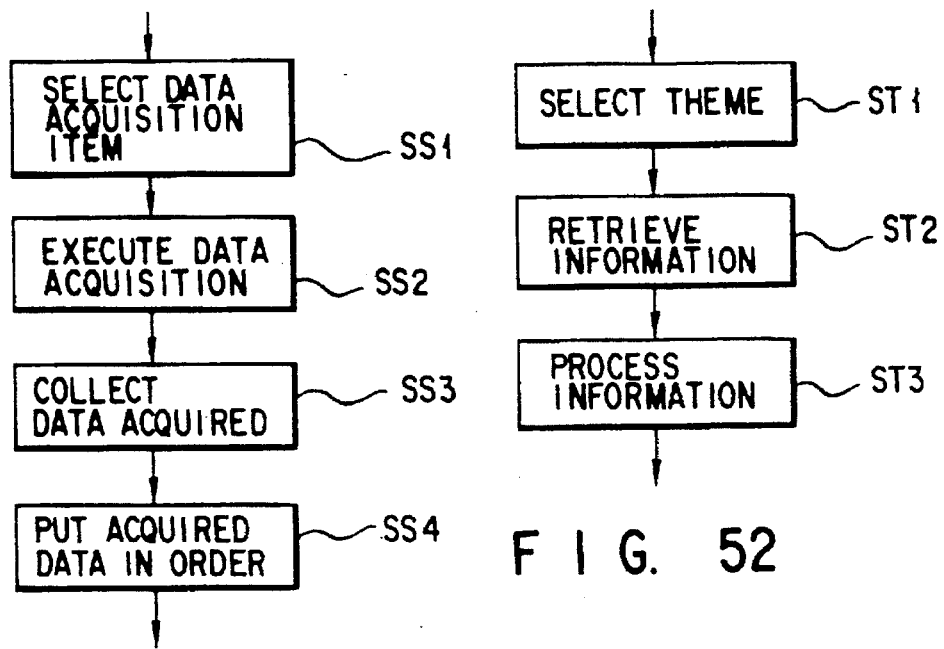
F I G. 51
F I G. 52
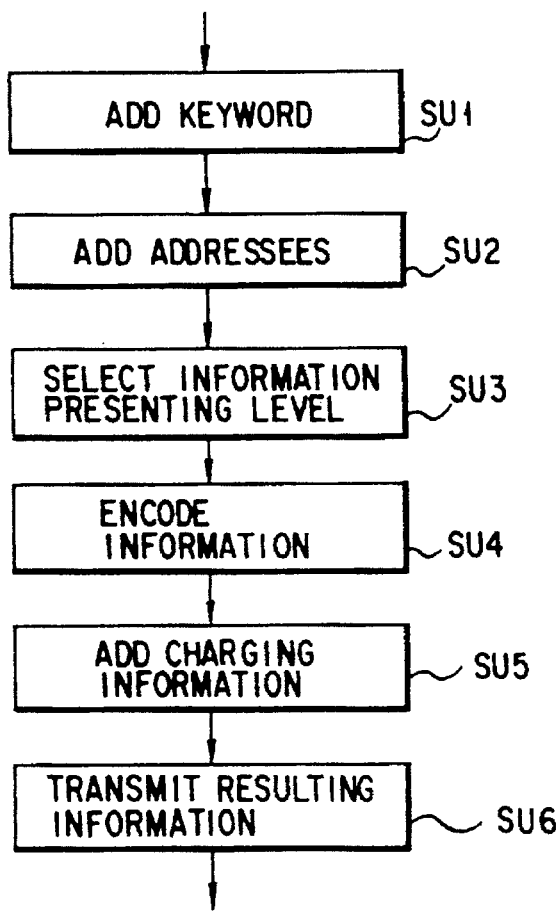
F I G. 53

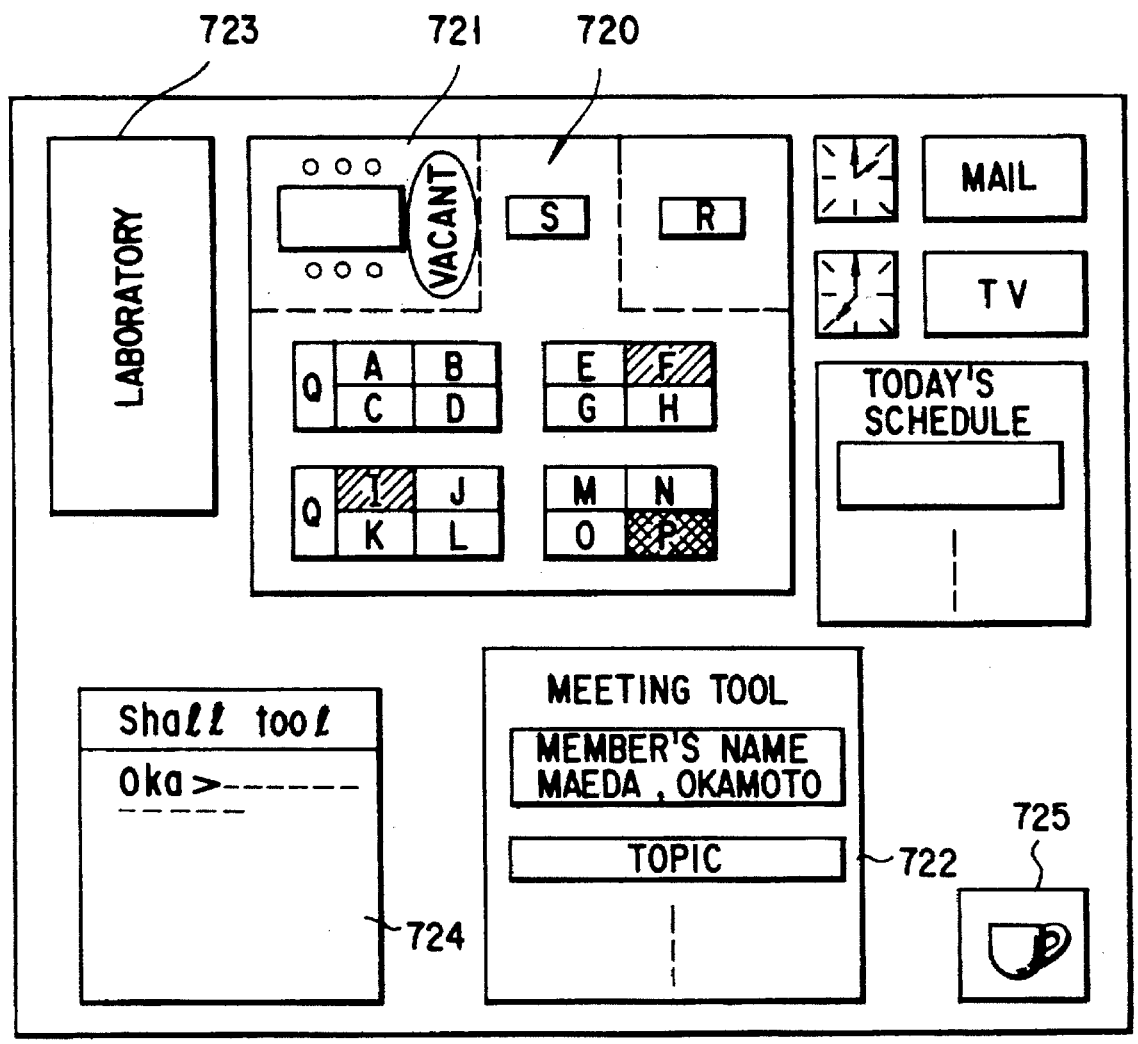
F I G. 54

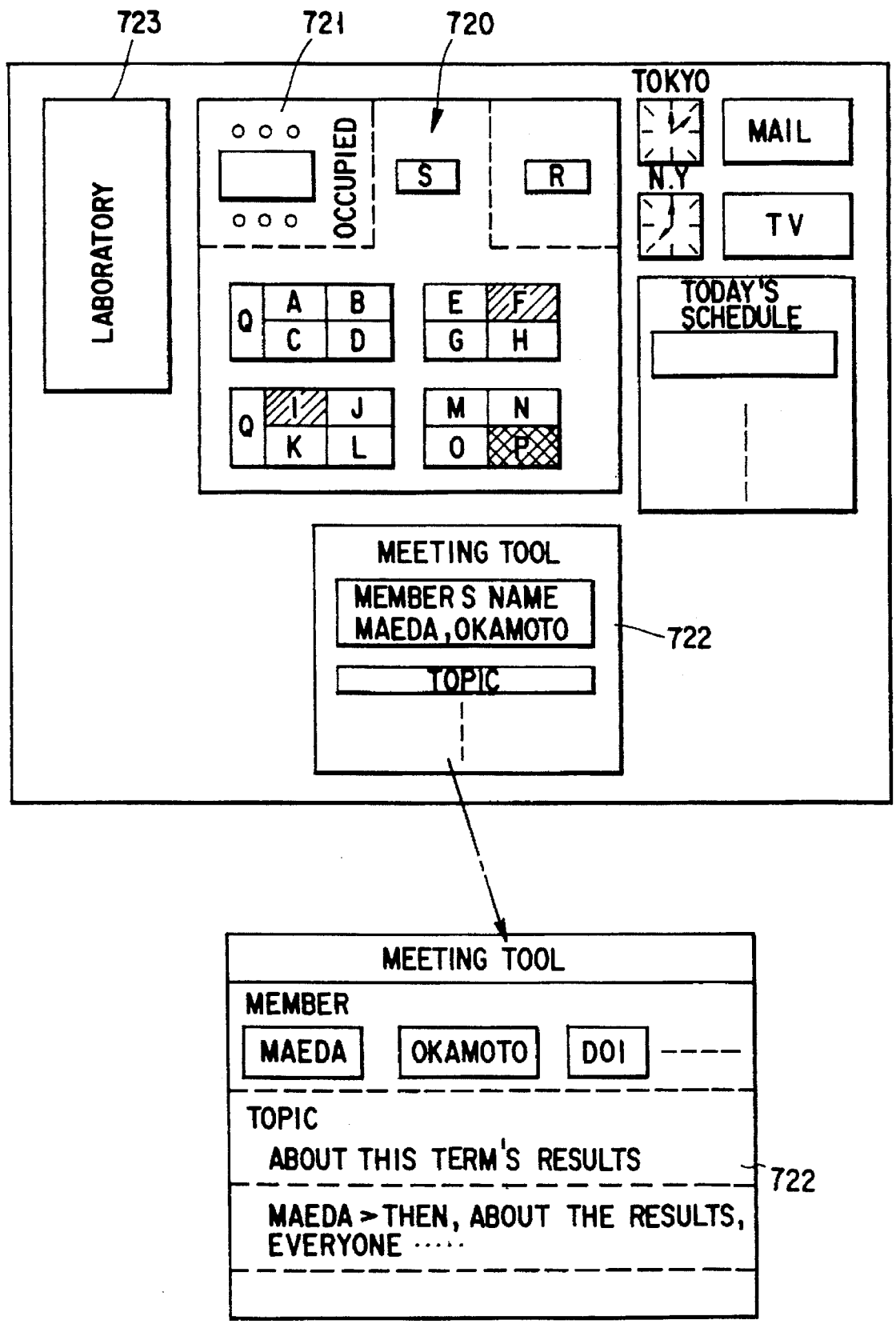
F I G. 56 ftp : PROGRAM FOR TRANSFERING FILE.

SUMMARY

INTERACTIVE FILE TRANSFER CAN BE MADE BETWEEN THE USER SYSTEM AND A REMOTE FILE SYSTEM.

HOW TO USE ftp (-d) (-i) (-n) (hostname)

hostname
    HOST NAME OF FTP SERVER. WHEN HOST NAME IS SPECFIED, ftp TRIES TO CONNECT TO THE HOST IMMEDIATELY. IF SUCCESSFUL, IT PROMTS THE INPUT OF USER'S NAME AND PASSWORD.

WHEN ftp IS STARTED, THE FOLLOWING PROMPT APPEARS.

ftp >

AT THIS TIME, THE FOLLOWING COMMANDS MAY BE ENTERED.

is : LISTS FILES ON THE HOSTSIDE.
    get: TRANSFERS HOST-SIDE FILES TO THE USER SYSTEM SIDE.
    bye: ENDS ftp.

FIG. 62

USER: TANAKA
DATE: 1992.02.27 11:23
KEYWORD: TEXT, CONVERSION, JIS CODE, SJIS CODE
RESULT: /USR/TSBBIN/STOU/USR/TSBBIN/UTOS

← HYSTERESIS RECORD 1

USER: YAMADA
DATE: 1992.02.28 17:11
KEYWORD: FILE, TRANSFER, NETWORK
RESULT: FTP

← HYSTERESIS RECODE 2

FIG. 65

SYNONYM INFORMATION

| INSPECTION | CHECK |
|---|---|
| TRANSFER | COPY |
| | |

FIG. 66A

SIMILAR EXPRESSION INFORMATION

| TRANSFER A FILE | COPY A FILE |
|---|---|
| TRANSFER A MESSAGE | SEND A MAIL |
| | |

FIG. 66B ( CONTENTS STORED BY THEN )
KEYWORD: TEXT, CONVERSION, JIS CODE, SJIS CODE
MESSAGE: PLEASE LET ME KNOW PROGRAMS ABOUT TEXT, CONVERSION, JIS CODE, AND SJIS CODE, IF YOU KNOW.
DATE: SAT. 15 FEB. 92 11:59:19 JST + 0900
F I G. 70
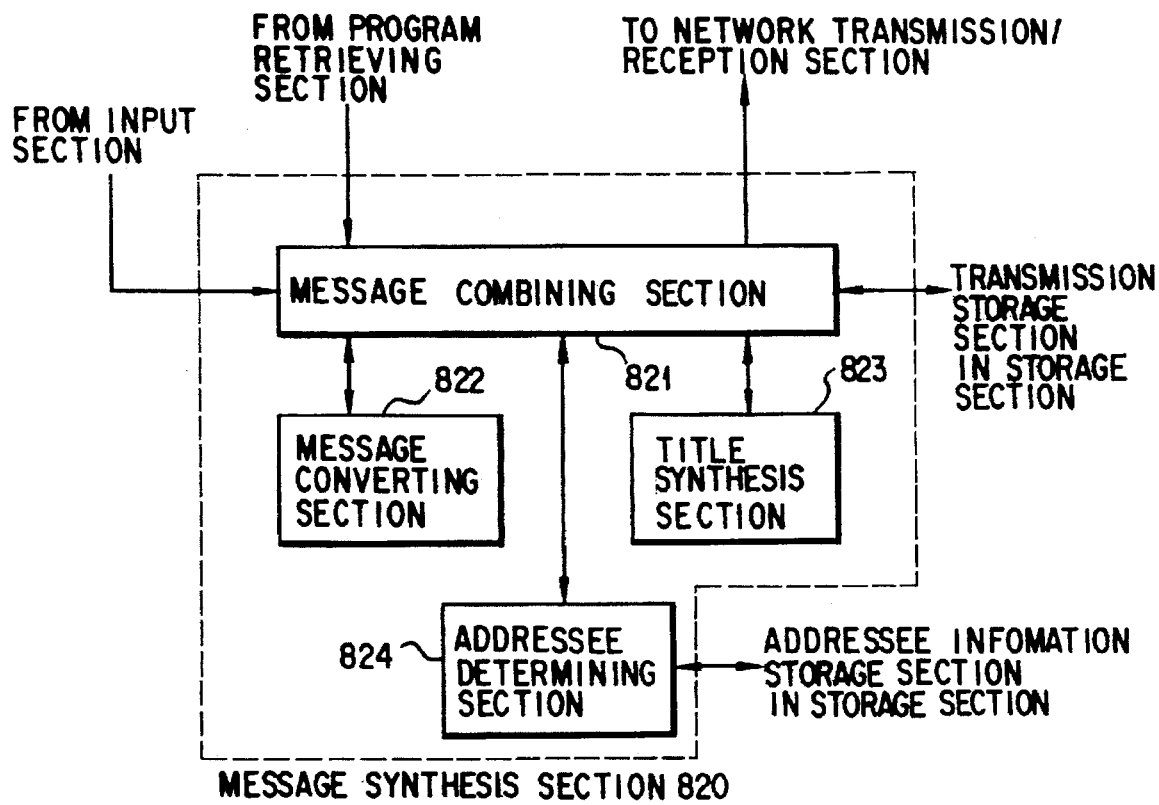
F I G. 71

INDIVIDUAL LIST
| LATEX | TANAKA,SAITOH |
|---|---|
| ASDOC | YAMADA |
| X-WINDOW | SATOH |
| EMACS.COMMAND | SAITOH |
F I G. 72A
GENERAL LIST
| KATOH |
|---|
| ITOH |
F I G. 72B
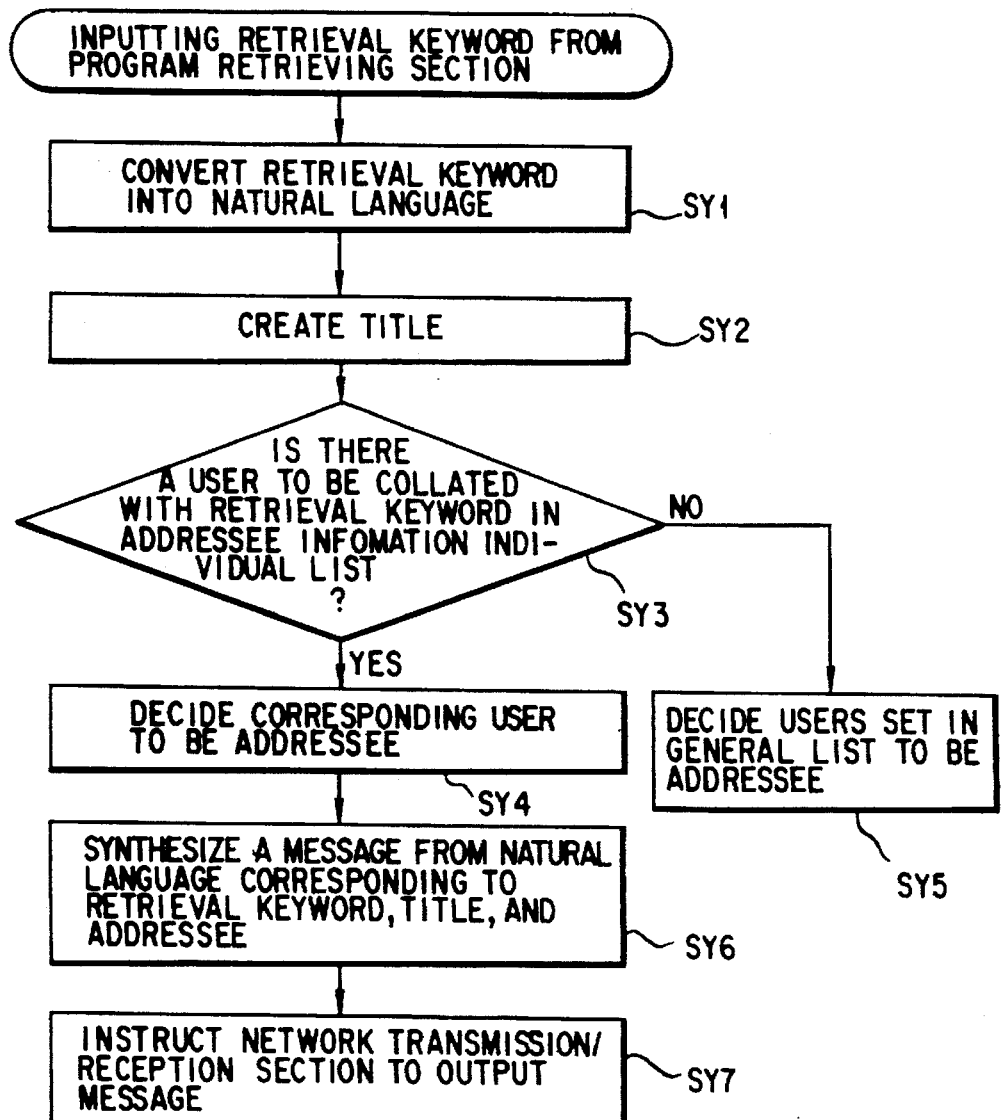
F I G. 73

```
TO : TANAKA , SAITOH
SUBJECT : ONEGAI LATEX
LATEX : PLEASE TELL ME HOW TO INDEX
```

F I G. 74

```
RETURN-PATH. : <HANAKO@RDC.TOSHIBA.CO.JP>
DATE : SAT. 15 FEB 92 11:59:19 JST + 0900
FROM : HANAKO (HANAKO YAMADA)
TO : SUMITA
IN-REPLY-TO : KAZUO SUMITA'S MESSAGE OF SAT, 15 FEB
   92 11:03:07 JST + 0900 <9202150203,AA02804 @
   MAILHOST. RDC. TOSHIBA.CO.JP >
SUBJECT : PROGRAM WO OSHIETE

> PLEASE LET ME KNOW PROGRAMS ABOUT TEXT, CONVERSION
> JIS CODE, AND SJIS CODE ,
  IF YOU KNOW
 /usr / tsbbin / jtos
 /usr / tsbbin / Stoj
ARE AVAILABLE. HOW TO USE ······ .
```

F I G. 75

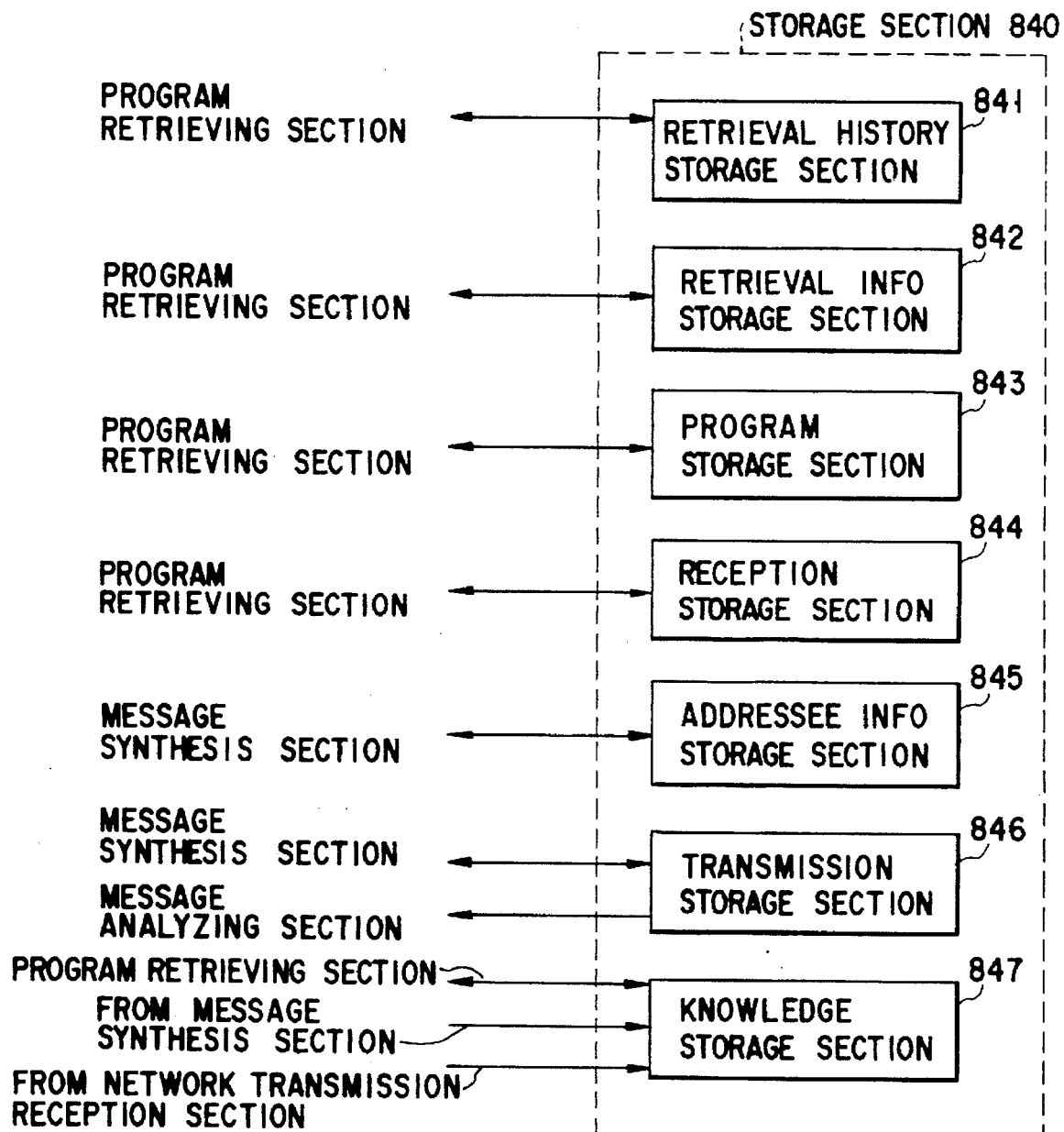
F I G. 78

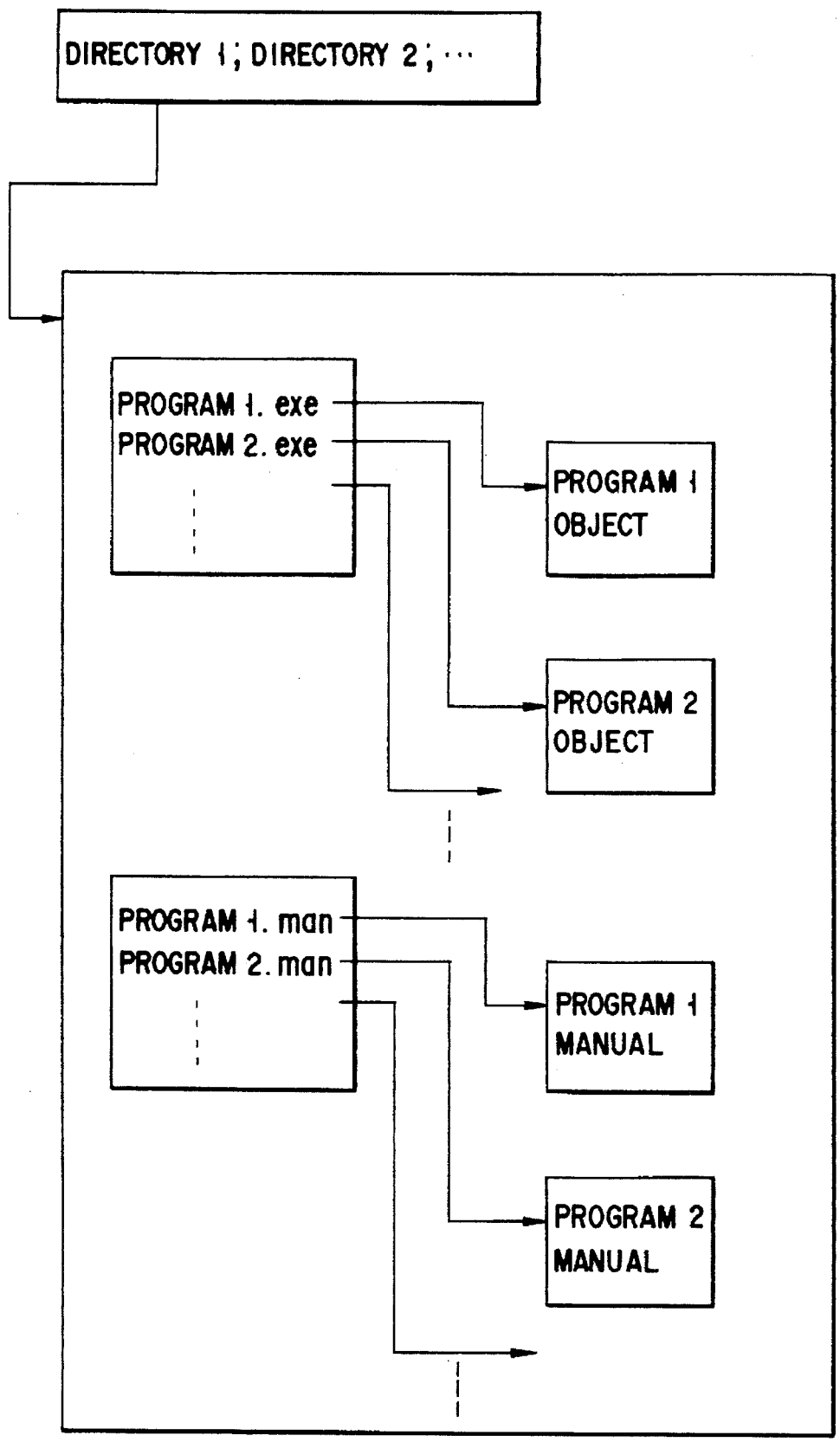
F I G. 79

| NAME | CAPACITY | POST | CHARGE |
|---|---|---|---|
| Suzuki | CHAIRMAN | HEAD OFFICE | SALES |
| Takahashi | MEMBER | LABORATORY | ENGINEERING |
| Akikawa | MEMBER | LABORATORY | ENGINEERING |
| Mashiko | MEMBER | FACTORY | MANUFACTURING |
| Doi | MEMBER | FACTORY | MANUFACTURING |
| Kamei | WITNESS | HEAD OFFICE | SALES |
| Takase | OBSERVER | HEAD OFFICE | SALES |
| Yamamoto | OBSERVER | FACTORY | MANUFACTURING |

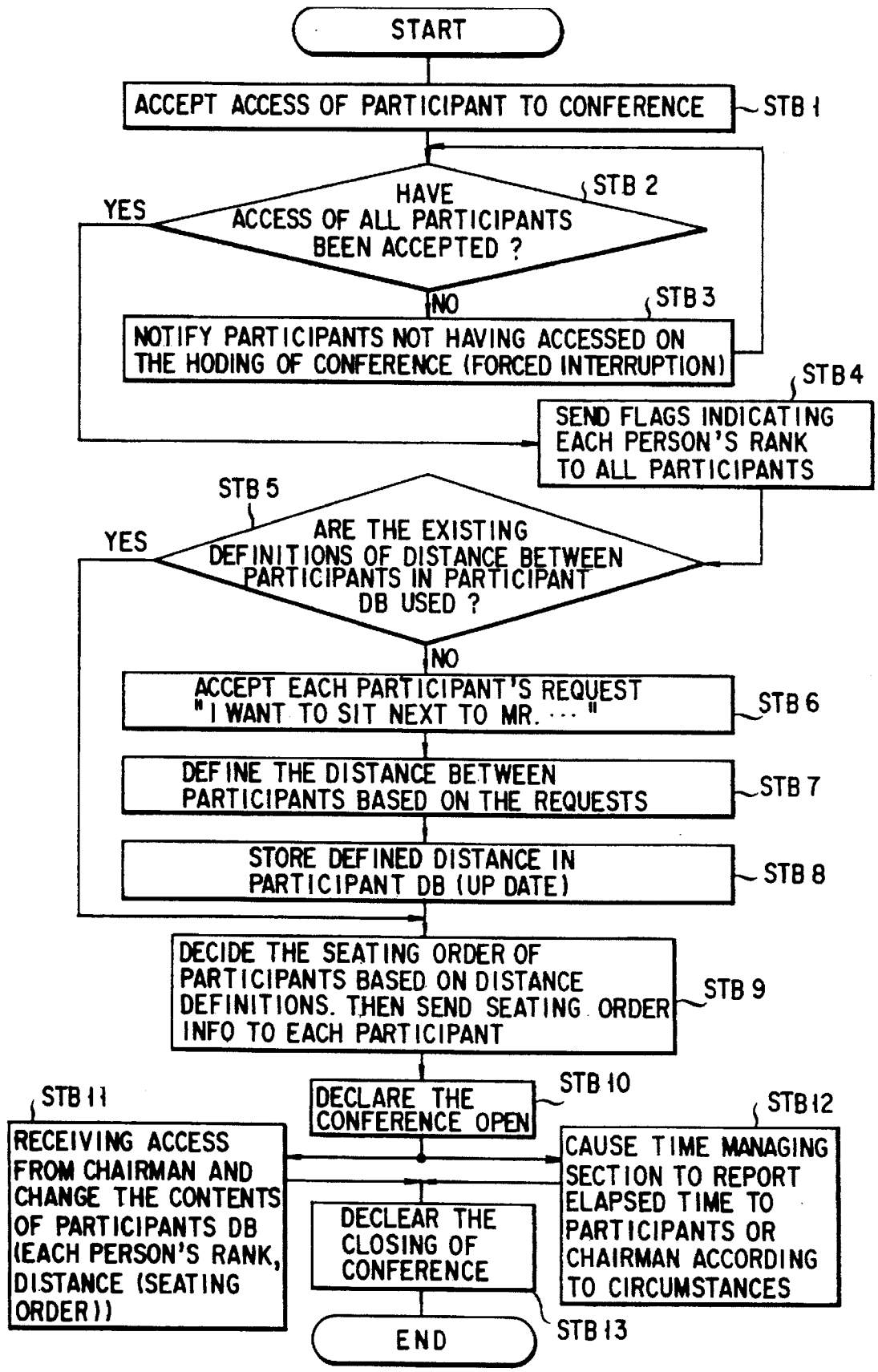
F I G. 85

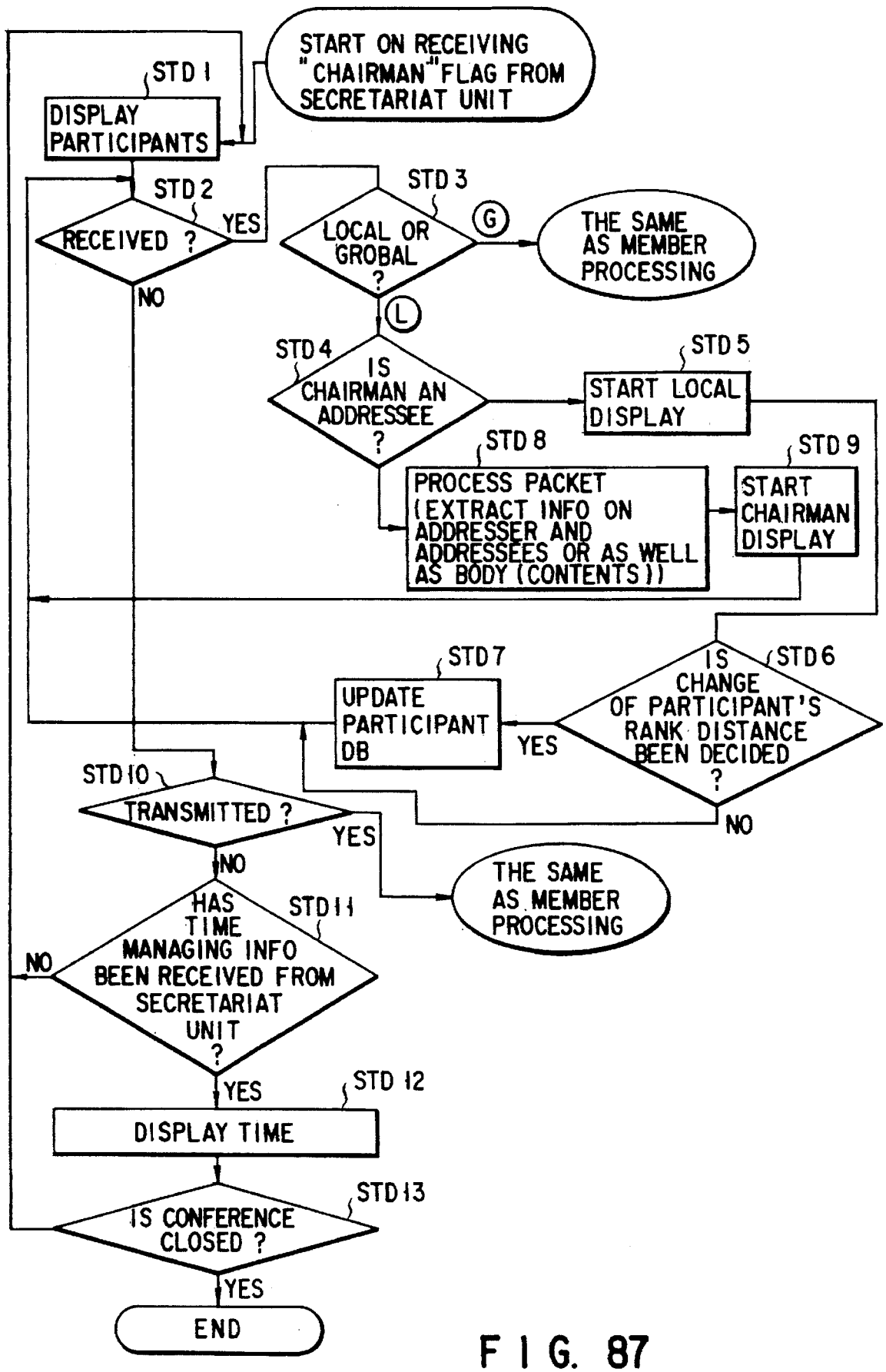
F I G. 87

HUMAN INTERFACE SYSTEM FOR COMMUNICATING NETWORKED USERS

This application is a continuation of application Ser. No. 08/095,981, filed on Jul. 23, 1993, now abandoned.

BACKGROUND OF THE INVENTION

1. Field of the Invention

This invention relates to a human interface system for use with a plurality of computers connected through a distributed network.

2. Description of the Related Art

A human interface for computer systems (hereinafter, referred to as a human interface system) has been developed mainly with a view to supporting various activities in a single independent computer. Recently, various computer tools have been readily available. They include a tool that places multiple windows on a bit map display and processes multiple jobs in parallel, a tool that allows file creation and deletion by means of a graphical user interface, and a tool that provides data management using a spread sheet.

The popularization of computer networks enables various services including electronic mail through local area networks or wide area networks.

For such human interface systems, various computer tools are modeled according to a concept termed what is called desk top metaphor. Such human interface systems make it easy for the user to access and operate various conventional single-computer tools. Those tools are generally used by the user only after the user has learned their functions and how to operate them. Services handled by the computer are becoming enormous. Actually, the user, carrying out his work or duties, often looks for and refers to data that he does not know where it is, or accesses various computer services which he uses less frequently. Such actions, however, are difficult to carry out in the framework of a conventional human interface.

In such a human interface system, telephone, electronic mail, talk or the like are widely used as systems that allow exchange of messages between terminals connected through a network. In the existing systems, however, unimportant telephone calls sometimes interrupt urgent work or important electronic mails are often left unread for a long time. This is because the system cannot appreciate the working conditions on the called party side as well as the importance of the message the calling party has intended to give and consequently can provide neither the called party nor the calling party with messages with good timing.

The above conventional human interface system cannot transmit messages with appropriate timing according to their importance in such a manner that important messages of great urgency are presented to the called party even if he is at work, whereas messages of less urgency are presented when the called party is not busy.

Similarly, office automation has been popularized remarkably. For example, a work station system has been developed which has a work station with a computer system function installed on each user's desk and allows them to connect to each other and a host computer via a network to communicate with one another.

In such a work station system, when the user wants to get desired information while continuing his work on his work station, he inquires of the user at another work station via the network or calls the host computer and reads the desired information from a data base.

The user at each work station positively inquires of another work station or the host computer in anticipation of getting desired information.

This means that the user cannot get what he wants unless he inquires positively. For this reason, even when acquiring information of less importance, not directly related to the tasks at his work station, the user has to stop what he is doing at his work station temporarily to operate for the acquisition of information, which makes it a troublesome job to get information.

As described above, with the conventional work station system, since the user at each work station cannot get information unless he inquires positively of another work station or the host computer, he has to suspend what he is doing at his work station each time he tries to get information, thus making it a bothersome job to acquire information.

As the processing capability of the computer is expanding, various application programs have been developed for use on such increasingly powerful computers. Such application programs include a text-file tool, a graphic tool, a spreadsheet tool, electronic mail, a schedule management tool, and a database retrieving tool. The computer is not merely a high-speed computing machine but is now serving as a machine which provides an environment that efficiently supports various intellectual activities.

When the user tries to do work, he sometimes spends a lot of time in getting the work done without using the computer or creates a new program even if a function supporting the work is prepared on the computer, because he does not know it. In addition, although the user knows that there is a function he wants on the computer, he cannot use the function after all, because he does not know how to use it.

To solve such problems, there is provided an operating environment where the functions prepared on the computer appear on the screen in the form of menus or icons and are each selected by a pointing device such as a mouse to start each function. With such menu or icon representation, however, there is a limit on what is displayed on the computer screen. Thus, as the number of application programs increases, there may be a case where their menu cannot be displayed on a single screen. To overcome this problem, the menu is made hierarchical or one screen scrolls to another according to the menu.

When the number of application programs has reached approximately 1000, however, the user has to spend a lot of time and labor in searching the menu or icons for the desired function. Therefore, such an arrangement is also difficult to use.

When each type of application program has its own manual, each manual can be stored previously on the computer. In this case, a system can be considered which enables retrieving of a desired function from the manual by specifying a particular Key word, using full-text retrieving techniques.

When the desired application program does not exist on the computer, the manual on the program does not exist as a matter of course, so that the manual cannot be retrieved. Further, even if the desired application program exists, there may be a case where it cannot be retrieved because there is no explanatory text such as a manual on the program. In the case of old computer systems, the user knows what kinds of programs are on the computer only after he asks people around him.

Concerning human interface systems, companies have been introducing electronic conference systems, which allow persons far away from each other to exchange views by means of telephones, television, work stations, etc.

In the electronic conference system, a television camera is prepared for each meeting place where participants have gathered and the scene of the meeting place from each camera is switched so as to create an atmosphere where participants feel as if they were discussing in the same place, by displaying the face of the person now expressing his opinion on the screen, for example.

With such an electronic conference system, however, the meeting proceeds while the participants are looking at a close-up of the person expressing his opinion on the TV screen, which is different in atmosphere from a meeting where the individual participants actually sit across a conference table from each other and exchange their views, with the result that they are liable to have an awkward feeling which would impair a smooth progress of the meeting.

SUMMARY OF THE INVENTION

A first object of the present invention is to provide a human interface system capable of allowing functional activities similar to those in the real world.

A second object of the present invention is to provide a human interface system capable of arbitrating the degree of urgency based on the urgency on the calling party side and the working conditions on the called party side, and controlling message presentation timing and mode in a network system having media including telephones, electronic mails, facsimiles, pagers, and answering machines.

A third object of the present invention is to provide a human interface system which enables the user to get various types of information easily while continuing his work.

A fourth object of the present invention is to provide a human interface system which allows the user to flexibly retrieve an application program containing a desired function.

A fifth object of the present invention is to provide a human interface system which enables a conference to proceed in a manner close to reality and to progress smoothly.

A first human interface system of the present invention constructed by connecting systems containing a plurality of computers via a network is characterized by the computer system comprising: site building means for building a plurality of sites that either retain or manage a plurality pieces of data and a plurality of programs; and access managing means for managing users' access to each site, wherein the access managing means has a communication channel between the users established by accessing the sites via the data and programs.

Further, the first human interface of the invention is characterized in that the access managing means further contains a knowledge retrieving section for storing knowledge information that the user has and retrieving the knowledge information on the basis of the analysis result at the request analyzing section.

With the first human interface system of the present invention, for example, an office is assigned as a network composed of a system having a plurality of computers, and a virtual site is built out of various things (desks, various tools, etc.) in the office. The access managing means enables the user to access the virtual site to get desired information.

By using a site agent as the access managing means for a dialogue with the user and introducing an agent called a person having an automatic response function for access from the user, simple and routine exchanges are automated when a user accesses another user for exchanging information. Only when necessary, the actual user deals with the exchange. Unlike a conventional interface with a single independent program, movement in the computer internal world and a dialogue with another person are allowed. Therefore, when the actual user performs his duties, it is very easy to retrieve and refer to data in a place unknown to the user or use various types of computer services less frequently used.

As described above, with the first human interface system of the present invention, various types of virtual sites can be built on the computers on the network to allow communication between users accessing the virtual sites, which enables movement of virtual sites to make it natural and easy to access information in different places.

A second human interface of the present invention is characterized by comprising: message creating means for creating a message; degree of urgency judging means for judging the degree of urgency concerning the addresser's message; transmitting means for attaching the degree of urgency to the message and transmitting it to a desired addressee; receiving means for receiving the transmitted message attached with the degree of urgency; state judging means for judging the state of the addressee on the basis of the received message; degree of urgency arbitrating means for obtaining the degree of importance of the message on the basis of the degree of urgency transmitted by the transmitting means and the state obtained by the state judging means; media converting means for determining a method of processing the message on the basis of the degree of importance obtained by the degree of urgency arbitrating means; and presenting means for presenting the message according to the method determined by the media converging means.

With the second human interface system of the present invention, instead of presenting a message, a message is stored in the storage means or is sent back to the receiving side according to the decision at the media converting means.

With the second human interface system of the present invention, the degree of urgency of a message created on the transmitting side is automatically judged, the message with this degree of urgency is transmitted, the state of the receiver on the receiving side is automatically judged, the degree of importance of the message is obtained by arbitrating between the transmitted degree of urgency and the state of the receiver, and the message is processed suitably (media conversion, presentation, return, etc.) on the basis of the degree of importance. Therefore, message communication can be achieved with the optimum timing and state obtained by arbitrating between contradicting requirements on the transmitting and receiving sides. That is, smooth message communication can be performed with the degree of urgency desired by the transmitting side well compromising with the working efficiency on the receiving side, which provides both the transmitting and receiving sides with an easy-to-use human interface system.

A third human interface system of the present invention where a plurality of work stations are connected to a network to which an information broadcasting station is connected, is characterized by the information broadcasting station comprising: information collecting means for collecting various types of information from the work stations; information processing means for processing the collected information; and information broadcasting means for distributing the processed information to the work stations; and each of the work stations comprising: selecting means for selecting from the information distributed from the information broadcasting station; presentation mode determining means for determining a presentation made of the information selected at the selection means; and presenting means for presenting the information according to the presentation mode determined at the presentation mode determining means.

With the third human interface system of the present invention, the information broadcasting station connected to the network to which work stations are also connected, broadcasts various types of information collected from different places, including each station, to the individual work stations. Thus, the user at each work station can create an environment where he can readily get various types of information from the screen display whose presentation mode is well designed, without suspending his duties.

The information broadcasting station positively collects insignificant information other than the information each user directly uses in his duties, processes it into a form easily understandable to the user, and broadcast it. At each user's terminal, such insignificant information is displayed to the user's liking in a manner that does not interfere with his work. Therefore, the user, while doing his work, can know the circumstances (including the state of the other users connected to the network) and the surrounding atmosphere with ease, which were not available on conventional network terminals.

For example, even in a satellite office, it is possible to create an atmosphere of a common usual office, using the system of the invention.

A fourth human interface system of the present invention constructed by connecting systems containing a plurality of computers via a network, is characterized by comprising: an input section for inputting a retrieving instruction to retrieve a desired program; a program retrieving section for retrieving a program directly usable from the computer in response to the retrieving instruction inputted from the input section; a message composing section for converting the retrieving instruction into a transmission message expression to the network when program retrieving at the program retrieving section has failed; and a network transmission/reception section for transmitting the transmission message created at the message composing section to the network and receiving a reception message corresponding to the transmission message.

The program retrieving section retrieves programs stored in the program storage section on the basis of documents such as manuals on how to use programs.

Further, when the program retrieving section has failed to retrieve a program stored in the program storage section, the message composing section converts the user's request into a message to inquire of another user. For example, a message is converted into an electronic mail or a piece of electronic news.

The network transmission/reception section transmits a message sent from the message composing section to the communication network. The transmitted message is sent to a user different from the user retrieving the program.

The other user, receiving the message, may know the place where the application program the original user wants (the name of a directory in a case where program files are managed in a hierarchical directory like UNIX) is or how to use. In this case, the user replies to the received message.

When the other user send a reply, the message analyzing section receives the message via the network transmission/reception section. By analyzing the message, it is judged whether or not the message is a reply to the original message.

When a program is contained, it is reported to the program retrieving section and the program is stored in the program storage section.

With the fourth human interface system of the present invention, the user can inquire about a desired application program of the computer by keyword or the like. Further, when the program to be retrieved cannot be found, the retrieving request is converted into a message to inquire of another user via the communication network. Thus, when the other user knows such a program and can answer the message, he can send a reply to the original user. Therefore, even if the user cannot get a desired program on his computer, he can easily get the desired program.

As explained above, with the fourth human interface system of the invention, the user can inquire about a desired function of the computer by attempting to retrieve information. When the retrieving has failed, the process of inquiring of another user can be performed automatically on the computer. Thus, in a computer environment where more than one user uses a plurality of computers, it is possible to make good use of program resources.

A fifth human interface system of the present invention constructed by connecting a plurality of computers serving as electronic conference terminals via a network, is characterized by comprising: distance determining means for determining the theoretical distance between the individual electronic conference terminals; display means for determining the seating order of users at the electronic conference terminals on the basis of the theoretical distance determined at the distance determining means and displaying the users at the electronic conference terminals according to the seating order of the users; selecting means for selecting either global communication aimed at communication between all of the electronic conference terminals connected to the network or local communication aimed at communication between only part of the electronic conference terminals; and feasibility determining means for determining the feasibility of local communication on the basis of the theoretical distance between electronic conference terminals available for the local communication, when local communication has been selected at the selecting means.

With the fifth human interface system of the present invention, the seating order of the individual electronic conference terminal users can be determined, according to the theoretical distance between electronic conference terminals, to display each electronic conference terminal user on the screen, following the seating order, and the feasibility of local communication between part of the electronic conference terminals can be decided based on the theoretical distance between the electronic conference terminals concerned. Thus, it is possible to create an atmosphere similar to that of actual conferences where the attendants are sitting around a table, using screen displays of the individual electronic conference terminal users. Further, since only electronic conference terminal users topographically close to each other are permitted to perform local communication, this makes it possible to progress the conference under conditions similar to reality, which frees the users from a sense of incongruity, thereby enabling smooth progress of the conference.

Additional objects and advantages of the present invention will be set forth in the description which follows, and in part will be apparent from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 6 is a view of a file cabinet and a desk;

FIG. 7 is a view of a display image at a virtual site;

FIG. 8 is a diagram showing a structure of connection between virtual sites;

FIG. 19 is a block diagram related to a person's response action;

FIG. 20 is a block diagram of the automatic processing section;

FIGS. 23A through 23E are flowcharts for the processing at the response judging section;

FIG. 24 is a schematic diagram of a human interface system according to a second embodiment of the present invention;

FIG. 26A is a block diagram showing the construction of the calling party's degree of urgency judging unit;

FIG. 26B is a view of an example of various degree of urgency added by the calling party's degree of urgency judging unit;

FIG. 28 is a block diagram of the sender;

FIG. 29 is a flowchart for the processing at the called party's state judging unit;

FIG. 30 is a flowchart for the processing at the degree of urgency arbitrating unit;

FIG. 33 is a block diagram of the media converting unit;

FIG. 38 is a schematic diagram of an arrangement for letting the calling party know how the presented message has been handled;

FIG. 44 is a schematic diagram of a human interface system according to a third embodiment of the present invention;

FIG. 45 shows various tasks performed at the work station;

FIG. 46 is a schematic diagram of the work station;

FIG. 47 is an explanatory diagram of the operation of the information broadcast receiving section;

FIG. 48 is an explanatory diagram of the operation of the information presenting section;

FIG. 49 is a schematic diagram of the information broadcasting station;

FIG. 51 is an explanatory diagram of the operation of the information acquiring section;

FIG. 52 is an explanatory diagram of the operation of the information summarizing section;

FIG. 53 is an explanatory diagram of the operation of the information broadcasting section;

FIG. 54 is a view for explaining a screen display in the third embodiment;

FIG. 56 is a view for explaining a screen display in the third embodiment;

FIG. 62 shows part of a manual;

FIGS. 65, 66A and 66B are diagrams showing part of the retrieving hysteresis storage section;

FIG. 70 is a diagram showing an example of part of the contents of the transmission storage section;

FIG. 71 is a block diagram of the message synthesizing section;

FIGS. 72A and 72B are diagrams showing an example of the contents of the addressee information storage section;

FIG. 73 is a flowchart for the processing at the message synthesizing section;

FIG. 74 shows a synthesized message;

FIG. 75 shows an example of a responsive sentence;

FIG. 78 is a block diagram of the storage section;

FIG. 79 is a diagram showing an example of data storage in the program storage section;

FIG. 85 is a flowchart for the operation of the fifth embodiment;

FIG. 87 is a flowchart for the operation of the fifth embodiment;

DETAILED DESCRIPTION OF THE PREFERRED EMBODIMENTS

Referring to the accompanying drawings, embodiments of the present invention will be explained.

Figure 1:
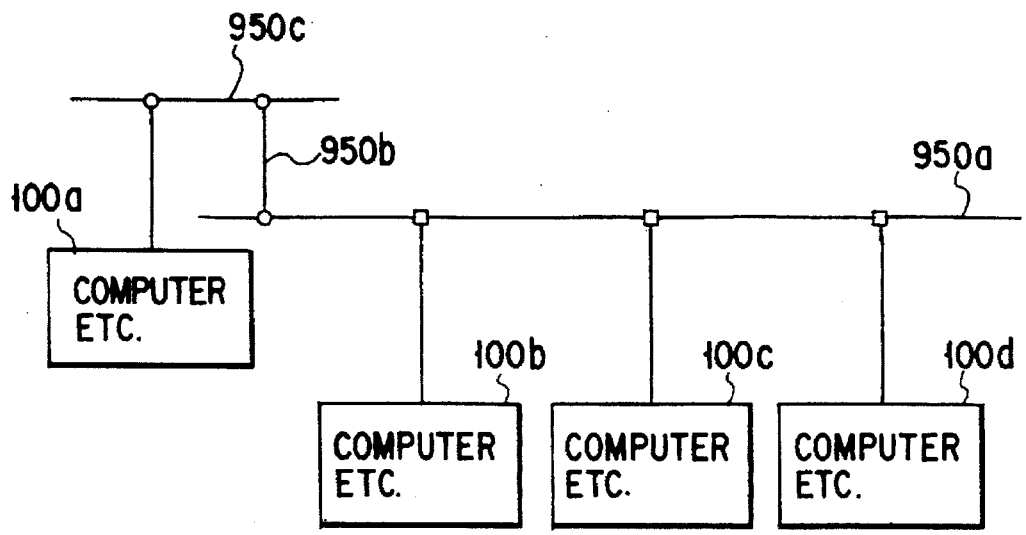
FIG. 1 is a block diagram showing the computer network structure of a human interface system according to a first embodiment of the present invention.

FIG. 1 shows a computer network structure of a human interface system according to a first embodiment of the present invention. In the computer network of FIG. 1, computers 100a through 100d, such as work stations or personal computers, are connected to each other through local networks 900a and 900c and a wide network 900b or the like. These networks 900a through 900c enable the individual computers 100a through 100d to exchange data with each other.

Figure 2:
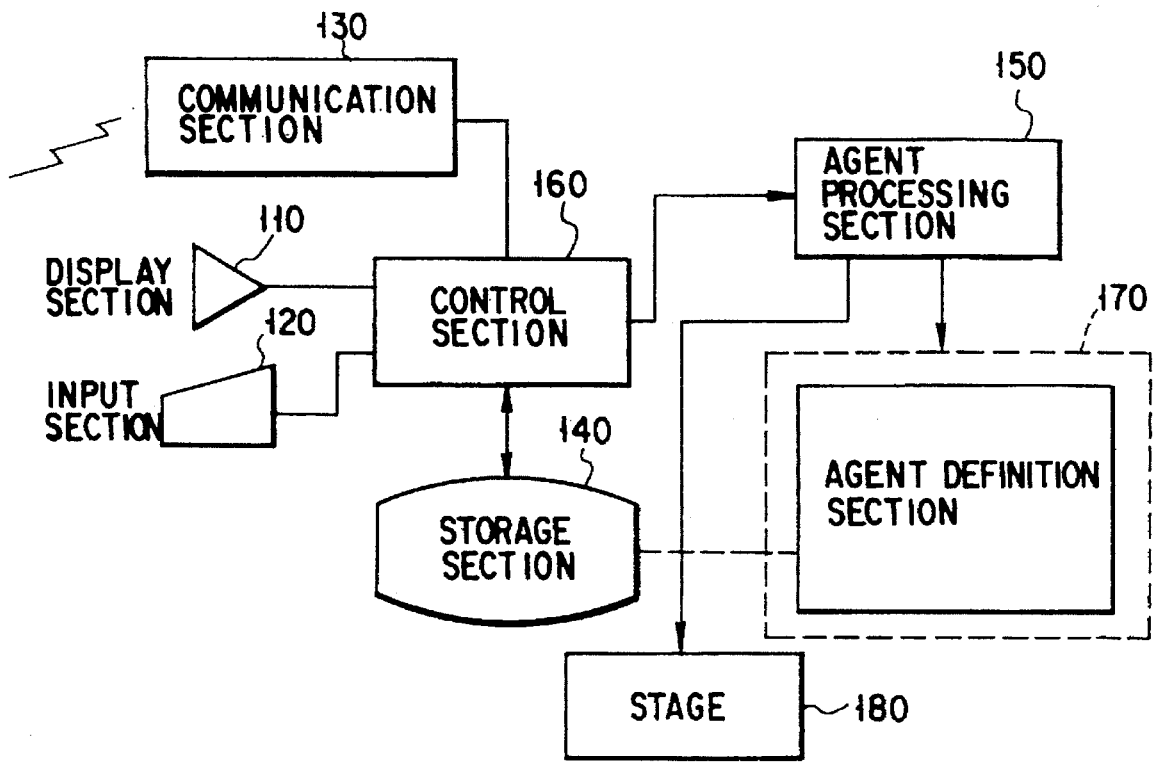
FIG. 2 is a schematic diagram of a computer according to the first embodiment of the present invention.

FIG. 2 is a concrete block diagram of a computer in the first embodiment.

In FIG. 2, a display section 110 is a display unit or the like. An input section 120 is an input unit, such as a keyboard and a mouse from which the user enters characters or commands, a panel screen from which the user enters pointing information on position. A communication section 130 inputs and outputs data from and to another network. A storage section 140 is a storage unit such as a disk. An agent processing section 150 supports agent programming. A control section 160 allows the display section 110 to control the agent processing section 150.

An agent program will be explained.

An agent defining section 170 and a stage 180 execute an agent program.

The agent defining section 170, which is provided in the storage section 140, is capable of defining various agents (programs). An agent is composed of a model section, a view section, and a control section, as normally defined. The model section defines the internal state and operation of the agent. The view section stores information on the display of the agent. The control section contains the descriptions of the processing corresponding to operation of a mouse serving as an input device.

The agent, receiving data called a message from the outside, carries out a process according to the data received. The agent, if necessary, sends messages to other agents. When an agent start message is sent to the agent processing section 150 via the input section 120 or the communication section 130, the agent processing section 150 starts an agent. Starting agent means creating an instance at stage 180 or its executing place, based on the definition of agent.

In describing the agent, it is possible to use classes introduced in normal object-oriented languages, their methods, and successional data. The user can send a message to an agent via the input section 120 (such as a keyboard or a mouse). The agent can present information to the user via the display section 110. The agent can perform execution at stage 180 not only on a computer having the definition of the agent, but also on any other computer. In this case, data transmission and reception is carried out via the communication section 130. It is possible to transfer or copy the agent from one stage 180 to another stage 180.

Figure 3:
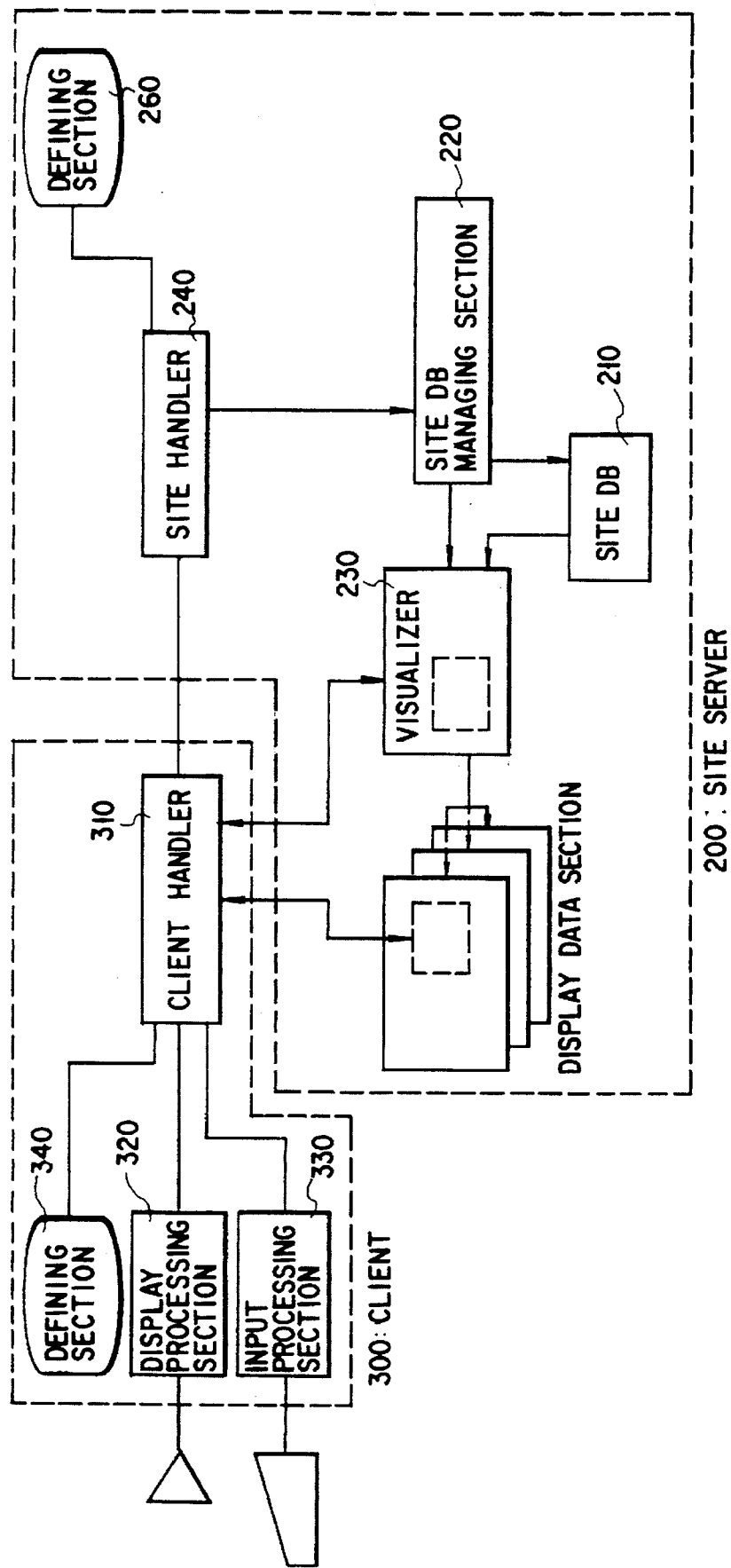
FIG. 3 is a diagram showing a basic construction of site server and a client.

FIG. 3 shows a basic construction of a site server 200 and a client 300 in the first embodiment of the present invention.

In this configuration, a site server 200 contains a site DB 210, a site DB managing section 220, a visualizer 230, a site handler 240, a display data section 250, and a site agent defining section 260. The client 300 contains a client handler 310, a display processing section 320, an input control section 330, and a client agent defining section 340.

The site DB 210 stores messages sent from various agents.

The site DB managing section 220 manages virtual sites. Specifically, the site DB managing section 220 performs processes including the creating, updating, and deleting of agents in the site DB 210, as well as stores the state of the site DB 210 in the storage section 140.

The visualizer 230 reads out display information on each agent from the site DB managing section 21 and builds screen display data.

The site handler 240 reads out a definition of the virtual site specified by the user from the site agent defining section 260 and performs processes including transmitting a message to create an agent to be put in a virtual site to the site DB managing section 220.

The display data section 250 displays the screen display data built at the visualizer 230.

The site agent defining section 260 stores a definition of the virtual site specified by the user.

The client handler 310, receiving the user's view-specifying information via the input processing section 330, performs processes including requesting the display area information in the view-specifying information of the visualizer 230.

The component elements 210 through 260 of the site server 200 and the component elements 310 through 340 of the client 300 can be basically defined as agents. These components' parts may be placed in either the client 300 or the site server 200. For example, the client handler 310 may be placed in the site server 200. When the processing load at the client 300 exceeds a specified value owing to the load condition and hardware limitations (including storage size and CPU speed) on client 300, the arrangement of the agent may be modified dynamically. Message exchange is achieved via a network between agents operating at the stage 180 in client 300 and the stage 180 in site server 200.

Each component part and its operation will be explained.

Figure 4:
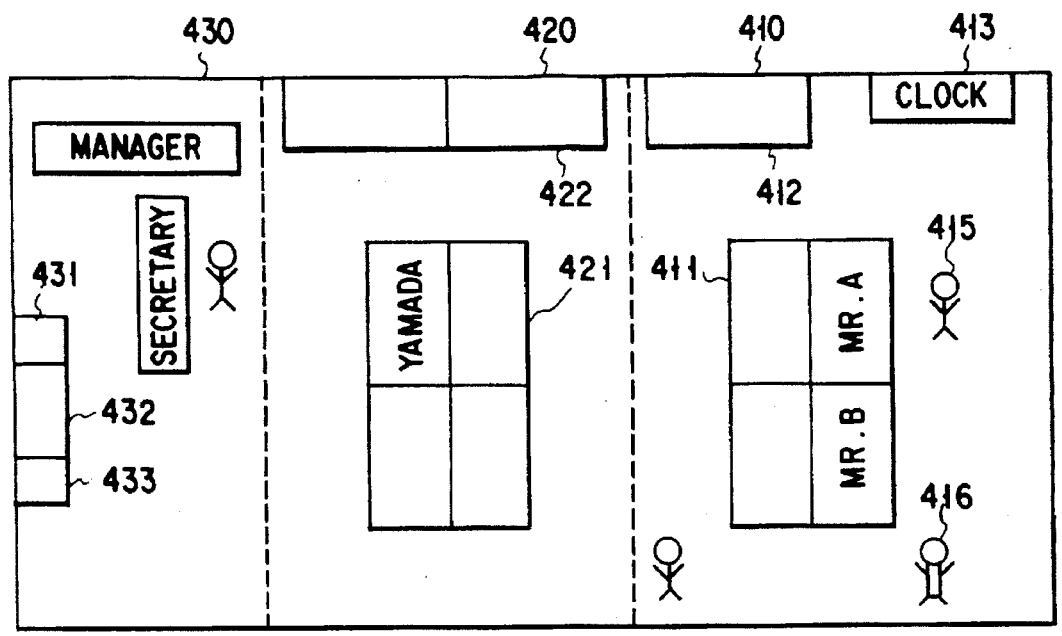
FIG. 4 is a conceptual diagram visualizing the structure of a virtual site.

FIG. 4 is a conceptual diagram visualizing the structure of a virtual site used in the first embodiment.

In FIG. 4, an entire site corresponds to a department. The site has three rooms in it: the 1st section 410, the 2nd section 420, and the manager's office 430. The 1st section 410 is furnished with a desk 411, a file cabinet 412, and a clock 413; the 2nd section is furnished with a desk 421 and a file cabinet 422; and the manager's office 430 is furnished with a tool box 431, a form box 432, and a job agent box 433. The tool box 431 has various tools in it. In the site, there are also an agent 415 called a person corresponding to a man and a site agent (not shown) deals with questions as to the entire site. In practice, these individual elements are defined in site DB 210.

Figure 5:
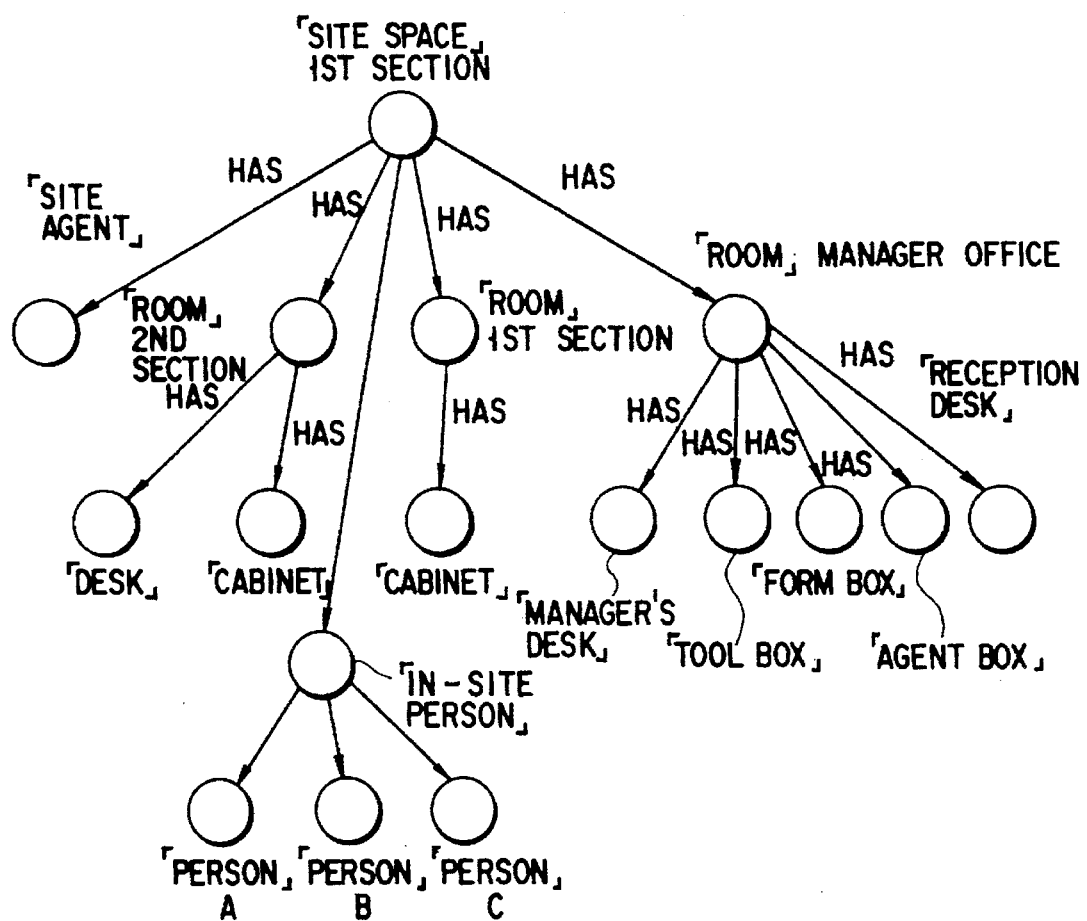
FIG. 5 is a diagram showing the structure of each agent in site DB.

FIG. 5 shows the structure of each agent in site DB 210 in the present embodiment.

In FIG. 5, an element indicated by ○ corresponds to an agent. The name in ⌈ ⌋ assigned to ○ is the name of the class indicating the agent. A name directly written is the name of the instance of the agent. Arcs connecting between agents show how agents are connected to one another. An arc means that the following facts are retained in the form of data: the fact that the agent at the leading end of the arc is entered in the list of agents to whom messages can be sent, and the fact that there is the relationship indicated by the name of the ark between two agents. "HAS" and "IN" arcs represent a space positional inclusion relationship between virtual sites in the agent: the agent at the trailing end of the arc specially includes the agent at the leading end of the ark. "HAS" basically indicates an agent statistically positioned and "IN" denotes an agent dynamically positioned.

SITE SPACE AGENT is an agent having the following internal state, method, and view:

Internal state: a list of names and agents (dynamically related agents, agents in the site, and other agents)

Method: display, entry, deletion, modification, provision of information

View: view 1 (two-dimensional model), view 2 (three-dimensional model), view 3 (image)

A room agent is an agent having the following internal state, method, and view:

Internal state: a list of names and agents (agents in the room and the other agents)

Method: display, entry, deletion, modification, provision of information

View: view 1 (two-dimensional model), view 2 (three-dimensional model), view 3 (image)

The name of an agent is stored in NAME of the internal state, and IDs of agents having the above inclusion relationship (by which, the instances of the individual agents can be identified uniquely) are stored in the agent list. In the method field, the operation on the agent and definitions (corresponding to programs) of processing operations, including DISPLAY, ENTRY, and DELETE, are written. In the VIEW field, display information items are written to cope with display modes; there are three types available here: two-dimensional display (plan-view representation), three-dimensional display (elevational-view representation), and image display. Definitions of the other agents will be explained later as the occasion demands. A virtual site as shown in FIG. 5 is managed by the site DB managing section 220.

These processes are started by a message sent from site handler 240 or messages sent from various agents in the site DB 210. The site DB managing section 220 itself is generated by the site handler 240. (This is similar to the start of a normal agent.)

The generation of an agent is carried out as follows.

The name of a class or the defined form of an agent, the settings of the internal state, the ID of an agent in the site where the agent is to be located, and a message to generate an agent of generation position information, are sent from the site handler 240 to the site DB managing section 220. The site DB managing section 220 requests a processing system (not shown) to generate an instance in the specified class in the process of generating instances. The processing system generates an instance at stage 180 and notifies site DB managing section 220 of the generated instance. The site DB managing section 220 produces a channel between itself and the generated instance. Further, the instant ID and the generation position information generated together with a "locate" message are sent to an agent having the ID of an agent in a site where the agent is to be located. An agent who has received a message from site DB managing section 220, produces a message channel between itself and the site DB managing section 220.

The deleting of an agent is achieved as follows.

When a "delete" message is sent to an agent to be deleted, the agent sends a "delete-ready?" message to all message channels. Each agent which has received the "delete-ready?" message, performs the necessary processes, and if necessary, carries out the specified processing of the agent to be deleted. The agent to be deleted waits until "delete-accept" messages from all corresponding agents have arrived. When all the messages have arrived, the agent sends a "IAmDeleted" message to all message channels and issues an instruction to delete itself to the processing system (not sown). This deletes the agent from stage 180.

Updating agents is done by sending messages to agents basically the same manner as the delete process.

A method of displaying the contents of site DB 210 on the display unit at client 300 will be explained. The display process is carried out by the visualizer 230, display data section 250, client handler 310, and display processing section 320 cooperating with each other. The display process is performed at the time when a virtual site is generated (in the initializing stage) or when the display has to be modified owing to a change in the state of site DB 210.

In the initializing stage, the user specifies the generation of the site handler 240, which then creates the site DB managing section 220. The site handler 240 takes out definition of the virtual site specified by the user from the site agent defining section 260, sends a message to create agents to be put sequentially in the virtual site, and creates each agent in site DB 210. After all the initial agents have been created, the site DB managing section 220 creates the visualizer 230 (agent). The visualizer 230 takes out display information on each agent and constructs screen display data in the display data section 250. In the first embodiment, a plurality of display data areas are formed so as to permit a single site DB 210 to have more than one display mode.

Taking a case of representation in a two-dimensional plane as an example, the operations of various elements will be explained.

Part of view information on an agent in site DB 210 (written in the view area in the agent) will be shown below.

"Site Space": 10 {(Name=the first department Two-dimensional view:
  Shape: rectangle (height=80, length=130, boundary= (solid line, 3, black), inside=(mesh 1, gray
  Three-dimensional view: . . . }

"Room": 11 {(Name=the first section Two-dimensional view:
  Shape: rectangle (height=80, length=40, boundary= (dotted line 1, 1, black), inside=(transparent relative position='0, 40'
  Three-dimensional view: . . . }

"File Cabinet": 14 {(Name=the first section file cabinet Two-dimensional view:
  Shape: 'File cabinet image' ("the first section") Relative position=(0, 20)
  Three-dimensional view: . . . }

"Desk": 15 {(Name=Yamada desk Two-dimensional view:
  Shape: desk visual image ("Yamada")
  Relative position=(30, 15)
  Three-dimensional view: . . . }

In the "Site Space" representing the entire site, a rectangle is specified for the shape of a two-dimensional view. For the parameters of the rectangle, the height, the length, the rectangle's boundary line (type, width, and color of the line), and the rectangle inside (a painted pattern, color) are defined. In the two-dimensional view in "Room," a relative position is defined in addition to the shape definition. This information determines where the Room is placed in the two-dimensional shape in the Site Space directly containing the area of the "Room." For the shape of the cabinet, file 'cabinet image' ("The First Section") is specified. This, not shown here, indicates image data whose shape is such that the characters "The First Section" is overwritten at the center of the image data shaped like a file cabinet pattern 10 high and 20 long. Similarly, the second view in "Desk" also represents image data.

FIG. 6 shows an example of a file cabinet and a desk.

The visualizer 230, after an agent has been generated, sends a two-dimensional message "Send2DViews(0)" to the site space agent. The (0) in the message is a value called a display level and is used in processing the hierarchical relations in display. Receiving the message, each agent in site DB 210 sends its ID, the received display level, its two-dimensional view to the calling party of the message. At the same time, each agent sends a message "Send2DViews" (the received display level +1) to the agents to which its message channels are connected under the "has" relationship, and then sends its return message (ID, display level, two-dimensional view) to the calling party of the message. Next, the agents to which the message channel connected under the "in" relationship are processed in a similar manner.

By doing this, the visualizer 230 collects the two-dimensional view information on all the agents in site DB 210 and their display information. These pieces of two-dimensional information are retained as information on the inside of the visualizer 230.

There are roughly two methods of displaying the site state on the screen in client 300 on the basis of the above information. One method is to cause client 300 to take in these pieces of two-dimensional view information and to display them on the actual screen there. The other method is to cause the visualizer 230 to create the image data for screen display in the display data section 250 and send the image information to the display processing section 320 of the client 300 via client handler 310. With the former method, it is possible to select a display mode according to the user's request at client 300, or to set a display level independently at client 300. The latter method has the advantage that the load at client 300 becomes lighter because one display process is carried out on the side of visualizer 230.

An example of image display on the side of visualizer 230 will be explained.

The two-dimensional view information collected by visualizer 230 takes the form of display images of agents overlapping with each other. The visualizer 230 reserves a display area for retaining the display images of sites in the display data section 250. This area, which is similar to an ordinary screen display buffer, is shared by more than one client 300 via a network. The visualizer 230 checks up on the collected two-dimensional view information and writes it in the display area, starting at a piece of two-dimensional information of lower display level. By doing this, the image information at site DB 210 in the above example is set in the display area (shown in FIG. 7).

The operation of displaying the image information set in the display area on the screen at client 300 will be explained. The processes related to client 300 are basically carried out by the handler agent at client 300.

The handler agent at client 300, which is generated by site handler 240, reconizes the ID of the visualizer agent from site handler 240 and reserves a message channel to visualizer 230. The client handler 310 receives the user's view specifying information (a two-dimensional view, in this case) via the input processing section 330, and requests of visualizer 230 information on the display area which contains the view. This request is sent to visualizer 230, which returns the address of the display area for two-dimensional view and the size information to client handler 310. The client handler 310 sets an area value covering the entire display area in a display area defining variable indicating which part of the display area is to be displayed, and then makes a display request to the display processing section 320. The display processing section 320 displays on the display unit the display image of the range indicated by the display area defining numbers at client handler 310 in the display area corresponding to the two-dimensional view.

The pointing by the user and the selection of various commands will be explained.

The pointing by the user is achieved by a pointing device such as a mouse in a manner that moving the mouse cursor. When the user operates the mouse, such as presses the mouse button, at a particular position on the display at the virtual site, the input control section 330 senses the coordinates of the position and informs client handler 310 of the user's event (for example, the mouse button being pressed). The client handler 310 calculates the coordinates of the display data section 250 from the value of the display area defining area and the values of the mouse coordinates, and sends the resulting values together with a "GetAgents" message to visualizer 230. The visualizer 230 obtains agents at the coordinates, and sends their IDs and their display level information to client handler 310. The client handler 310 selects one agent from these agents (normally, an agent of the highest display level), and makes a request via site handler 240 to inform the agent of the user's event, whereby the message is reported to the desired agent.

By such processes, the event entered by the user at the input section 120 is transmitted to the agent in site DB 210. When more than one agent exists at the position specified by the user, client handler 310 may deal with their competition. For example, in a case where a telephone is on a desk and their display level is the same, when the user specifies the position of the telephone and presses the mouse button, the client handler 310 first creates a display for selection of one of the two on the screen and the user can specify the specified agent by moving the mouse to the two display areas.

The movement in connection with the display of an agent will be explained.

The display position of an agent is retained in the form of internal information on agents in site DB 210. The user can communicate with the agent in the method described above and send positional moving commands to the agent. When the positional information on the agent is updated, each agent issues a display modify request to visualizer 230. The visualizer 230 moves the agents that have made moving requests, computes the display areas for the agents that require rewriting on the screen as a result of the movement, and rewrites a display portion of the display buffer.

The person agent will be explained.

Person agents, which are in the virtual site, are characterized by having the mapping relationship with actual human beings. Further, the person agent is a type of agent and has the following information as internal information:

At least one home site ID and one home agent ID

A current site ID and positional information in the current site

Various pieces of personal information (name, post, address, phone number, user's identifier)

View information

Status information

Site hysteresis information

The home site is the ID of the initial value site of the person and can have more than one site ID. The home agent ID is an agent that the person has. Normally, a desk agent corresponds to a home agent ID. In this embodiment, the home agent is called a "personal desk." The personal desk not only serves as a person's working environment, but also retains a method of accessing a person. In this embodiment, the method of accessing a person is expressed by the current site ID and the person agent ID themselves. The current side ID is the ID of the virtual site where the person has visited at that time. The positional information at the current site is information indicating the position of the agent in the site explained above. The various pieces of personal information include various pieces of information corresponding to the person, including the name, the post, the address, and the phone number. The view information is information on the view of the agent. The status information includes various pieces of information indicating the states of the person, which will be explained later. The personal desk holds the person's ID, the person's current site ID, the person's status information, the view information, and links to various working agents.

The procedure followed by the user in starting the computer will be explained in connection with the virtual site and the person.

When no computer is used, the person exists in site DB 210 in the home site, and its status is "not-login." When the user has followed the normal computer starting procedure, various common processes, including the input, display, and communication processes, are generated. After this, a generation request of client handler 310, together with the user identifier, is sent to site handler 240. The site handler 240, using the user identifier as a key, retrieves a person agent in site DB 210 and informs the client handler 310 of the ID of the person agent. The client 300 server performs the process of displaying the state of the site on the screen. The client handler 310 sends a message to change the status of the person agent to "login" to the person agent via site DB 210. The person agent, receiving the message, sends a display update message to the visualizer 230 in order to change its view display mode from "not-login" to "login."

By the above operation, the display state of the person agent at the display section is changed, whereby the other users understand that the user corresponding to this person has begun using the computer.

The movement of the person between virtual sites will be explained. Moving from a virtual site A to another virtual site B is achieved using the ID of virtual site B at the destination.

The operation of the above two virtual sites will be explained. Site A at the starting point, receiving a site movement request for a person (including the movement site ID), makes person reference to the site server 200 with the ID. The person reference is the process of requesting person information necessary to check for movement of the server at site B, getting the requested information from the person, sending it to site server 200 at site B, and inquiring whether movement is possible or not. When person reference is successful, the starting-point server transfers the person agent to the destination server and deletes the person agent from its own site. The destination site server 200 enters the received person agent in its own site DB 210.

For the person to move, the virtual site's ID is necessary. Methods of obtaining the virtual site's ID will be explained.

A first method is to get information from the current site where the person is.

As shown in FIG. 8, a company organization or the like is defined as a plurality of virtual sites connected in a network. For arcs in the network, two virtual site-related names can be defined. For example, in FIG. 8, COMPANY, GUARD, RECEPTION, DEPARTMENT 1, DEPARTMENT 2, and LIBRARY are connected under the relationship of "is-section-of", which is the inclusion relationship in the organization. DEPARTMENT 1, DEPARTMENT 2, LIBRARY, and RECEPTION are connected under the relationship "is-neighbor-of." The connection-related names, the other party's site names, and IDs of them are stored as the other site link information in the model section of each virtual site agent. This information is called site link information, and sites connected to each other are called adjacent sites. This site link information enables the person to take out information on the virtual sites connected to the current site.

A second method is to allow the person itself to store information on the virtual site.

Under instructions from the user, the name of the virtual site and its ID can be stored in the person and the information (called personal site information) be retrieved as required. By taking in usually coming and going sites into the person in the form of information, operations such as following more than one virtual site can be simplified. By storing a person's name and his home agent's ID (called personal person information), not the virtual site, the site where an individual is can be retrieved. Further, the person holds information called site hysteresis information. The site hysteresis information is a combination of the virtual site's name and ID and contains the hysteresis of the sites (except for the home site) which the person has visited.

A third method of identifying sites according to a phone number.

The user enters a specific phone number, which is used as a key to retrieve the site ID. A phone number agent is prepared which has a function to take out the site's ID from the phone number. The phone number agent has a table with the ID of the virtual site corresponding to the phone number and returns the ID in response to requests from various agents. For the inquiry phone number as long as the area code, the ID of a virtual site representing the area (called an area site) is returned. The area site inquires about the area and acts as an intermediary in moving to virtual sites. When phone numbers inquired do not exist, the phone number agent returns the fact that the desired numbers do not exist and the area site's ID.

A fourth method is to identify sites according to a postal code number and address.

The user enters a specific postal code number and a specific address, which are used as keys to sense the site ID. With this method, a postal code number and address agent similar to a phone number agent is prepared to enable retrieving of the site ID on inquiry.

When there is no site corresponding to the address specified, the fact and the ID of a higher-level area site are returned.

A fifth method is to identify sites by inquiry using natural language.

An agent is prepared which allows the user to enter a desired place using natural language, which is then analyzed to identify the site's IDs (site uniforming agent). The site uniforming agent has the function of sensing an appropriate site ID from the character string entered by the user.

A sixth method is to move to a site in the called party in communication between persons. It is possible to get the site ID by inquiring about the current site of the other party's person.

Referring to FIGS. 9A through 14, the process of moving a person from one site to another in the above six items will be explained.

The user carries out command selection at the input section 120 to select a MOVE command. This request is transferred from the person agent to the move processing agent. The move processing agent performs processes according to the flows shown in FIGS. 9A and 9B. The move processing agent takes out the personal site information, the personal person information, the site hysteresis information, and the current site information which the person requested to move has.

Figures 10, 11, 12:
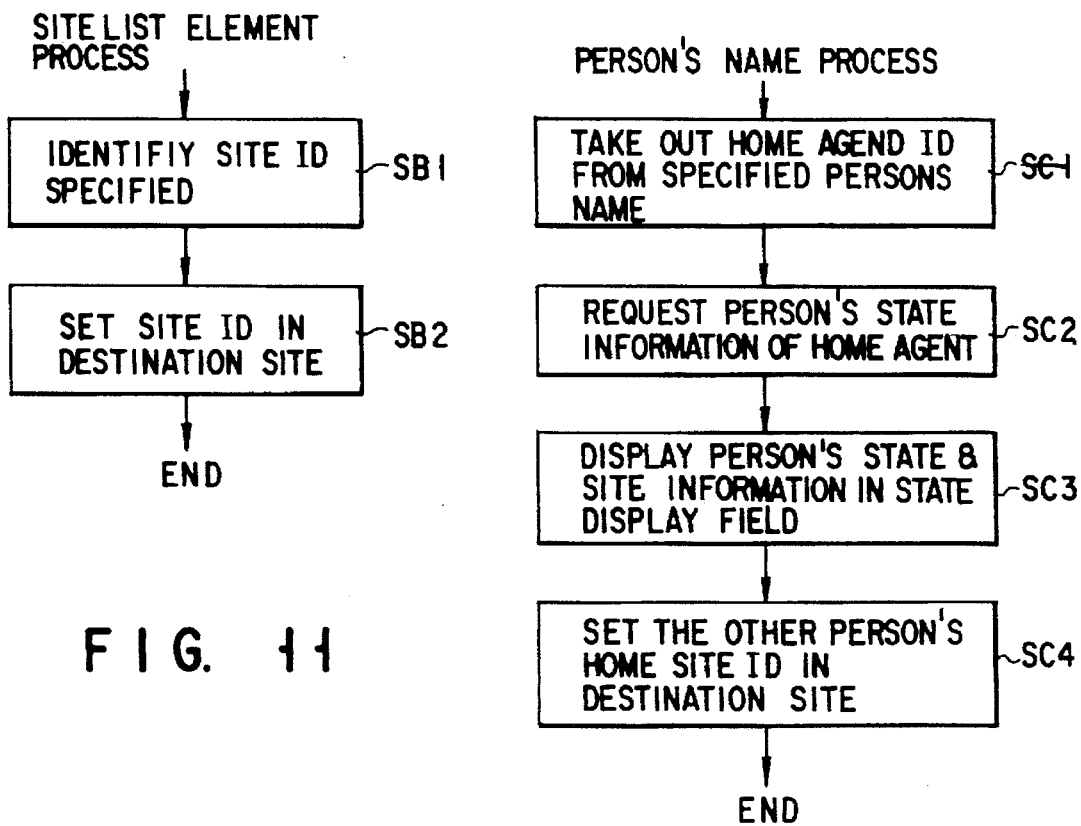
FIG. 10 is a view of a display specifying where to go.
FIG. 11 is a flowchart for site list element processing at step SA3 of FIG. 9A.
FIG. 12 is a flowchart for person's name list processing at step SA5 of FIG. 9A.

The move processing agent displays a "where-to-go setting window as shown in FIG. 10 on the user screen, and at the same time, sets the "destination site ID" to NULL, the destination site ID retaining a site ID where the person will go. The name of the current site appears at the position "PRESENT" on the display screen, and the name of a place where the person will go appears at "DESTINATION." On the site list, site names obtained from the personal site information and adjacent site names obtained from the site link information are displayed. In this case, when the person's current site is a personal site of the person, the personal site is given priority in display, for example, it is placed at the head. Otherwise, adjacent sites are given priority in display. When the current site is not the home site, however, the home site is given priority in display. At the position of the name list, names obtained from the personal information are displayed. In the "SITE HYSTERESIS," site's names are taken out from the site hysteresis information and displayed. "WHERE TO GO", "T", "TEL" are fields in which keys for retrieving the destination are to be entered. "STATE DISPLAY" is a field for displaying various messages. The move processing agent then waits for the user to enter and performs a process according to the input.

Figure 9A:
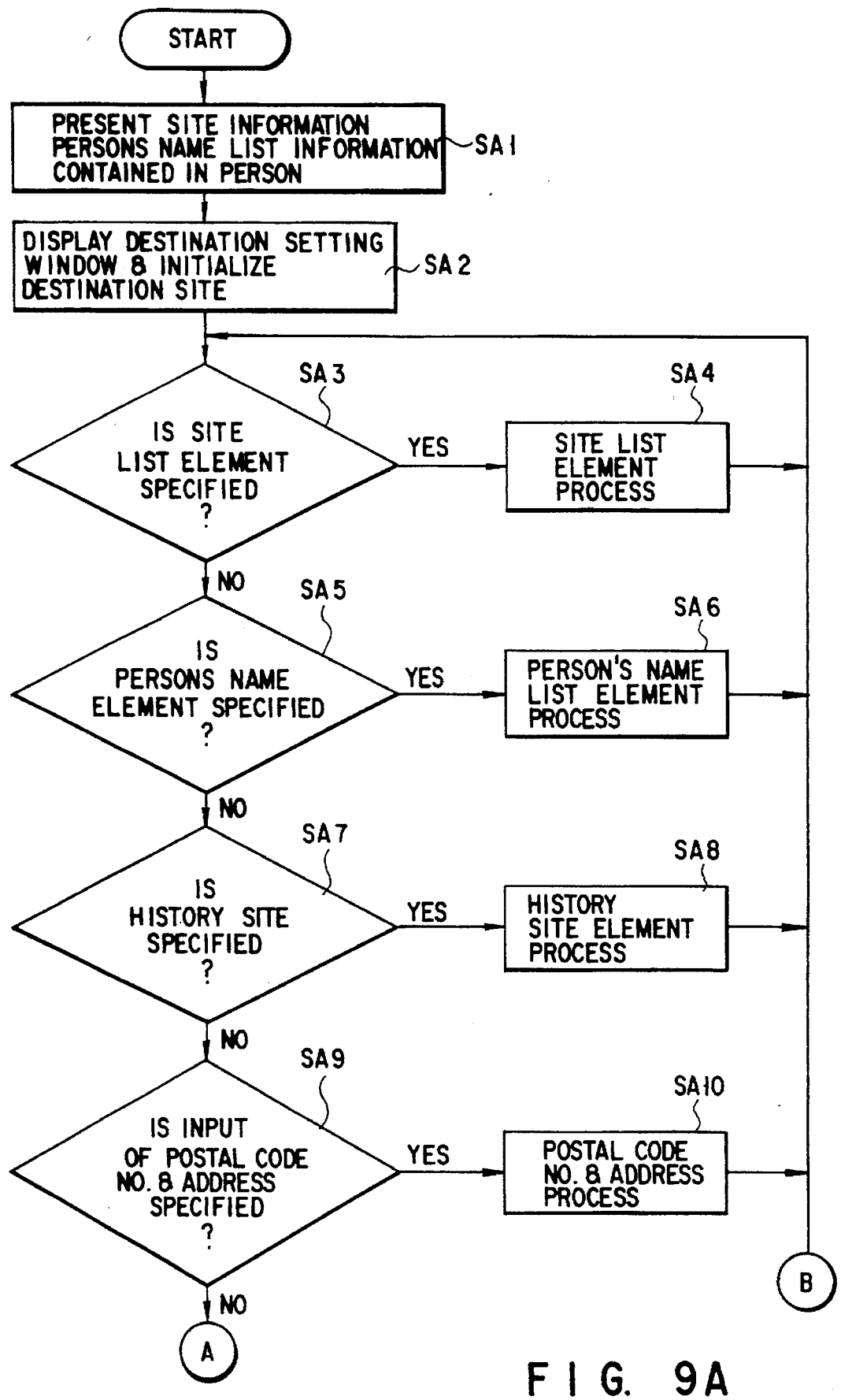
FIGS. 9A and 9B are flowcharts for person transfer processing.

At step SA3 in FIG. 9A, it is judged whether or not the user's request for a site list has been selected with means such as a mouse. If the site list is requested at step SA3, the move processing agent performs a site list element process (step SA4). FIG. 11 is a detailed flowchart for the site list element process. In the site list element process, the specified site is determined (step SB1), and the site ID is taken out and set in "DESTINATION SITE" (step SB2).

At step SA5 in FIG. 9A, it is judged whether or not the request for the name list has been selected with means such as a mouse. At step SA5, when the name list has been requested, the name list element process is carried out (step SA6). FIG. 12 is a detailed flowchart for the name list process. The home agent of the person corresponding to the specified person's name is taken out (step SC1). The information on the state of the other party's person is requested of the taken-out home agent (step SC2). The state information includes the current site information, home site information, and status (not-login, talking, busy, acceptable, free) of the other party's person. "not-login" indicates a state where the other party cannot access via the computer. "talking" indicates a state where the other party is now communicating with someone. "busy" indicates a state where communication is impossible because of busyness. "acceptable" indicates a state where direct communication should be avoided if possible. "free" means that direct communication is possible at present. The move processing agent takes out the other party's home site ID and sets the ID in "DESTINATION SITE" (steps SC3 and SC4).

At step SA7 in FIG. 9A, it is judged whether or not the user has selected an element of the site hysteresis with means such as a mouse. At step SA7, if the hysteresis site has been requested, the hysteresis site element process is performed (step SA8). At step SA8, as with the site list element process, the site ID is taken out and set in "DESTINATION SITE."

At step SA9 of FIG. 9A, it is judged whether or not the user has specified the "T" field or the "ADDRESS" field and entered data in these fields with a means such as a keyboard. At step SA9, if the "T" or the "ADDRESS" field is filled, the following postal code number and address process is carried out (step SA10). Otherwise, control proceeds to step SA11 in FIG. 9B.

FIGS. 13A through 13D are detailed flowcharts for the postal code number and address process.

By sensing the decide key on the keyboard or the execute key on the display screen, it is sensed that the user has finished entering data (step SD1). it is judged whether the user has entered data in the "T" field (step SD2). At step SD2, if the user has entered data in the "T" field, the site handler 27 retrieves the site ID using the postal code number as a key (step SD3). The operation at step SD3 is performed by receiving the postal code number and sending a message to a special agent that only returns a corresponding site ID and the address information. The agent holds a table in which more than one combination of a postal code number, a site ID, and address information is written. The site handler 27 retrieves this table. When the site handler 27 has succeeded in retrieving the table, it sends the site ID and the address information to the site DB managing section 220. When it has failed to retrieve the table, it sends a failure message to the site DB managing section 220.

It is judged whether retrieving of the postal code number is successful or not (step SD4). When the retrieving has failed, the effect that the retrieving has failed is displayed in the message field and the process is terminated (step SD5 in FIG. 13D). At step SD4, when the retrieving of the postal code number is successful, the obtained address information is displayed in the address field on the display screen (step SD6 in FIG. 13A), the obtained site ID is set in the destination site, and the process is terminated (step SD7). Although not described in the above process, the name of the site ID is retrieved (an inquiry is made of the site) and the name is displayed in the destination field on the display screen.

At step SD2, when the user has not entered data in the "T" field, it means that he has entered data in the address field, so that retrieving is achieved with address as a key (step SD8). This retrieving process is performed by sending a message to a special agent that receives the address character string and the positional information on the current site (optional) and returns a corresponding site ID and an address character string. The agent divides the received address character string into specified units, using an address dictionary, determines elements including the administrative divisions of Japan: the prefectures plus Tokyo, Hokkaido, Osaka, and Kyoto, and accesses a data base that holds the relationship between these address keys and sites, using the obtained keys. In this case, when the positional information (the coordinates on a topography) on the current site is given, the obtained pieces of site information (IDs, and addresses) are arranged, starting with the element closest to the coordinates. The above processes are repeated.

Figure 13A:
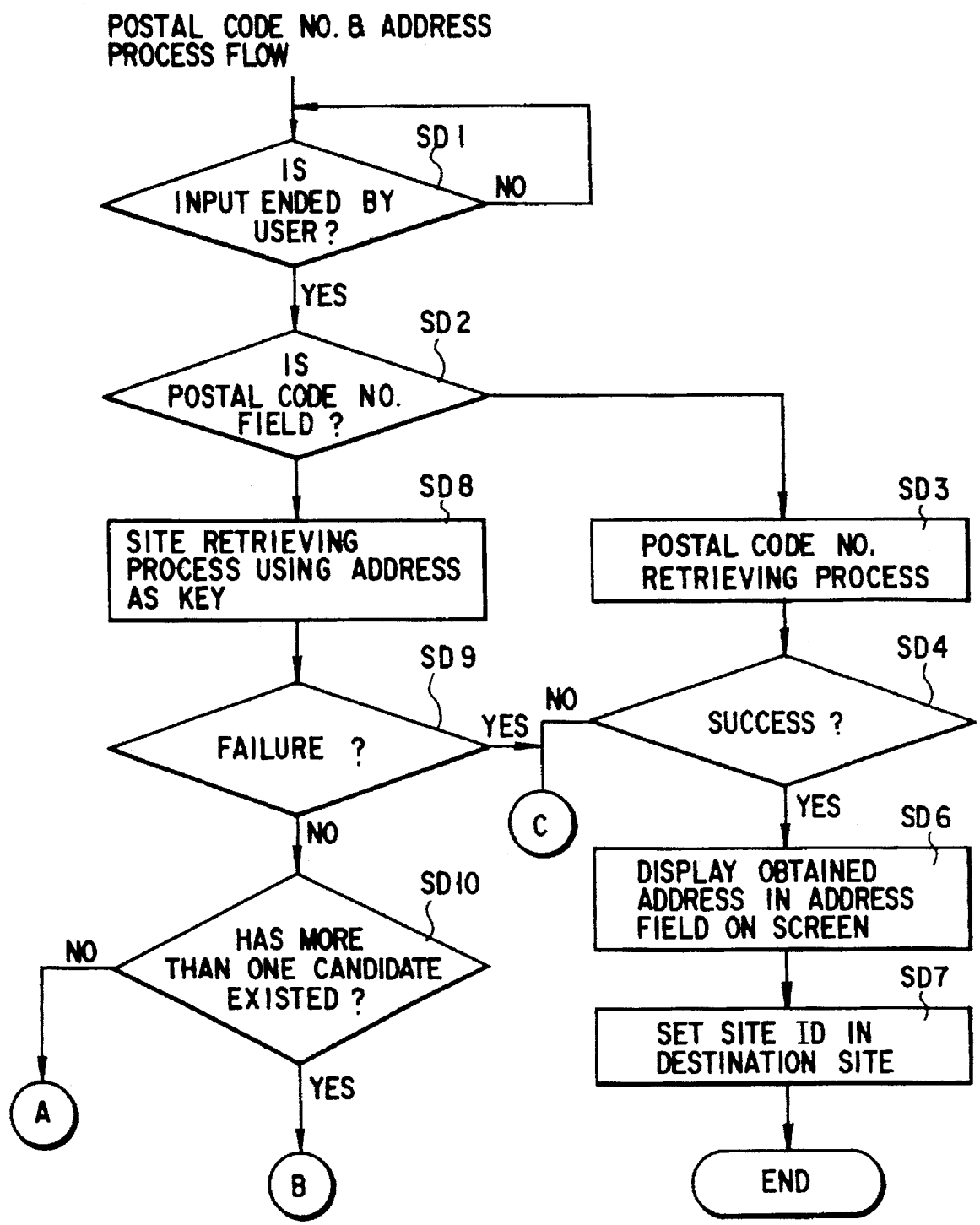
FIGS. 13A through 13D are flowcharts for postal-code number/address processing.
Figure 13B:
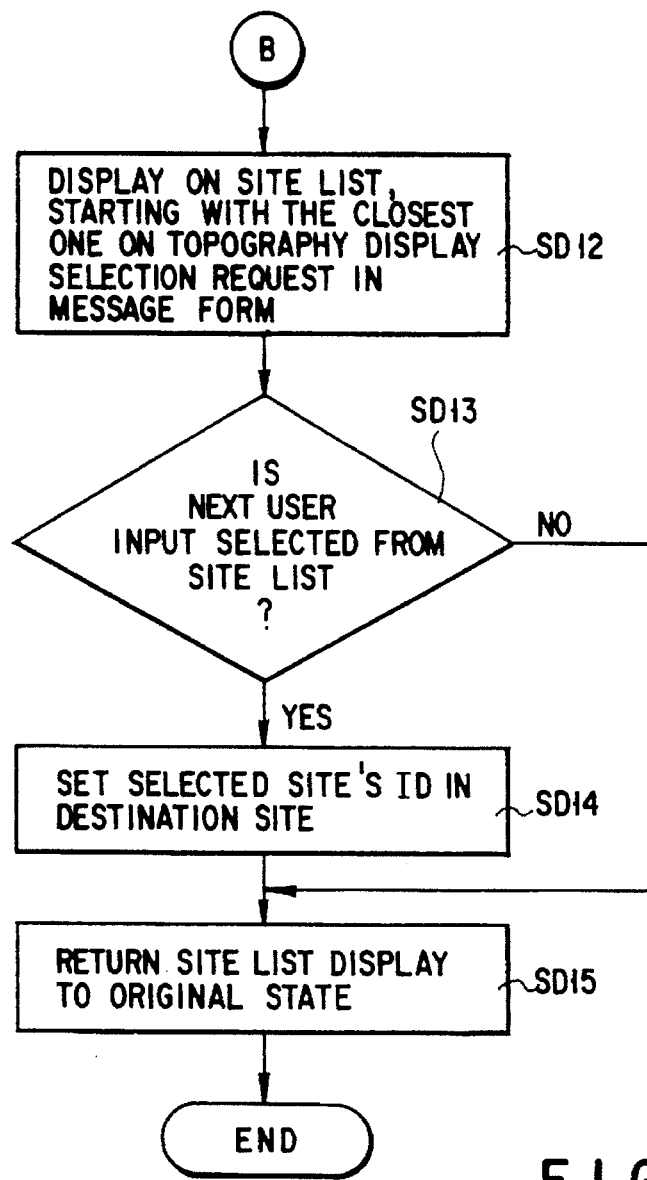
Figure 13C:
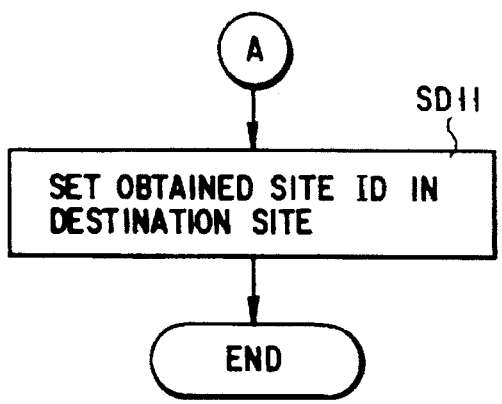
Figure 13D:
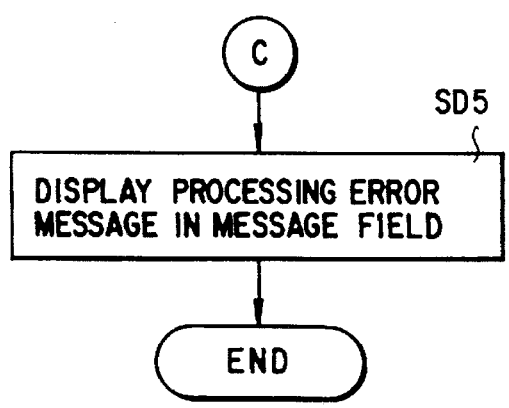

It is judged whether the retrieving at step SD8 is successful or not (step SD9). If the retrieving has failed, the process at step SD5 in FIG. 13D is performed. At step SD9, when the retrieving is successful, it is judged whether more than one piece of data has been retrieved or not (step SD10 in FIG. 13A). When one piece of data has been retrieved, the obtained site ID is set in the destination site and the process is terminated (step SD11 in FIG. 13C). At step SD10, when more than one piece of data has been retrieved, the address information is displayed in the site list on the display screen, starting at the closest site on topography (that is, in the order of pieces of data retrieved). Further, the effect that more than one candidate exists in the message area of the display screen is displayed and a message to prompt selection of a candidate is displayed (step SD12).

Next, it is judged whether the user has entered data by selecting an option from the site list (for example, selecting data using a mouse and a mouse button) (step SD13). When the user has entered data by selecting an element from the site list, the ID of the selected site is set in the destination site (step SD14). Further, the state of the site list is returned to the original display state, and the process is terminated. When judgment at step SD13 shows NO, the display of the site list is returned to the original state (step SD15), and the process is terminated.

Figure 9B:
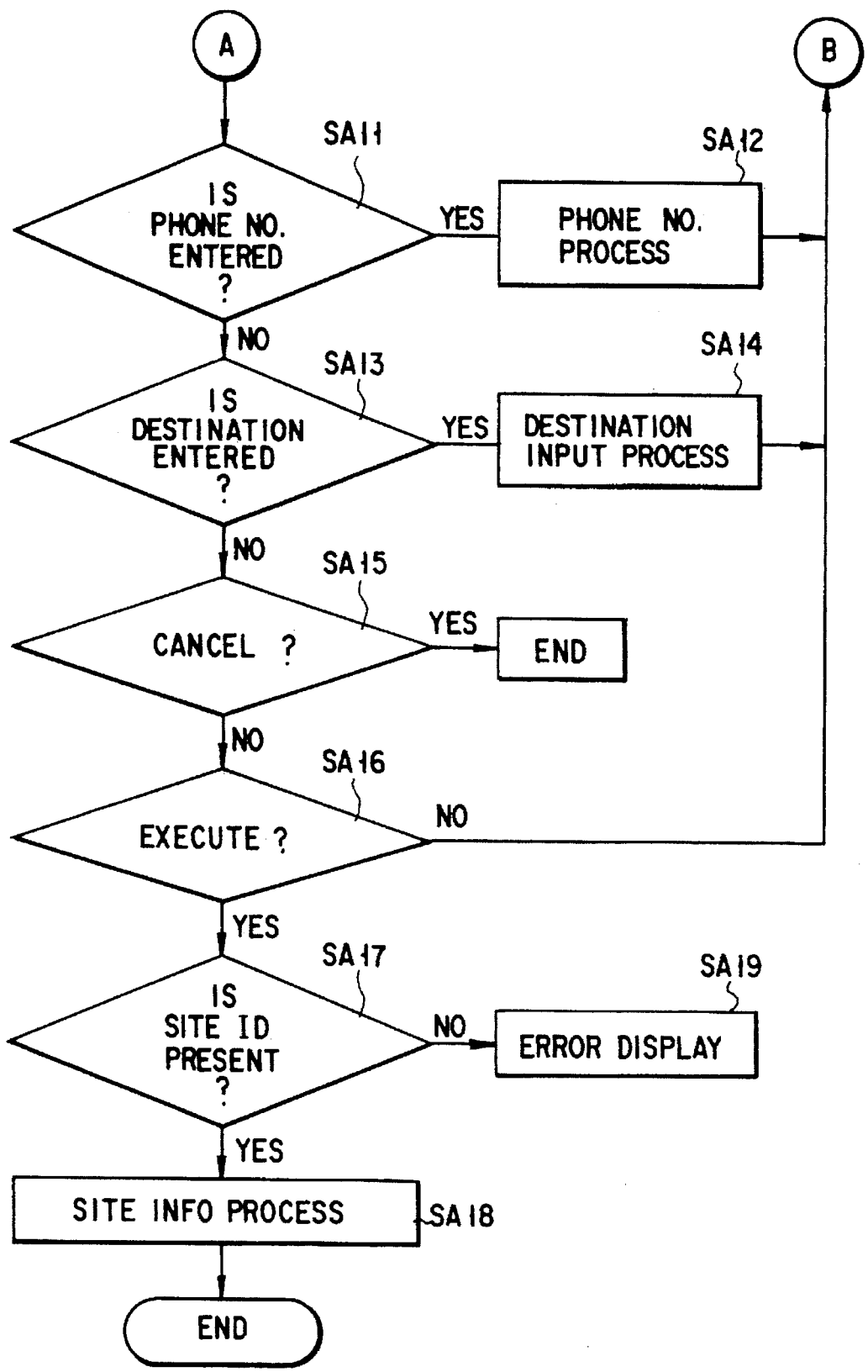

At step SA11 in FIG. 9B, it is judged whether or not the user has entered data in the phone number field. If he has entered data in the phone number field, the phone number process is performed (step SA12). The phone number process is carried out using a retrieving agent with a phone number as a key in a similar manner to the postal code number process. When the retrieving is successful, the retrieved site ID is set in the destination site.

At step SA13, it is judged whether or not data has been entered in the destination field. If true, the destination input process is performed (step SA14).

Figure 14:
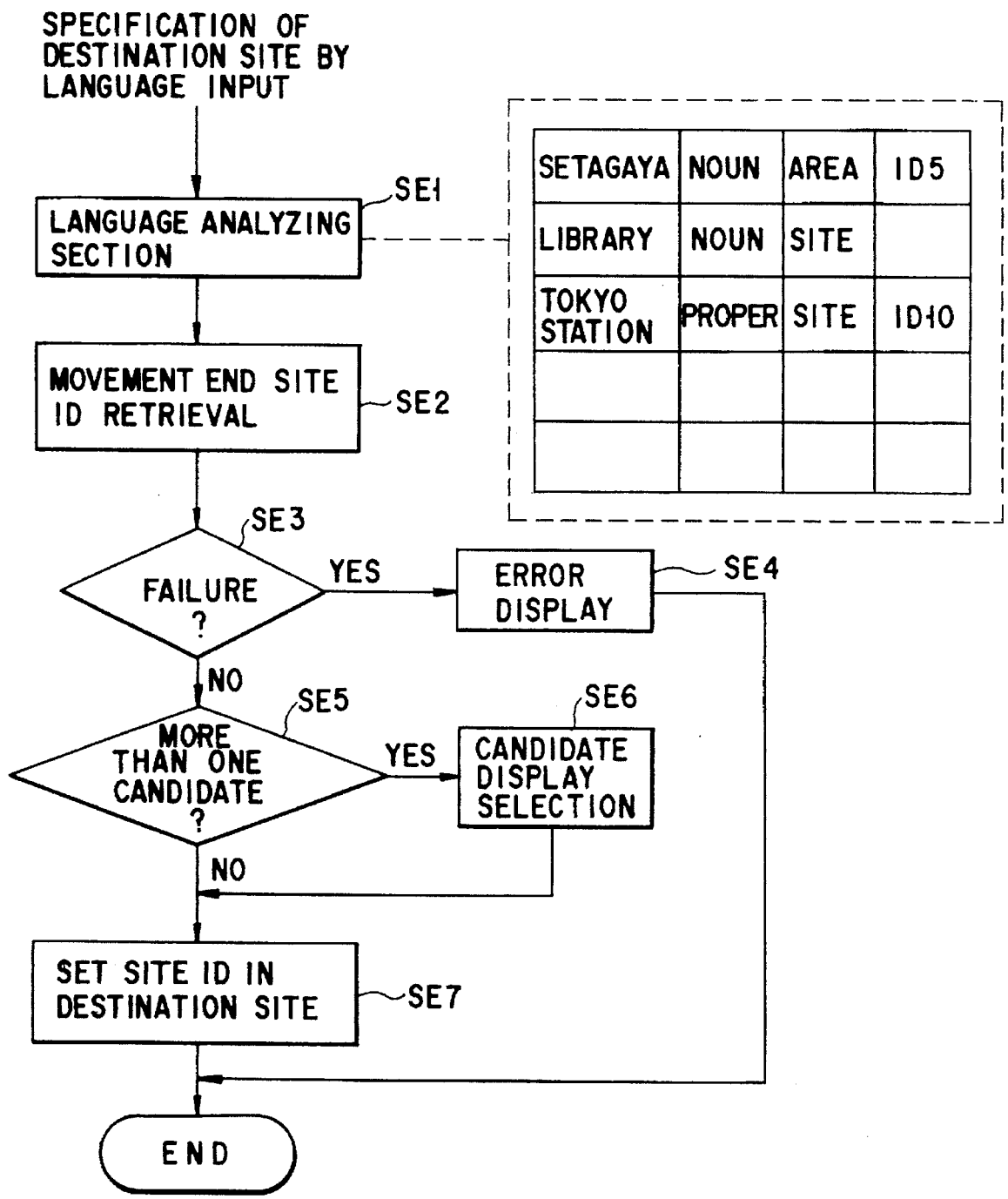
FIG. 14 is a flowchart for transfer site specifying by language input.

Referring to FIG. 14, a concrete process of the where-to-go input process at step SA14 will be explained. FIG. 14 is a flowchart for the process of specifying a where-to-go site by language entry.

The language analyzing section makes a language analysis of the character string set in the where-to-go field (step SE1). At step SE1, using a dictionary containing the site's names, parts of speech, the types of site, and the site's IDs, ordinary morphemic analysis and syntactic analysis are made. In the analysis, for example, when "Tokyo Station" is entered, it is a proper noun, and its site ID is obtained from the information in the dictionary. When "Library" is entered, the information that it is a noun indicating a site is obtained. When "Setagaya-ku no toshokan" (a library run by Setagaya Ward) is entered, the information is obtained that the area site "Setagaya-ku" (Setagaya Ward) and the site "toshokan" is connected by the case particle "no."

Based on the analyzed information obtained at step SE1, retrieving of the actual where-to-go site ID is performed (step SE2). For entry of "Tokyo Station," the site ID is already obtained, since the site ID has been retrieved from the dictionary information. For "library," it is evident from the language analysis that it is a noun representing a site, and based on this information, the site ID is retrieved. For retrieving of the site ID, a specified number of sites are retrieved, sites adjacent to the current site first, then those adjacent but one, then adjacent but two, . . . . Among them, when there is a site corresponding to "library," the site is treated as a where-to-go site. After retrieving, when there is no corresponding site, a request that the "library" site in the area should be retrieved is issued to the area site containing the current site. When there is a corresponding site, the site is treated as a where-to-go site.

For entry of "Setagaya-ku no toshokan," a request that the "library" site in the area site is issued to the "Setagaya-ku" area site, according to the definitions in the input pattern table (not shown). When there is a corresponding site, the site is treated as a where-to-go site. By this process, the site ID can be obtained from the input character string to the where-to-go field. When retrieving of the site ID has failed, the failure is sensed at step SE3 and an error is displayed on the display screen and the process is terminated (step SE4). When more than one site ID has been obtained, the candidates are presented to the user in sequence, starting at the closest one to the current site, which allows the user to select one of them (step SE6). The site ID is set in the destination site and the where-to-go input process is terminated (step SE7).

At step SA15, it is judged whether or not the cancel button is selected. If pressed, the processes related to movement are terminated.

At step SA16, it is judged whether or not the execute button is selected. If not, the processes from step SA3 are repeated. When the execute button is selected, it is judged whether or not the destination site ID has been already set at step SA17. If true, the process of moving to the site ID is executed. When the destination site has not been set, that effect is displayed on the screen at step SA19 and the processes from step SA3 are repeated.

By the above operations, the user can move from the current site to another site.

In the above embodiment, site movement by address has been explained.

In this case, a virtual site that performs a process on behalf of a certain topographical area is effective. This type of site is called an area site. Area sites are created so as to correspond to regional divisions, such as the country, the prefecture, the city, the town, etc. They are connected and constructed so as to form a hierarchical structure of area sites. As an example, the area site of Setagaya Ward (referred to as the Setagaya-ward area site) is taken. At a higher level above the Setagaya-ward area site, the area site of Tokyo Station is connected under the relationship of "is-part-of," whereas at a lower level below the Setagaya-ward area site, the area sites of each town (such as Naka town or Seta town) in Setagaya Ward are connected.

Figure 15:
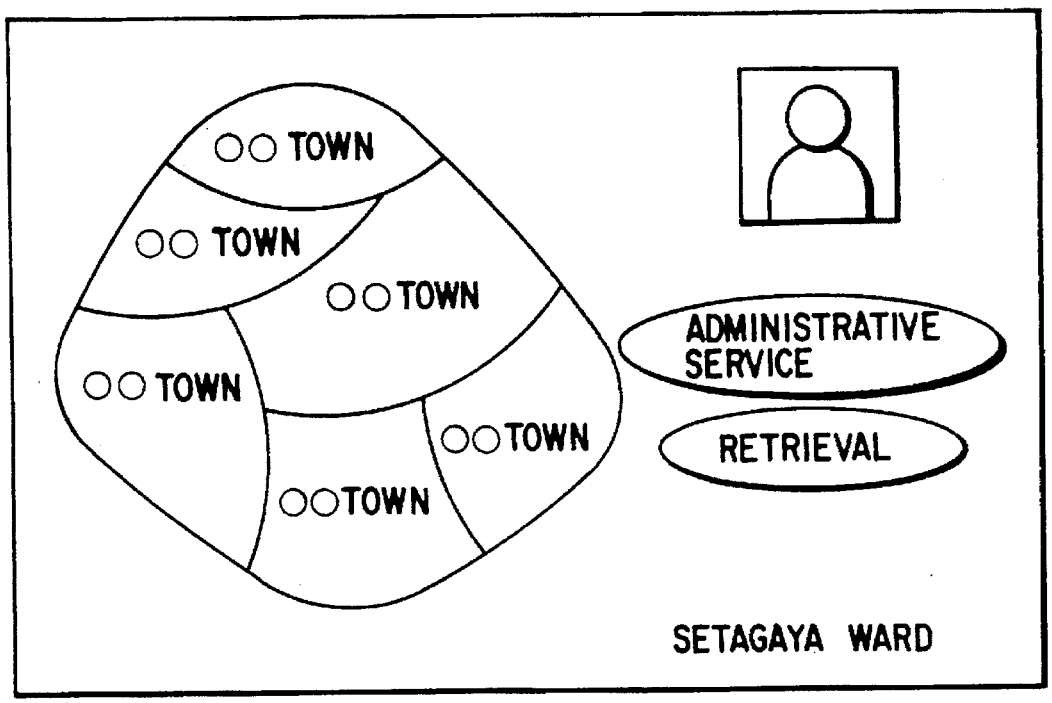
FIG. 15 is a view of an area site screen.

FIG. 15 is a view of a display screen when a move is made to the Setagaya-ward area site. On the screen, a map for Setagaya Ward is displayed. The map is divided into the lower area sites of Setagaya Ward. Further, the Setagaya-ward area site has a site agent for questioning and answering persons in the site, the site agent appearing on the screen. Buttons for starting ward's administrative services and retrieving software for information on ward are displayed. The user can move from the Setagaya-ward area site to Naka-town area at a lower level, make an inquiry about a site in Setagaya Ward, and receive services such as result display.

Various functions related to the connection between persons (agents) will be explained. The connecting process is the process of setting communication channels between persons. Here, an example of person A corresponding to a certain user A and person B corresponding to a person B will be explained.

Figure 16:
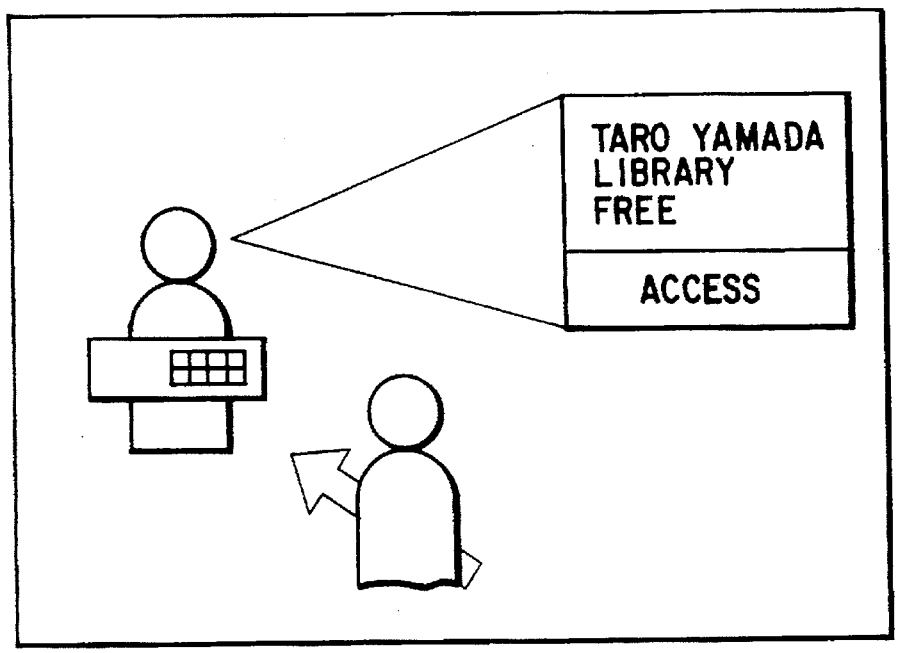
FIG. 16 is a view of an access screen to a person.

FIG. 16 is a view of an access screen to person B. In this example, the mouse cursor is moved onto the image of person B (Yamada) in site DB 210, the mouse button is pressed to display an access menu to person B. On the screen, the name of person B, the place where he is now, and the state of the other party appear. At the same time, The "ACCESS" select button appears which is used to determine whether accessing is achieved actually or not. Methods of accessing a person include a method of directly specifying a person in the site as shown in the figure, and a method of accessing a person from the person's home agent. In the latter case, the current site information on person B stored in the home agent is taken out, and message communication with the site establishes a connection with person B.

When sensing user A's access request to person B (for example, with the mouse button pressed), person A transfers to person B an access request message together with a message containing specified accessing person information. Person B, receiving this message, informs user B that person A has accessed.

Person B, depending on the information on the other party's person and its own condition, performs request arbitration processing to obtain information on person B to be presented to the other party and accessibility. In the request arbitration processing, depending on the conditions, after an inquiry is made of user B, judgment is made. The request arbitration processing, which will be explained later in detail in a second embodiment, judges degree of urgency of business relationships (superiors, colleges, subordinates, customers, good customers), personal relationships (friends, family, etc.), and the other party, and depending on the degree of urgency, creates a message to be sent to person A.

Figure 17:
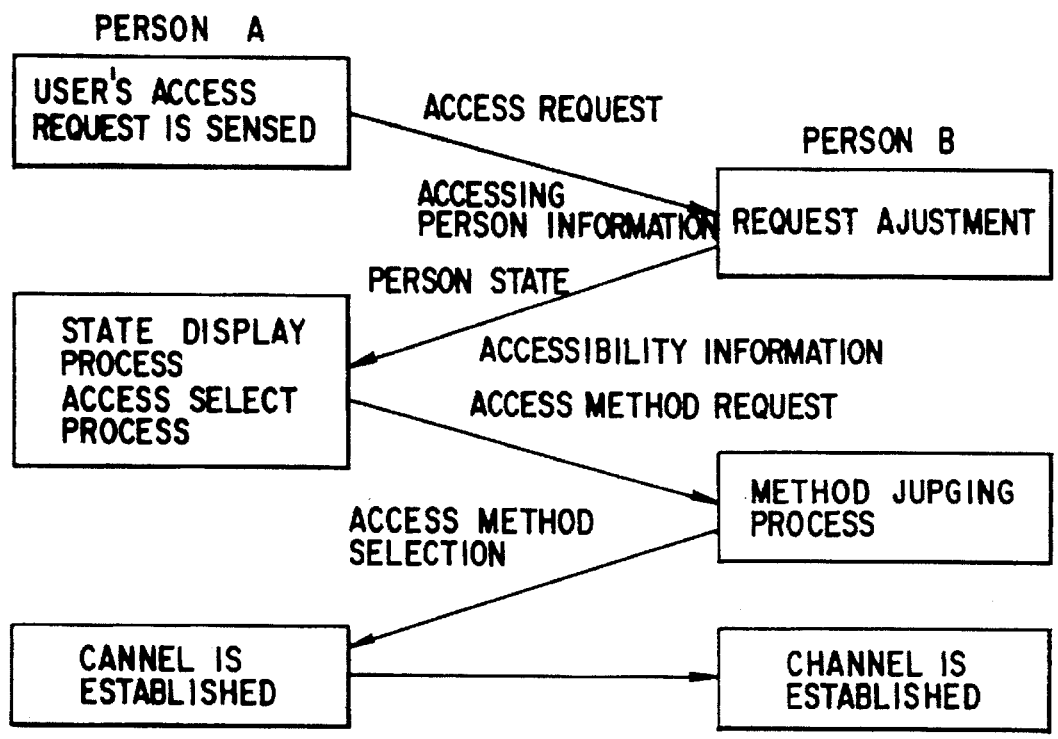
FIG. 17 is an explanatory diagram for establishment of communication channel between persons.

Person A presents to user A the person information and the accessibility information sent from person B. When the user corresponding to person A selects access to person B, person A issues to person B a request for selection of access method (moving picture channel, speech channel, text transmission channel, etc.). Person A, based on this information, performs channel connection to establish a specific communication channel between person A and person B. After the communication channel has been established, the communication display processing program is started. The relationships between the above processes are shown in FIG. 17.

Figure 18:
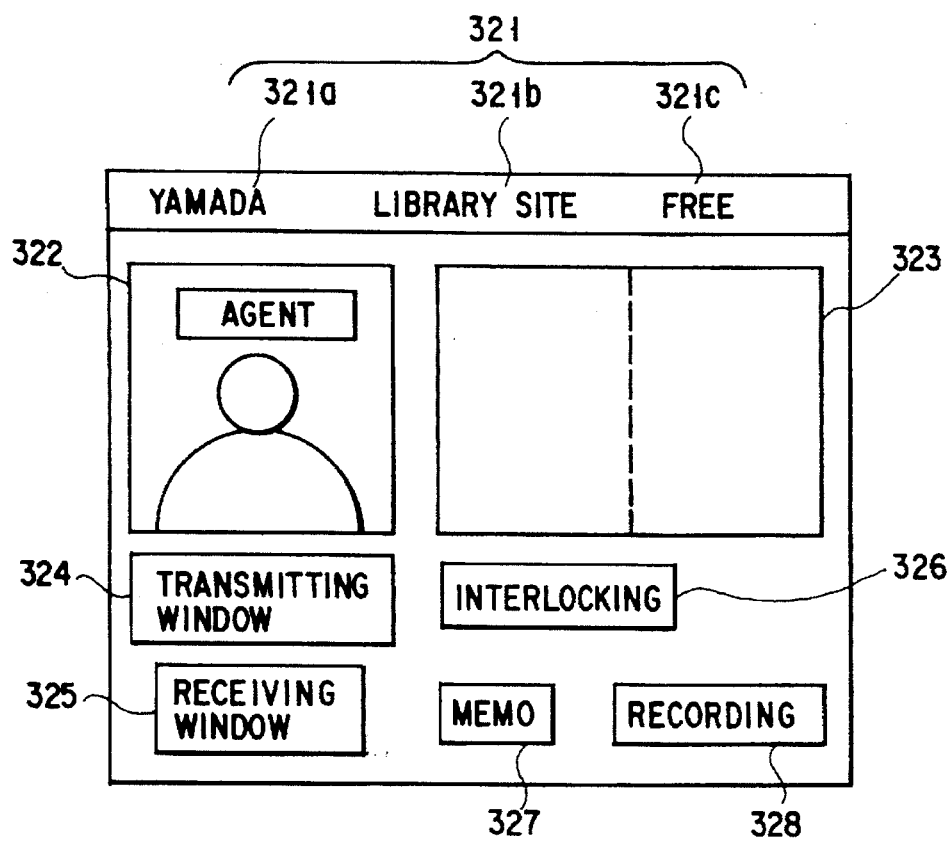
FIG. 18 is a view of a screen display for communication between persons.

FIG. 18 is a view of a screen on the user side corresponding to person A for establishing a communication between person A and person B, which is displayed by the communication display program.

The screen of this example contains an area 321 displaying the other party's name 321a, the current site 321b, and the state 321c. In an area 322 for displaying information on the other party, real-time moving pictures and still pictures previously prepared at the user corresponding to person B are displayed according to selection of the communication means. In the area 322, it is displayed whether what corresponds to person B is the user or not. In this example of the screen, the description AGENT indicates that the corresponding other party is not a human being.

An area 323 used for text communication with the other party (the called party) is divided in two: an area in which a call of the other party is displayed and an area in which a call of the calling party. When speech communication is possible, the area 323 can be used to convert vocal conversational give-and-take into text for display. Further, the screen of this embodiment is provided with an area 324 for transferring given data to person B, an area 325 for receiving given data from person B, an area 326 for synchronizing its movement with the other party's movement or synchronizing the other party's movement with its movement, an area 327 for sending information to the other party's home agent even if it is impossible to communicate with the other party, and an area for specifying the recording of communication state.

Referring to FIG. 19, various operations of the person and the workings and structure of the person will be explained. FIG. 19 is a block diagram of the person's response process.

A recording section 350 has the function of recording the input information from the other party's person and the output information to the other party's person in a storage unit (not shown). A correspondence switching section 360 supplies the input from the other party either to an automatic processing section 370 or to a user interface section 380. The correspondence switching section 360 supplies the output to the other party either from the automatic processing section 370 or from the user interface section 380. The automatic processing section 370 analyzes requests from the other party, and depending on the results, supplies the output to the other party or exchanges the data with the user via the user interface section 380. The user interface section 380 performs an input/output process with the user by means of input/output equipment.

The correspondence switching section 360 allows two output switching settings: K1 and K2. At initial setting, it is set to K1 leading to the automatic processing section 370. Taking the above example of person A and person B, the operation of the person will be explained. When there is an access request from the other party's person, the access request is sent to the automatic processing section 370 via the recording section 350 and the correspondence switching section 360. The automatic processing section 370 performs a connecting process. In the state where the connecting process has finished, the display screen appears at the user on the person A side, whereas the automatic processing section 370 presents to the user on person B side the fact that an access from person A has taken place.

In this state, when the user on person B side decides to make direct communication with the user on person A side, a switching request is issued to the correspondence switching section 360 via the user interface section 380. By this request, the input from person A is outputted to K2 and directly sent to the user interface section 380, with the result that display screen similar to that at the user on person A side appears on the screen on person B side. When there is no user switching request on person B side, the input from person A side is sent without change to the automatic processing section 370.

FIG. 20 is a block diagram of the automatic processing section 370 of FIG. 19.

A request analyzing section 371 analyzes the information sent from the correspondence switching section 360 and extracts a problem to be solved. A problem solving section 372 solves the problem extracted at the request analyzing section 371. A knowledge retrieving section 373 contains knowledge information the person has, and retrieves the contents according to the request from the problem solving section 372. A response generating section 375 judges whether or not the information obtained from the problem solving section 372 should be given to the requester. The response generating section 375 converts the information sent from a response judgment processing section 374 into a specified form, which is then sent to the correspondence switching section 360.

Figure 21A:
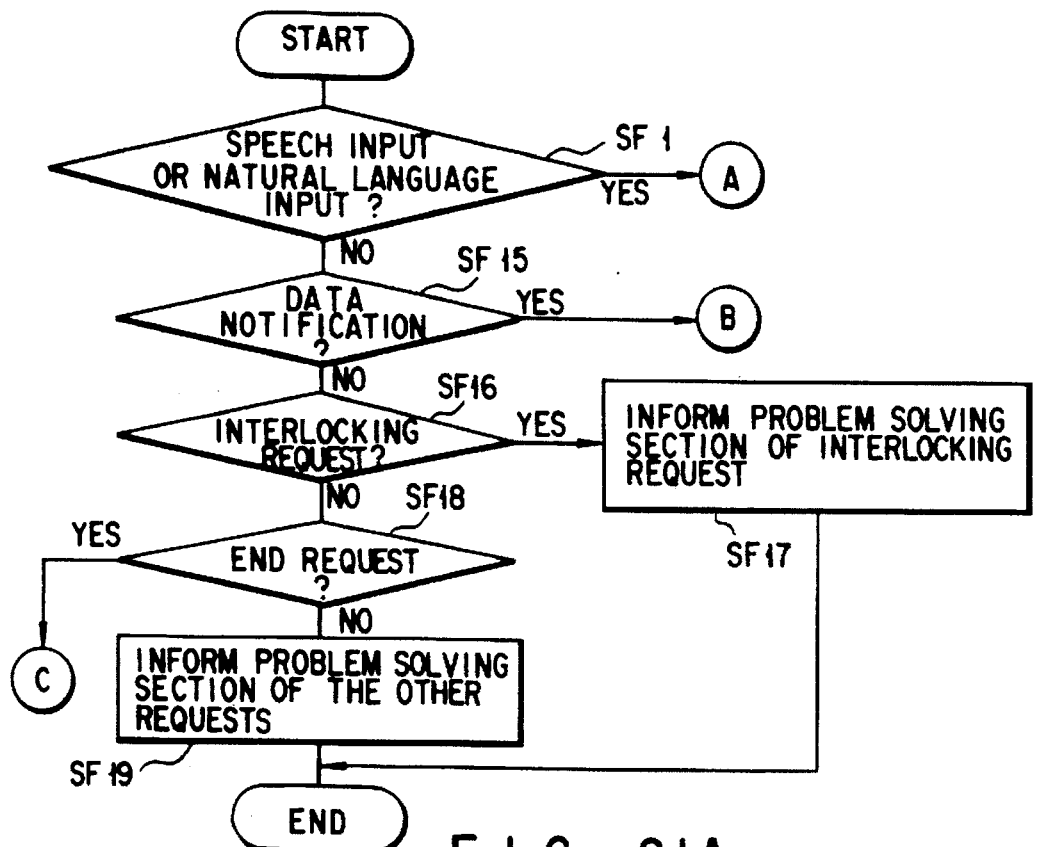
FIGS. 21A through 21C are flowcharts for the processing at the request analyzing section.
Figure 21B:
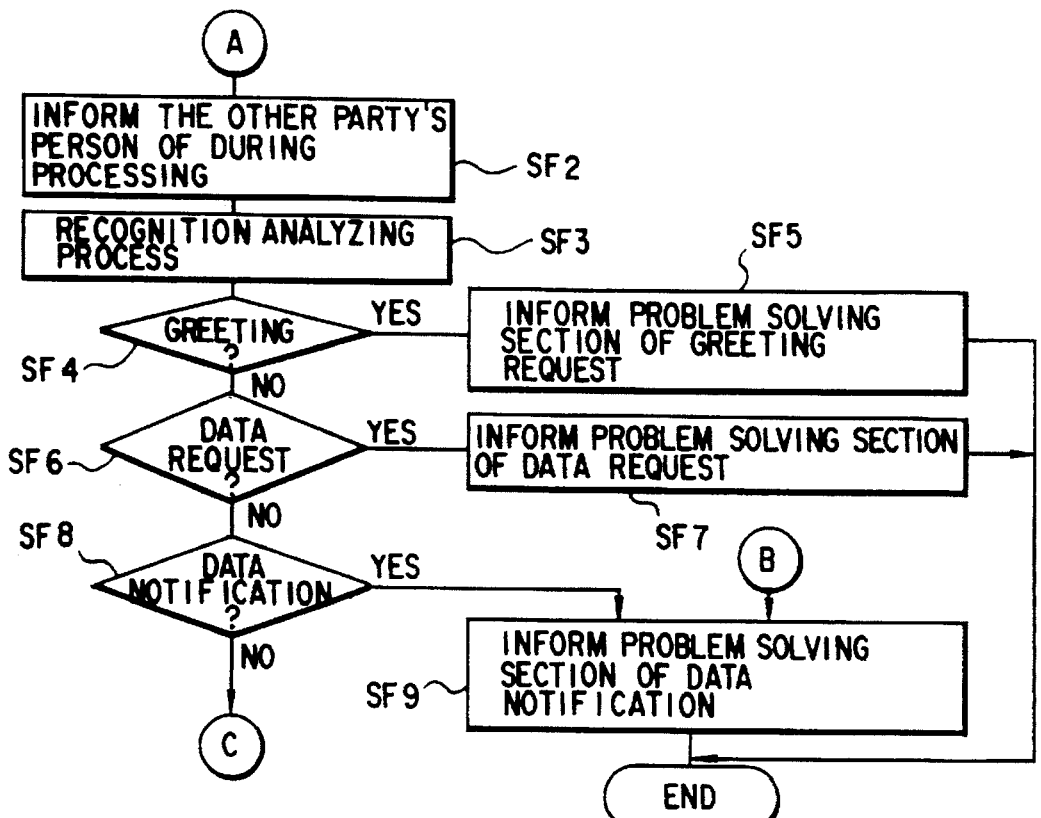
Figure 21C:
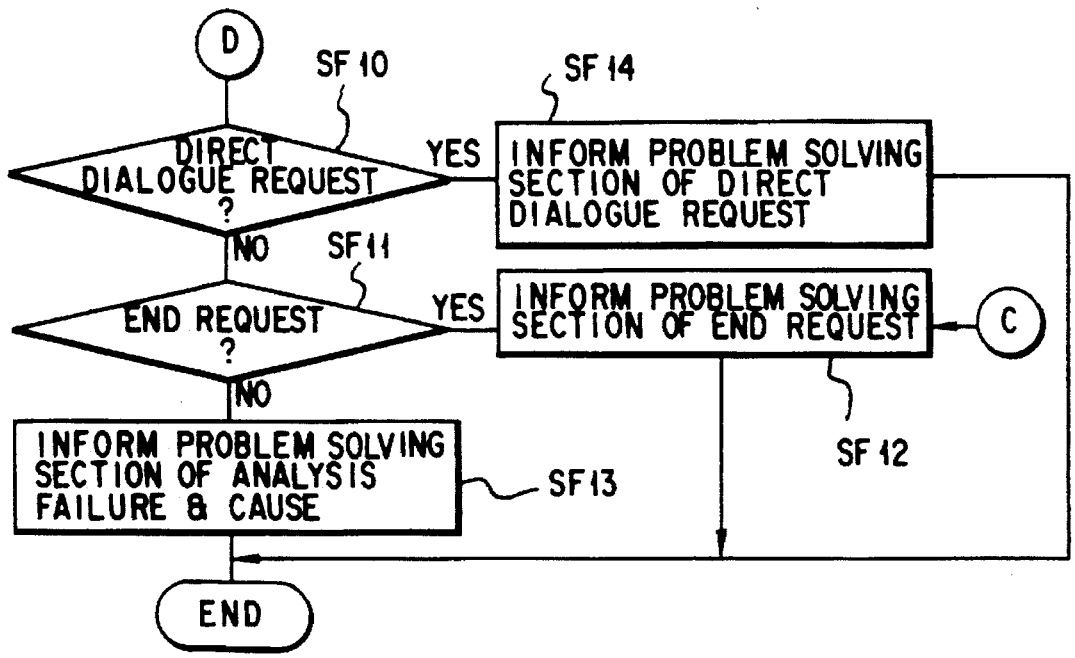

Referring to FIGS. 21A through 21C, the operation of the automatic processing section 370 with respect to various inputs from person A side will be explained. FIGS. 21A through 21C are flowcharts for the processing at the request analyzing section 371.

When the input from the person A side is sent from the correspondence switching section 360, the request analyzing section 371 judges whether the contents are a speech input or a natural-language sentence input (step SF1). At step SF1, if YES, the effect that the process is in progress is displayed on the display screen at the user corresponding to person A (step SF2 in FIG. 21B).

Next, a speech recognition process and a natural-language recognition process are carried out (step SF3). These processes are performed using a speech recognition process module and a natural-language recognition process module. The recognition results are classified into any of Greeting, Data Request, Data Notification, Direct Dialogue Request, End Request, and Recognition Failure. For example, when "Good afternoon" is entered, the result of analysis is "Greeting: type 1," according to the dictionary information in the natural-language processing module. Here, "type 1" indicates a greeting representing a cue for starting conversation. The sentence "Where is . . . ?" is analyzed as the problem of asking the location of . . . as shown in "Data Request: location ( . . . )." An input such as "want to speak directly" is analyzed as Direct Dialogue Request, and an input such as "Goodbye" is analyzed as End Request.

Steps SF4 through SF14 are the processes of sending the analysis results at step SF3 to the problem solving section 372.

At step SF3, when the analyzing process has failed, the problem solving section 372 is informed that the contents of judgment that the analysis is unacceptable, such as "Analysis Failure: Inarticulate Speech." When the input from person A is neither a speech input nor a natural-language sentence input, step SF15, step SF16, and step SF18 judge whether or not it is Data Notification (transfer of text files or the like through f on the display screen), Interlocking Request, and End Request, respectively. Then, step SF9, step SF17, and step SF12 notify the request analyzing section 371 of the contents, respectively, and terminate the process. When the input falls into none of the above cases, the problem solving section 372 is notified of "The Other Requests" and the process is terminated.

Figure 22A:
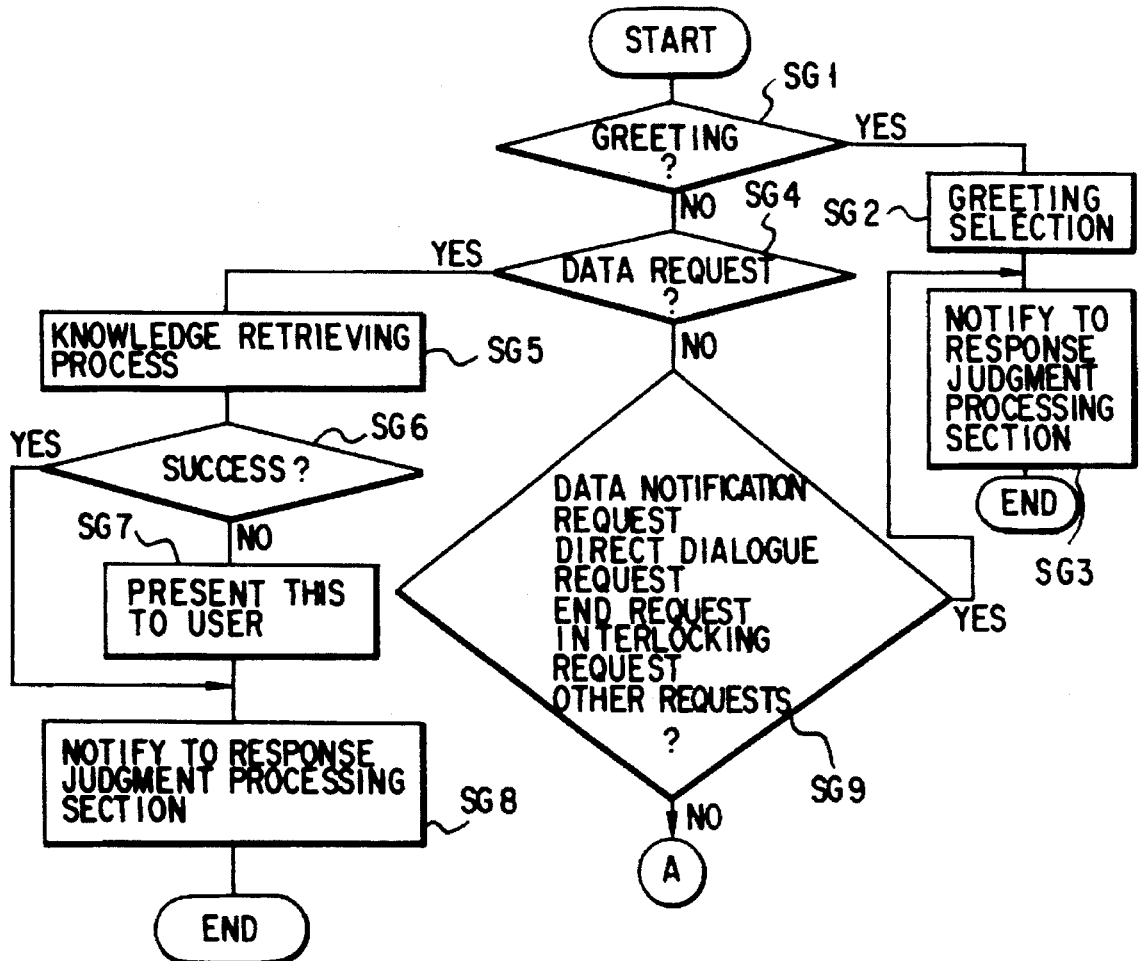
FIGS. 22A and 22B are flowcharts for the processing at the problem solving section.
Figure 22B:
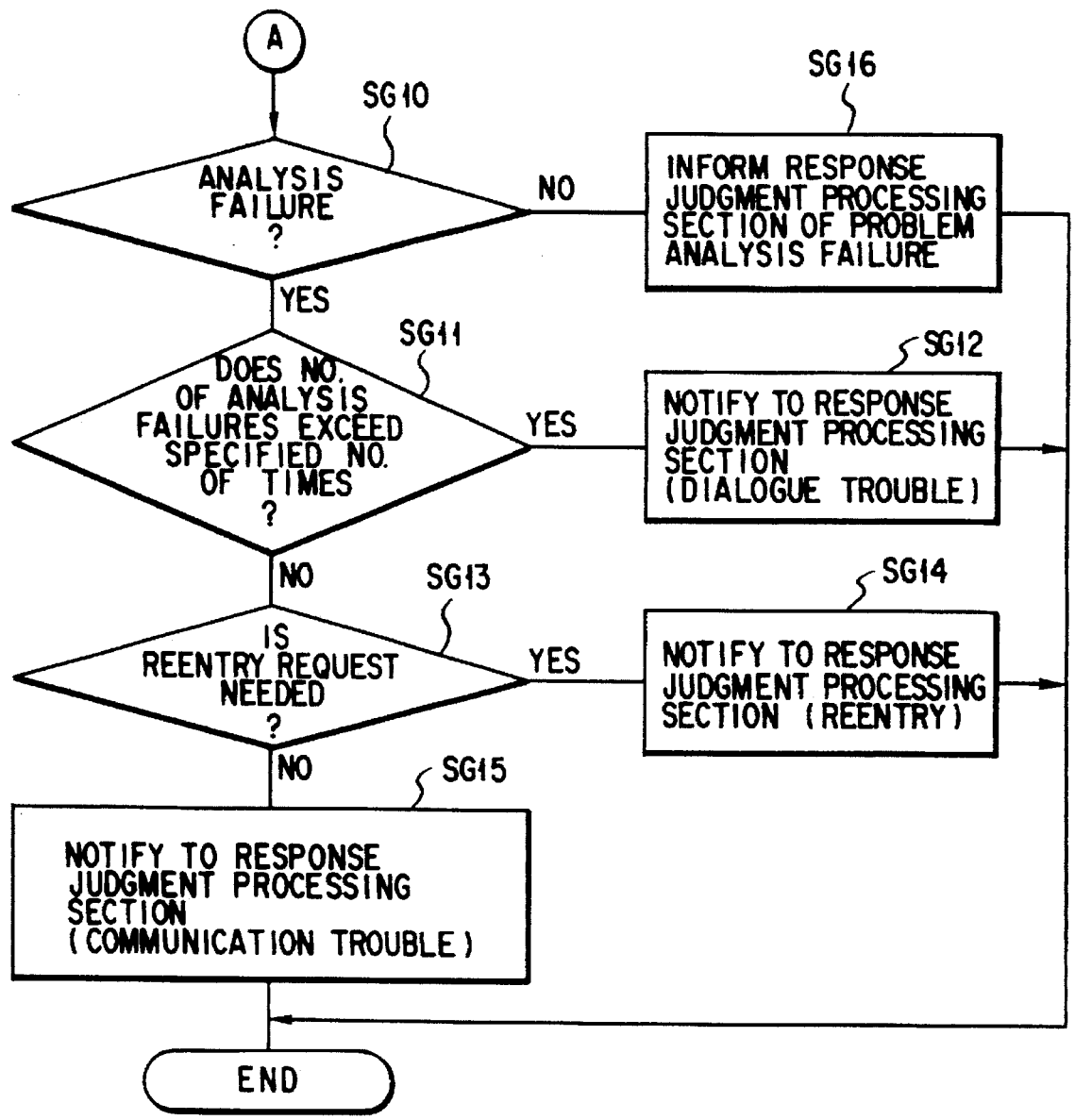
Figure 23A:
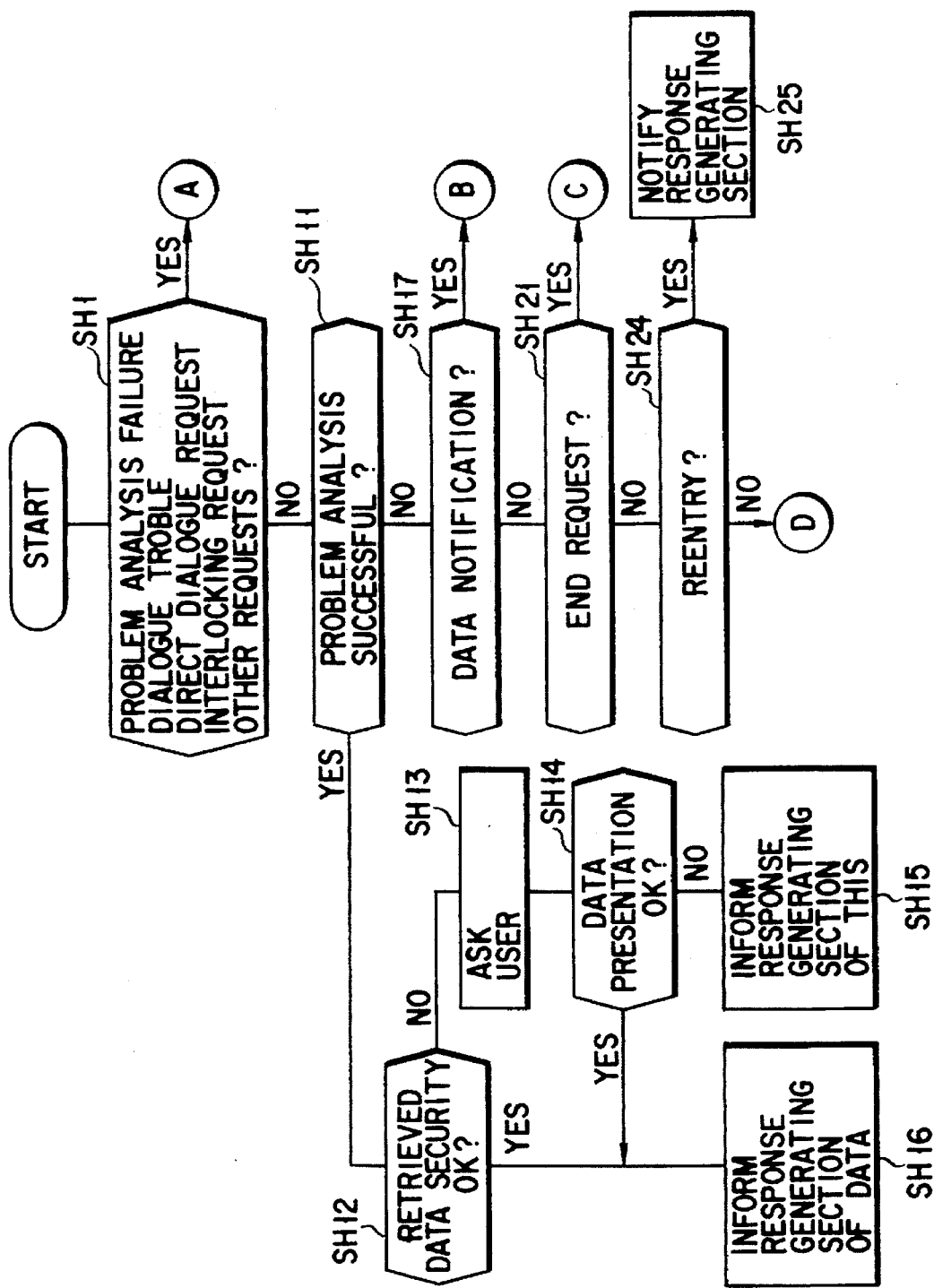
Figure 23B:
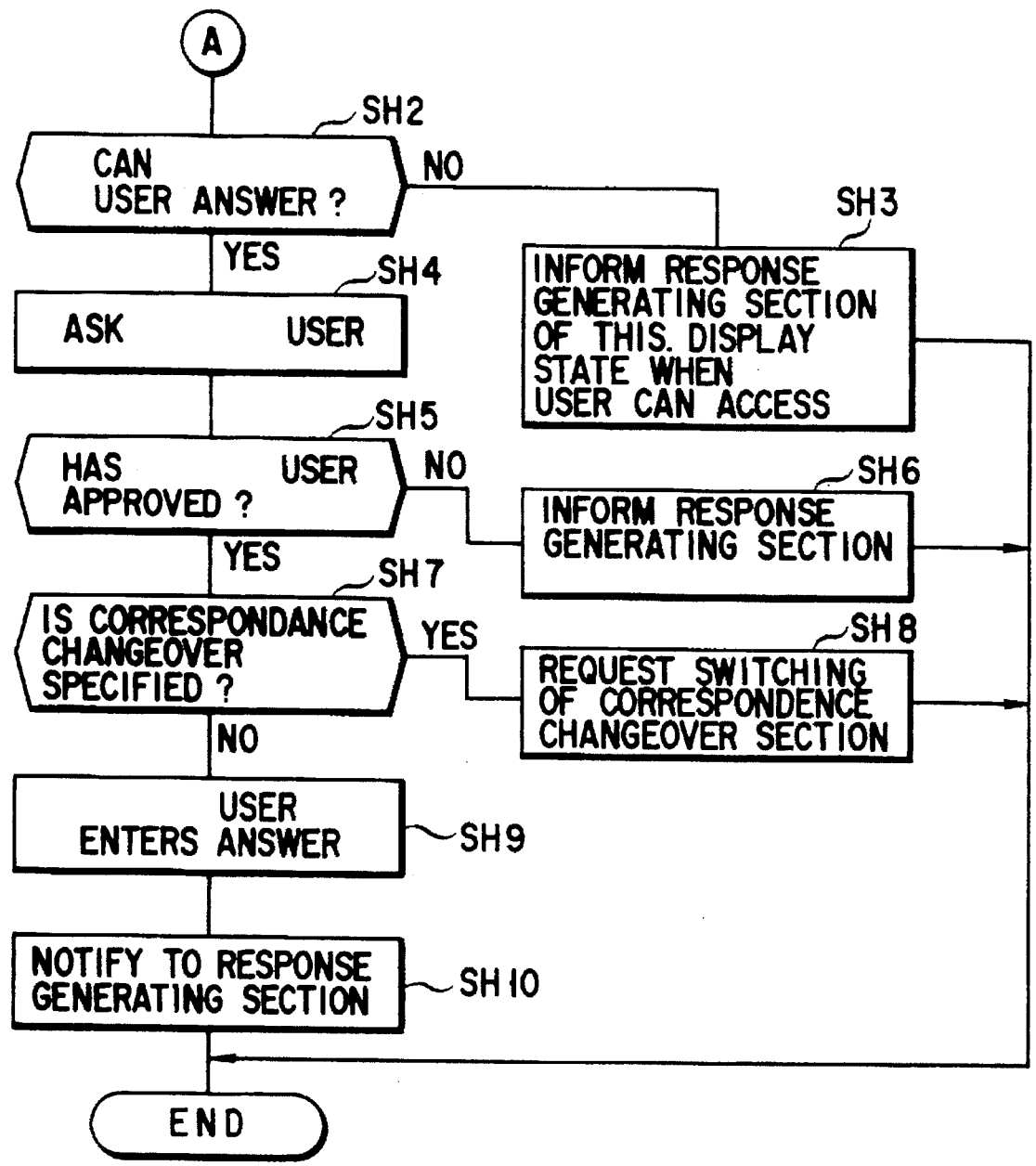

FIGS. 22A and 22B are flowchart for the processing at the problem solving section 372.

When the request analyzing section 371 judges that the input from the other party's person is a greeting (step SG1), a particular response to it is selected (step SG2). This response is obtained by retrieving a table (not shown) previously stored in the knowledge retrieving section 373. The response judgment processing section 374 is notified of the retrieving result as an answer (step SG3). At step SG1, when the input is judged to be an input data request (step SG4), the knowledge retrieving process is performed (step SG5). In the knowledge retrieving process, the knowledge retrieving section 373, using the question as a key, retrieves the answer, For example, when to the question about location (business trip application) (Where is business trip applications?), "location (business trip application)=cabinet 1" is written in the data base in the knowledge retrieving section 373, simple matching gives the answer "cabinet 1."

At step SG5, when the same question is analyzed at its intention level by the request analyzing section 371 as "give (business trip application)" and the knowledge retrieving section 373 has such a description as "give(X)=retrieving program (X)", the retrieving program can be started using the business trip application as an argument, take out the description and make it an answer. When the retrieving process has given no answer, this means that the automatic process of a person request has not been performed as expected. Its state is presented to the user in a suitable form (step SG7). The response judgment processing section is informed of the result of the retrieving and the answer (step SG8). When the request analyzing section 371 has judged that the information is a data notification request, a direct dialogue request, an end request, an interlocking request, and other requests (step SG9), the information is notified as it is to the response judgment processing section 374 (step SG3).

When the request analyzing section 371 has failed in analyzing a request (step SG10), it is judged whether or not specified conditions including the number of successive analysis failures and its ratio are met (step SG11). At step SG11, when the specified conditions are fulfilled, it is judged that the dialogue process has failed, and this information is notified to the response judgment processing section 374 (step SG12).

At step SG13, depending on the cause of the analysis failure, it is judged whether or not an input request should be made to the other party. The causes of the analysis failures include low confidence at the speech recognition section, unknown words at natural-language analysis, more than one interpretation of a sentence, and other various factors. At step SG13, for these failure factors (or failure to identify a unique interpretation), it is judged using a previously specified table that what kind of measure should be taken against each factor. For example, when there are three possible candidates among the analysis results, they are presented to the other party's user to allow him to choose one of them.

At step SG13, when it is judged that an input should be made again, a reentry process is notified to the response judgment processing section 374 (step SG14). At step SG13, when it is judged that an input should not be made again, it is judged that the state where telephone conversation is difficult has developed, and its information is notified to the response judgment processing section 374 (step SG15). At step SG10, when it is judged that there is no analysis failure, the fact that the problem solving process has failed is notified to the response judgment processing section 374, and the process is terminated (step SG16).

FIGS. 23A through 23E are flowcharts for the processing at the response judgment processing section 374.

The response judgment processing section 374, depending on the result of solving a problem informed by the problem solving processing section 82, determines what response to return. As required, the input and output from and to the user is performed via the user interface section 380.

It is judged whether the notification from the problem solving section 372 is about a problem solving failure, a poor dialogue, a direct dialogue request, an interlocking request, or other requests (step SH1). In this case, it is desirable to ask the user for judgment.

A check is made to see if the use can deal with the situation (step SH2). In this case, when the user cannot access from the computer (because the computer is not used or is far away from the user) or when the user can access from the computer but the computer is processing a job of higher priority, control proceeds to step SH3, where the information on the fact that the user cannot deal with the situation is notified to the response generating section. When the user can access, the notified conditions from the problem solving section 372 are displayed on the user's display screen in a specified mode, and the process is terminated. When the user can deal with the situation, the notified conditions from the problem solving section 372 are presented via the user interface section 380 shown in FIG. 29 to ask the user for instructions (step SH4). In this case, when the user denies intervention, the information on the fact that the user has denied intervention is notified to the response generating section 375 and the process is terminated (step SH6).

When the user has instructed switching of the correspondence process from the automatic processing section 370 to the user, a switching request is sent to the switching section 360 (step SH8). By this request, the switching section 360 switches the input/output from and to the other party's person from the automatic processing section 370 to the user interface section 380. As a result of this switching, the screen display on the user side is connected to the other party's person, allowing communication between two persons. While the automatic processing section 370 is dealing with this situation, this exchanging state is displayed in a reduced mode on the user's screen on the person B side, for example. After this switching process, the display is changed to a specified size. When the user has not specified the correspondence switching process (step SH7), the user enters an answer to the problem solving process (step SH9), and the information is notified to the response generating section 375 (step SH10). At step SH11, it is judged whether or not the notice from the problem solving section 372 is that the problem has been solved successfully.

At step SH11, when the problem has been solved successfully, a security check is made on the obtained answer data (step SH12). The security check starts with the security level of the other party's person, the access qualification, the security level of the data, etc. When they do not pass the security check, the user is asked to present data (step SH13). If the user refuses to present data or an inquiry cannot be made of the user, it is reported that it is difficult to present data, and the process is terminated (step SH15). When they have passed the security check, and at step SH14, when the user has approved, the answer data is notified to the response generating section 375, the process is terminated (step SH16). At step SH17, it is judged whether the notice from the problem solving section 372 is of data notification or not.

At step SH17, it is of data notification, the information that data has been received is presented (if possible) to the user (step SH18), the received data is held (step SH19), it is reported that the data has been received (step SH20), and the process is terminated. At step SH21, it is judged whether or not the notice from the problem solving section 372 is of an end request. When it is of an end request, end is notified to the response generating section 375 (step SH22), and the end process is performed (step SH23). In the end process, the end of the response process at the response generating section 375 is confirmed. Further, it is confirmed that there is no input from the other party's person in a specified period of time, the reserved communication line is canceled and the user screen is erased.

At step SH24, it is judged whether or not the notice from the problem solving section 372 is of reentry. If it is of reentry, selection of a message to be presented to the other party's person is made based on the cause of a failure at the problem solving section 372, and this is notified to the response judgment processing section 374. Therefore, this is notified to the response generating section 375 (step SH25), and the process is terminated. At step SH26, it is judged whether or not the notice from the problem solving section 372 is of communication trouble. If true, a response trouble message is selected (step SH29), and control goes to step SH2. At step SH27, a communication trouble message is selected, and at step SH28, this is notified to the response generating section 375, and the process is terminated.

The response generating section 375 creates a return message to the other party's person on the basis of the information reported from the response judgment processing section 374. The return message is sent to the other party's person via the correspondence switching section 360. Table 1 and 2 show examples of an output sentence created by the response generating section according to the notified information.

TABLE 1

| Description | Illustrative sentence |
| --- | --- |
| Greeting | A greeting message obtained at the problem solving section 372 Good afternoon etc. |
| Problem solving failure | Message such as "I can't say anything definite about it unless asking the user." |
| Dialogue trouble | "We can't put you through to him now. What would you like us to do?" |
| Direct dialogue request rejection Interlocking request rejection | "He is now in conversation and cannot have a talk with you." |
| Data presentation trouble | "This case requires the words. . ." |

TABLE 2

| Description | Illustrative sentence |
| --- | --- |
| Data presentation possible | The data required is actually presented. |
| Data notification received | "The data sent is received." |
| End notification | "Goodbye" etc. |
| Reentry request | "Speak more slowly again." "I can't understand. . . Would you repeat it?" etc. |
| Response trouble | "I am sorry I can't understand. I am also in communication trouble." |

These output sentences are converted by a communication means to the other party's person. For example, when the speech communication channel is open, the information converted into speech data according to the user's speech parameter is also transmitted. When the object to be sent such as a text is organized pieces of data, information is added to determine what the sent data is so that it may be placed in the receiving area, not the dialogue area, of the other party's user. This allows the file to appear on the display screen in the form of an icon. By the above processes, when person A accesses person B, even if the user corresponding to person B does not react actually, communication can be made as if the user on the person A side corresponded to the user at the person B. At the time when specific trouble occurs in the communication, it is possible to change the process to communication between the users.

With such configuration, a simple questioning and answering process can be performed by the person's automatic response function through dialogue without the user's intervention. Since at the time when the automatic response has failed, control is switched to the user, and the dialogue can be continued smoothly.

FIG. 24 is a schematic diagram of a human interface system according to a second embodiment of the present invention. In the second embodiment, the client handler 310 in client 300 of FIG. 3 has the function of each section shown in FIG. 24. These functions may be incorporated in the site handler 240 in FIG. 3.

Referring to FIG. 24, a concrete unit configuration of the second embodiment will be explained.

A message creating unit 510 creates a message to be transmitted from the calling party to the called party. The message creating unit 510 is composed of a sentence-entering unit provided with a word-processing function for entering sentences and an optical character recognition (OCR) unit, a speech input unit provided with a microphone for inputting speech or the like, an image input unit provided with a scanner and a camera for inputting images and moving pictures, and a unit for entering the operation of the calling party such as a power glove.

A calling party degree of urgency judging unit 520 determines with what level of urgency a message created by the calling party at the message creating unit is transmitted. The calling party degree of urgency judgment unit 520 determines degree of urgency by the calling party specifying the degree of urgency for the calling party degree of urgency judgment unit 520, by analyzing the contents of the message created by the calling party degree of urgency judgment unit 520, or by the calling party degree of urgency judgment unit 520 observing the calling party. A method of analyzing the contents of the message and a method of observing the calling party will be explained later.

A sender 530, which is created at the message creating unit 510, transmits the message added with the degree of urgency at the calling party degree of urgency judgment unit 520 according to the communication protocol. For the sender 530, for example, an ISDN terminal or a computer communication function is used. The sender 530 can select communication media or channels, depending on the crowded state on communication channels and the degree of urgency of the message.

A receiver 540 receives a message transmitted. The receiver 540, like the sender 530, is made up of, for example, an ISDN terminal or a computer communication function.

A called party state judging unit 550 judges the state of the message-receiving person. The called party state judging unit 550 determines the state of the called party by the called party specifying its own present state to the called party judging unit 550 or by observing the information in a scheduler 590 or the state of the called party.

A degree of urgency arbitrating unit 560 compares the degree of urgency of the calling party sent together with the message from the calling party with the state of the called party obtained from the called party state judging unit 550 to determine what degree of importance the received message has with respect to the called party.

A media converting unit 570, depending on the degree of importance of the message obtained from the degree of urgency arbitrating unit 560, converts a method of transmitting the receiving message. The media converting unit 570, for example, converts to media capable of interrupting the called party such as a telephone in the case of a message of great importance and high urgency, and to media, such as a message board, to which the called party can gain access at any time in the case of a message of less importance.

An information presenting unit 580 presents to the user the message converted by the media converting unit 570.

The information presenting unit 580 may use a speaker or a telephone for speech signals, a CRT display for characters, a bit map display or a TV monitor for images. It may also protect an image onto a goggle the called party wears or onto a wall.

The operation of the second embodiment thus constructed will be explained, using an example of the calling party (A) sending a message to the called party (B).

The calling party A creates a message using the message creating unit 510, and after the completion of the message, instructs transmission in order to transmit it to the called party B. In this case, the calling party degree of urgency judging unit 520 observes the state of the calling party during the creation of the message and adds degree of urgency Pa to the message to be transmitted. The degree of urgency-added message is sent to the sender 530. Depending on the crowded conditions on the communication channel or the degree of urgency of the message, transmission media and channel are selected and transmission is performed. The receiver 540 at B, receiving the message, transfers it to the degree of urgency arbitrating unit 560.

The degree of urgency arbitrating unit 560 compares the state of B obtained at the called party state judging unit 550 with the degree of urgency of A sent together with the message to determine degree of importance of the message with respect to B. The media converting unit 570 converts media according to the degree of importance. The message subjected to media conversion at the media converting unit 570 is transferred to the information presenting unit 580, which presents the message to B in a manner suitable to the media.

The operation of a human interface system with the degree of urgency arbitrating function of FIG. 24 will be explained concretely.

The calling party degree of urgency judging unit 520 uses the following techniques to determine the degree of urgency of the calling party. These techniques and judging criteria are previously set in the calling party degree of urgency judging unit 520.

First explained will be the calling party degree of urgency judging unit 520 with a message content analyzing means. The message content analyzing means extracts the following words appearing in a sentence and based on the result, determines degree of urgency as follows:

When the words expressing the data and time indicating a time limit are extracted, those closer to the present time have greater urgency.

Texts where EMERGENCY, URGENCY, etc appear have great urgency.

When phrases expressing the strictness of time limit, such as "by . . . . if possible" or "Be punctual for . . . " are extracted, texts written in strict expressions have great urgency.

Texts where assumptive words, such as seem, appear frequently have information of low reliability and consequently little urgency.

Text where imperative words appear frequently have great urgency.

In the case of a text created under instructions from another person, the person who has given the instructions and the source (for example, superiors or professors) of information contained in the message are sensed. When they are important to the calling party, they are judged to have great urgency. When the time from when the instruction has arrived until the creation of a text begins is short, it is judged that the urgency is great.

In the case of a message requiring a reply, when information is extracted from the calling party's scheduler and it is judged that a time limit for a reply must be set closer, the urgency is made greater.

When the contents of the message trigger an operation, the operation is previously associated with the difficulty, which is then stored. Referring to this, it is judged that the greater the difficulty, the higher the urgency.

The number of person related to the message, for example, the number of called parties, is sensed. It is judged that the larger the number, the greater the urgency.

The calling party degree of urgency judging unit 520 with a calling party observing means will be explained. The calling party observing means observes the calling party during the creation of the message as mentioned below, and determines the degree of urgency based on the observation result.

When a message is created by key entry, the strength and speed of key strokes and the number of errors in the input are sensed. It is judged that the stronger and the faster the key strokes and the greater the number of errors in the input, the greater the urgency.

A unit for measuring the blood pressure of the calling party during the creation of a message is provided. When the blood pressure is higher than a specific normal value, it is judged that the urgency is great.

Further, the voice produced by the calling party during the creation of a message is recorded by means other than the speech input means. When the message is created with the calling party taking to himself more frequently than a specified number of times, it is judged that the urgency is high.

The face of the calling party during the creation of a message is imaged. When the edges of the eyebrows and mouth are raised more than a specified amount, it is judged using a technique of extracting the edges of eyebrows and a mouth that the urgency of the created message is high.

A distinction is made between private business and official business. The urgency of private business messages is made greater when the calling party is off duty, whereas the urgency of official business messages is made greater when the calling party is on duty. By this, the same message can be changed in degree of urgency automatically depending on the time zone.

Information to determine degree of urgency may be given by the calling party directly instructing the calling party degree of urgency judging unit 520. For the degree of urgency, a one-dimensional value may be set. Or a vector value with the above individual items corresponding to individual dimensions may be set. How this process proceeds is shown in FIGS. 25A to 25C.

Figure 25A:
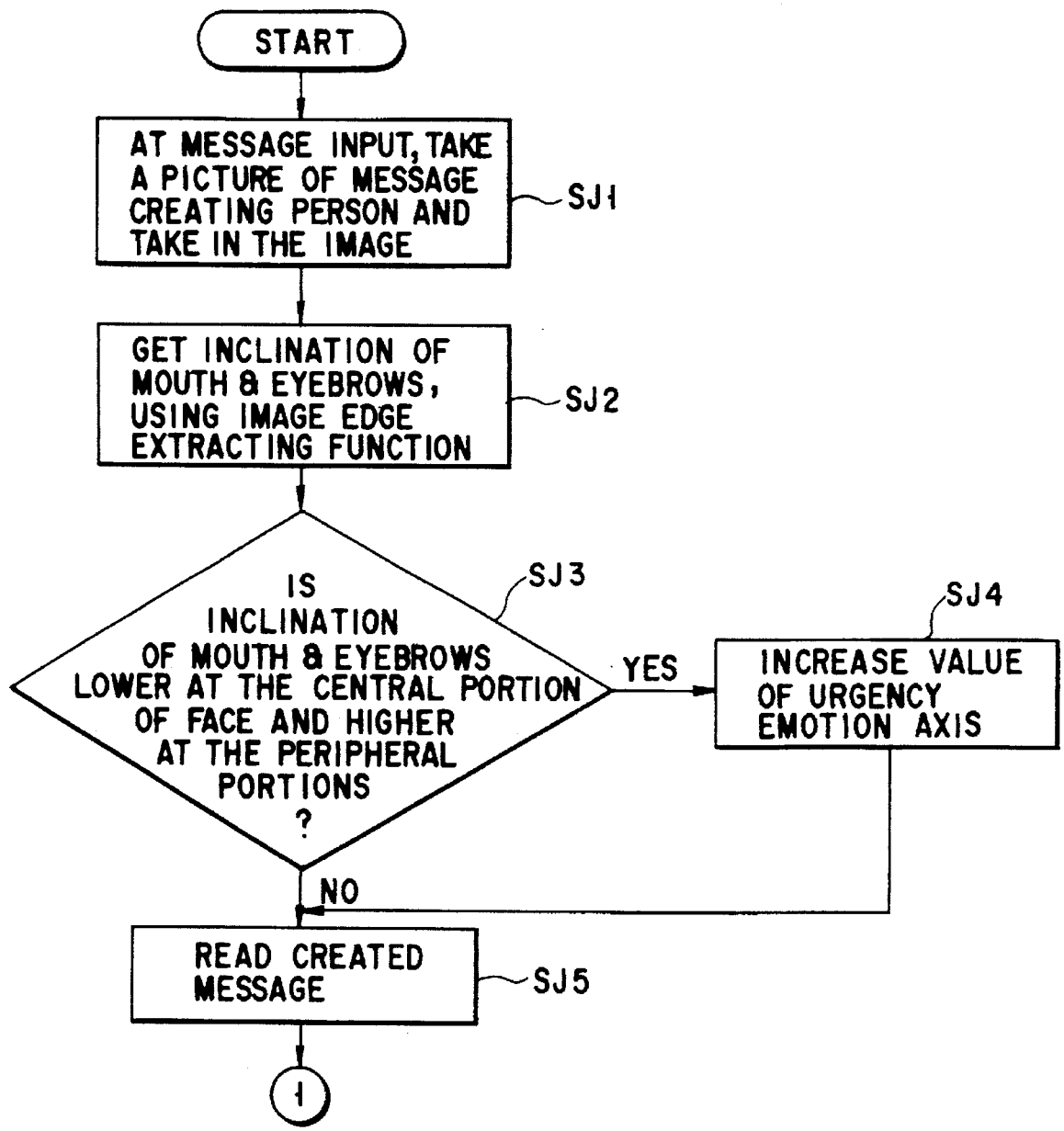
FIGS. 25A to 25C are flowcharts for the processing at the calling party's degree of urgency judging unit.
Figure 25B:
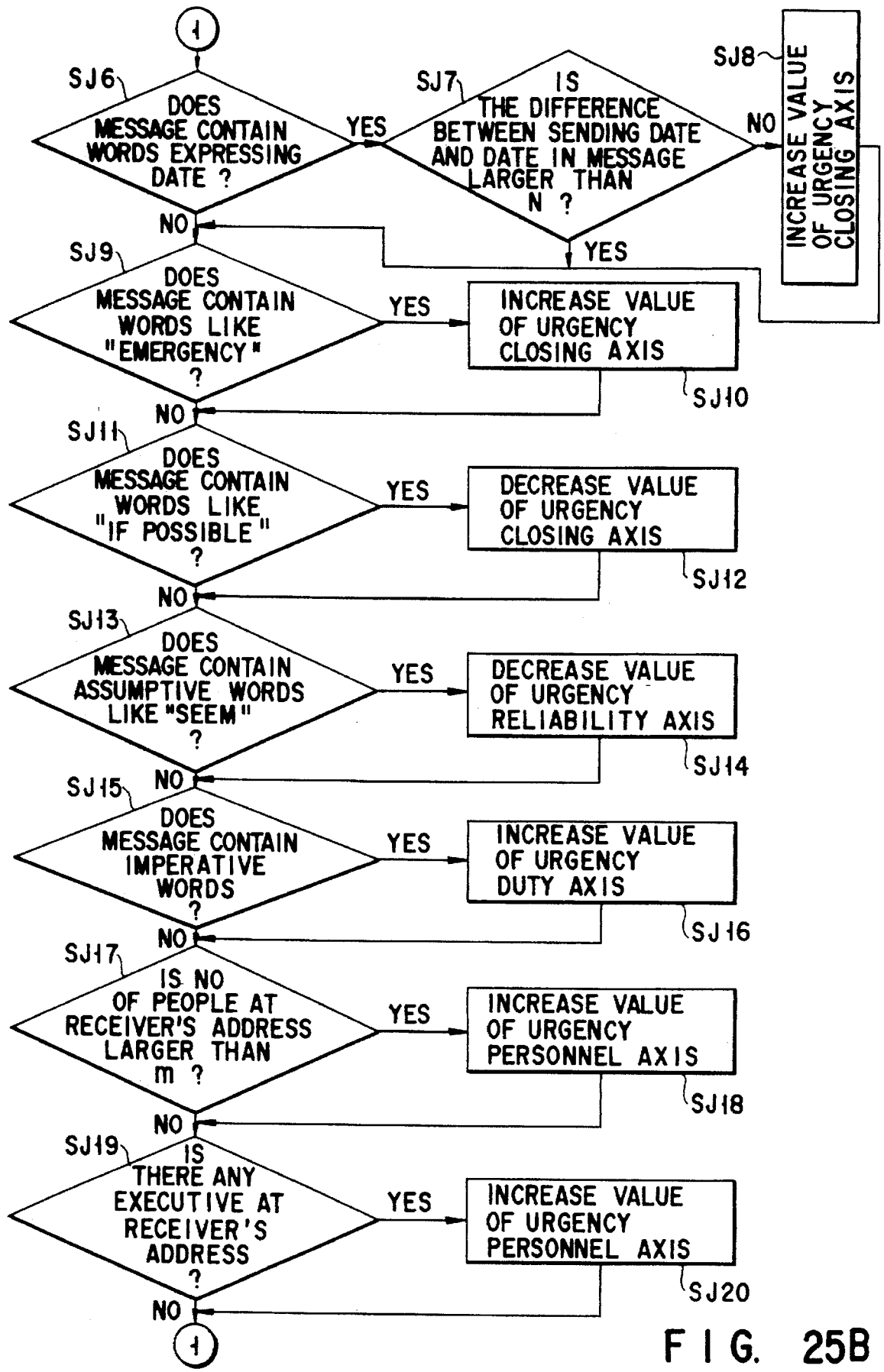
Figure 25C:
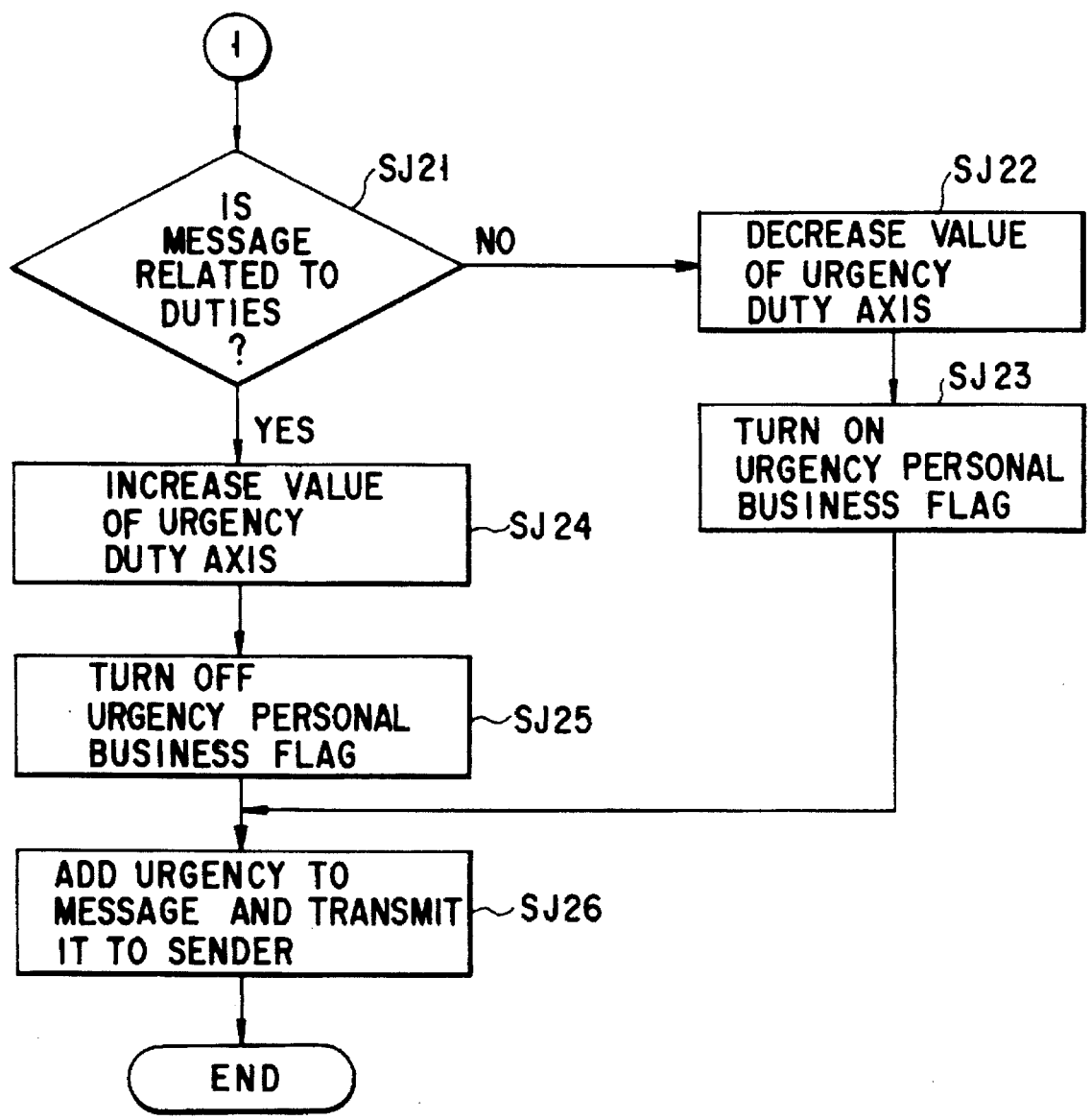

FIGS. 25A to 25C are flowcharts for the processing at the calling party degree of urgency judging unit 520 of the present invention.

The calling party degree of urgency judging unit 520 takes a picture of the operator's face during the creation of a message and takes in an image of the operator's face (step SJ1). Then, the inclination of the operator's mouth and eyebrows are measured using the function of extracting the edges of the image (step SJ2). A check is made to see if the obtained inclinations indicate that the central portion of the face is lower and the peripheral portion is higher (step SJ3). If the inclinations point that way, the value of the degree of urgency emotion axis is increased (step SJ4).

The created message is read in (step SJ5). A check is made to see if there is an expression indicating a data in the message (step SJ6). If there is, a check is made to see if the difference between the data and the data of message dispatch is larger or smaller than a predetermined boundary value (step SJ7). When it is smaller than the boundary value, the value of the degree of urgency deadline axis is increased (step SJ8). A check is made to see if the message contains the word urgency or the like (step SJ9). If it contains, the value of the degree of urgency deadline axis is increased (step SJ10).

The calling party degree of urgency judging unit 520 checks to see if the message contains the phrase "if possible" or the like indicating a weak request (step SJ11). If it contains, the value of the degree of urgency deadline axis is decreased (step SJ12). A check is made to see if the message contains the word seem or the like indicating that the reliability of the message is low (step SJ13). If it contains, the value of the degree of urgency reliability axis is decreased (step SJ14). A check is made to see if the message contains imperative words (step SJ15). If it contains, the value of the degree of urgency duty axis is decreased (step SJ16). The number of people at the receiver's address is determined and a check is made to see if the number exceeds a predetermined number of people (step SJ17). When the number is larger than the predetermined value, the value of the degree of urgency personnel axis is increased (step SJ18). The posts at the receiver's address are checked (step SJ19). When they include an executive, the value of the degree of urgency personnel axis is increased (step SJ20).

It is judged whether the message is of private business or official business (step SJ21). If it is of private business, the value of the degree of urgency duty axis is reduced (step SJ22) and the degree of urgency private business flag is turned on (step SJ23). If it is not of private business, the value of the degree of urgency duty axis is increased (step SJ24), and the degree of urgency private business flag is turned off (step SJ26).

FIG. 26A is a block diagram of the calling party degree of urgency judging unit 520.

An image input unit 521, which is made up of, for example, a still camera or a video, extracts an image of the operator's face. The image from the image input unit 521 undergoes an edge extracting process at an edge extracting unit 522, and the resulting image is transferred to a degree of urgency setting unit 526 for use at step SJ3 of FIG. 25A. The created message is read from a message input unit 523 and transferred to the degree of urgency setting unit 526. The degree of urgency setting unit 256, based on the data, sets the degree of urgency of the message, following the algorithm shown in FIG. 25A. In this case, a degree of urgency table 525 stores what types of axes are available for degree of urgency and what criteria are used for increasing and decreasing the values of those axes. A manager list needed to judge whether or not there is an executive in the addressees and the people who has instructed the creation of the message, can be get from an organization table 524.

An example of the degree of urgency obtained from the above arrangement is shown in FIG. 26B. In addition to the axes in FIG. 26B, a confidentiality axis may be provided to add confidentiality to the message as well as degree of urgency.

A sender 530 transmits the message and the degree of urgency added by the calling party degree of urgency judging unit 520, in conformity with a communication protocol. For example, when ISDN terminals and D-channel protocol layers recommended as an international standard are used, it is possible to transmit a SETUP message added with degree of urgency. In this case, depending on the degree of urgency, media and communication channels can be selected. Specifically, to transmit messages of great urgency, highly reliable, high-speed, highly confidential, less crowded channels are selected at the sacrifice of cost, whereas to transmit messages of low urgency, low-cost channels are selected. For messages of very high urgency, a suitable process can be added according to urgency in such a manner that the message is also sent simultaneously to a superior at the called party. Messages of low urgency may be stored in a buffer until the channel becomes less crowded, and be transmitted in a manner that does not affect the transmission of the other message of greater urgency.

Figure 27:
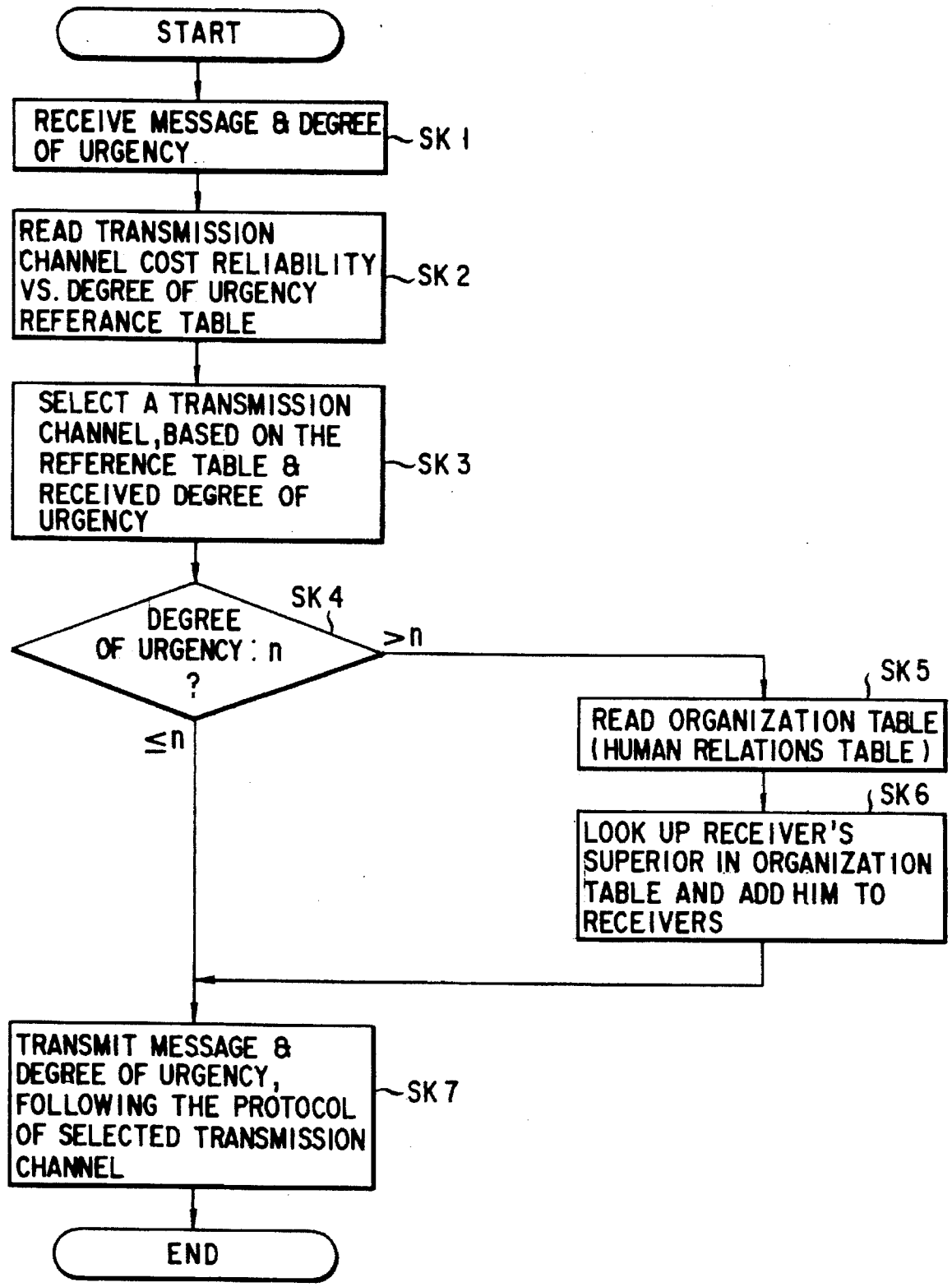
FIG. 27 is a flowchart for the processing at the sender.

Concerning selection of media, highly interruptible media, such as telephones or pagers, are selected for transmission of messages of high urgency are transmitted, whereas storage-type media, such as electronic mails or facsimiles, are selected for transmission of messages of low urgency. A flowchart and a detailed construction of the sender 530 are shown in FIGS. 27 and 28, respectively.

The sender 530, receiving the message to be transmitted and the message's degree of urgency via a message and degree of urgency receiving section 537, starts operation (step SK1). After receiving the message and the degree of urgency, the sender 530 reads a specified transmission channel cost reliability versus degree of urgency table 531 (step SK2) and select a transmission channel, referring to the degree of urgency of the received message and the reference table (step SK3). A check is made to see if the urgency of the transmitted message is higher than a predetermined reference value (step SK4). When the urgency is higher than the reference value, an organization table 533 (human relations reference table) (step SK5) is read. An addressee changing section 534 looks up the receiver's superiors and secretaries and adds them in the destination (step SK6). A protocol comforting with the transmission channel selected at step SK3 is determined at a transmission protocol determining section 535 (step SK7). A transmitting section 536 transmits a message with degree of urgency.

In order that the user may not add great urgency to any message, the sender 530 may be controlled so that messages of high urgency may undergo a charging process, which will be explained later, or the calling party degree of urgency judging means 520 may perform control so that the previously set upper limit of the cumulative value of degree of urgency that the user can use may not be exceeded.

The called party state judging unit 550 is a unit for checking the present state of the called party. The called party state judging unit 550 performs the following processes in order to judge the state of the called party:

when it is early in the morning or late at night, the called party is judged to be in a busy state.

When the called party is out or in a place where he cannot receive the message, the called party is judged to be in a busy state.

When the called party is in conference and in a situation where the cannot receive the message, the called party is judged to be in a busy state.

When the information is get from the scheduler 590 and it is a tight schedule, the called party is judged to be in a busy state.

When a job of high urgency is now being executed, the called party is judged to be in a busy state.

When the same job is performed continuously for a long time, it is decided that the job is of high urgency and the called party is judged to be in a busy state.

When a job is performed whether it is early in the morning or late at night, it is decided that the job is of high urgency and the called party is judged to be in a busy state.

It is decided that a job stemming from a message of high urgency is of high urgency and the called party is judged to be in a busy state.

When decreases in key entry speed or response speed, or more errors in the input are observed as a result of monitoring the called party by using a user observing means like the calling party degree of urgency judging unit 520, it is decided that he is in poor health and the called party is judged to be in a busy state.

After whether the called party is now working or not, when he is on duty, the called party is judged to be in a busy state for private business messages; when he is off duty, the called party is judged to be in a busy state for official business.

In addition, by the called party specifying the present state or instructing reference to the scheduler, the state of the called party can be judged. Further, the state of the called party can be set in a multi-dimensional value, not a one-dimensional value.

FIG. 29 is a flowchart for the processing at the called party state judging unit 550.

The called party state judging unit 550 decides the present time and determines whether it is early in the morning or late at night (step SL1). At step S11, it is early in the morning or late at night, the busyness of the state is increased (step SL2). The called party state judging unit 550 checks to see if the called party is now out (step SL3). When it is found that the called party is in a situation where he cannot receive the message immediately because of his absence, the busyness of the state is increased (step SL4). The called party state judging unit 550 decides the degree of urgency of the job presently being performed by the called party (step SL5). When the urgency is high, the busyness of the state is increased (step SL6).

The degree of urgency arbitrating unit 560 is a unit for determining the degree of importance of the received message for the called party on the basis of the degree of urgency information added to the message by the calling party degree of urgency judging unit 520 and the state of the called party obtained from the called party state judging unit 550. The degree of urgency arbitrating unit 560 performs the following processes to determine degree of importance:

When the calling party is the called party's superior, the degree of importance is determined based on the relationship between the calling party and the called party, such as attaching greater importance to the calling party's degree of urgency.

A message not coinciding with the called party's interest and duties previously entered is given low importance.

A message replying or answering the contents sent previously by the called party is give high importance.

When it is found from a file storing the degree of urgency the calling party's past messages and their degree of urgency or importance (entered by the called party) the called party thinks reasonable that the same calling party often sent messages with great urgency in spite of the fact that they were actually not urgent, messages of such a calling party are given low importance.

Figures 31A, 31B:
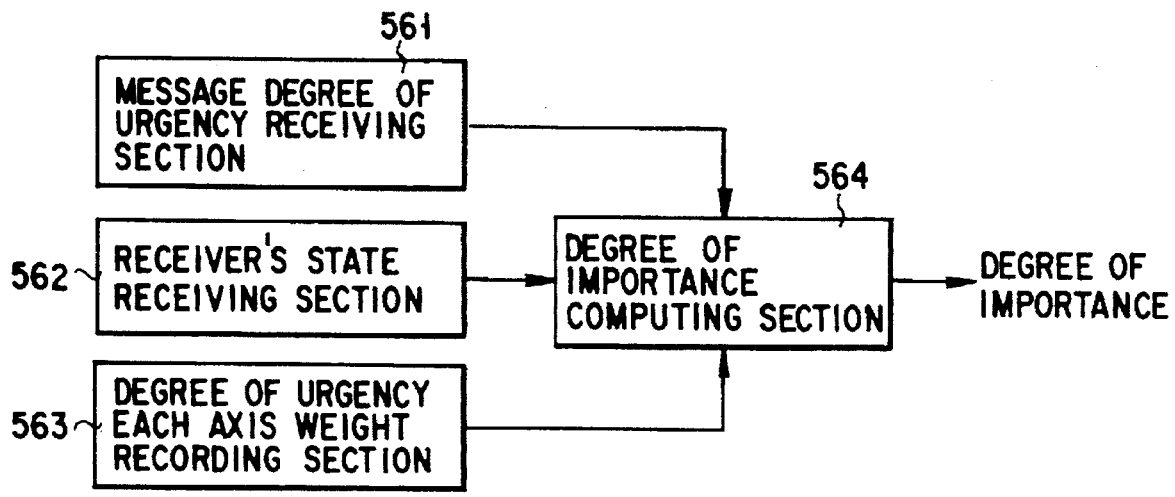
FIG. 31A is a block diagram of the degree of urgency arbitrating unit.
FIG. 31B is a table listing weight on each axis of degree of urgency used in the processing at the degree of urgency arbitrating unit.

When the degree of urgency of a message or the state of the called party is expressed by a multi-dimensional vector value, its importance can be determined depending on the degree of importance of each axis. The flow of the process and its detailed arrangements are shown in FIG. 30 and 31A, respectively. FIG. 31B shows an example of weights on the individual axes.

The degree of urgency arbitrating unit 560 begins operation by reading degree of urgency A sent together with the message via the message degree of urgency receiving section 561 (step SM1). Next, the state B of the called party determined by the called party state judging unit 550 is read via the called party state receiving section 562 (step SM2). The degree of urgency arbitrating unit 560 reads degree of urgency weight W on each axis previously entered from a degree of urgency each-axis weight recording section 563 (step SM3). A degree of importance computing section 564 multiplies the degree of importance of each axis by its weight and subtracts a value of B from the result. The resulting value is degree of importance C for the called party of the message (step SM4). The degree of urgency arbitrating unit 560 transfers the value of degree of importance C together with the message to the media converting unit 570 (step SM5).

In FIG. 31B, for a message from a general calling party, its degree of importance is arbitrated using weight for a general item. When the calling party is A (or when the calling party belongs to block A), the degree of importance is arbitrated using weight for A item; when the calling party is B, the degree of importance is arbitrated using weight for B item.

The media converting unit 570 converts a notifying method of a message transmitted into desired informing means, according to the degree of urgency of the message obtained from the degree of urgency arbitrating unit 560. In this case, when the message is of very great importance, the called party undergoes a high-level interrupt.

The media converting unit 570 performs processes, including automatic transfer of a telephone call to a place where the called party is to go, placing the message in the answering machine and at the same time, beeping the pager, and retrieving a person in charge of the same field as the called party from an organization table file and then transferring the message to the person (if the retrieving has failed, the message "person in charge unidentified" is returned to the calling party). For a message of relative low importance, the called party undergoes a low-level interrupt. For instance, the message is recorded in the answering machine or is written on the message board. For a message of very low importance, the reception is rejected and the message is returned to the calling party; the message is discarded, or the called party's scheduler 590 is checked, only a message to reject the reception until some specific time is returned, and the message received is discarded.

Figure 32:
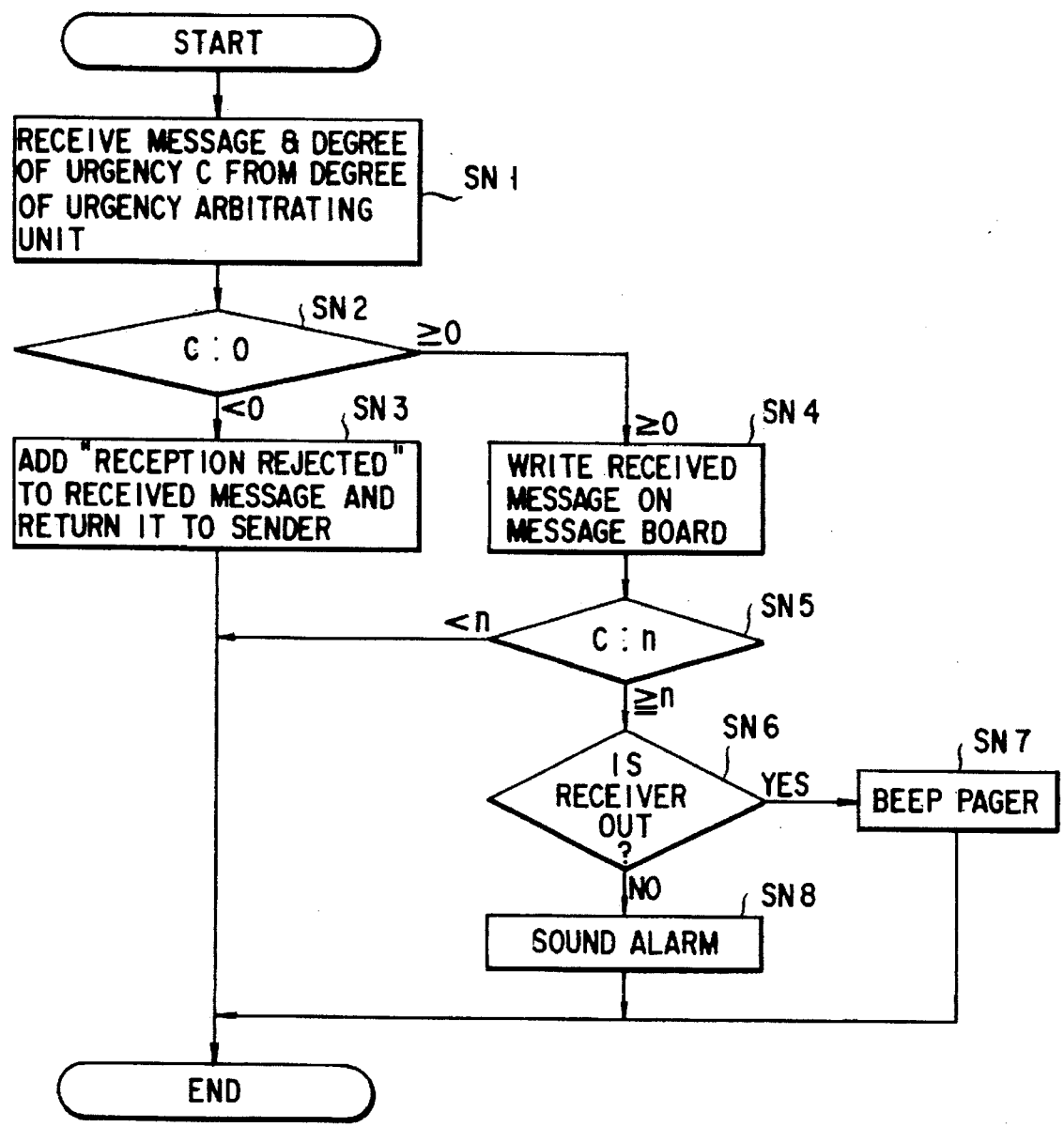
FIG. 32 is a flowchart for the processing at the media converting unit.

The flow of this processing and its detailed arrangements are shown in FIGS. 32 and 33.

In FIG. 32, the media converting unit 570 starts operation by receiving the message and its degree of urgency C from the degree of urgency arbitrating unit 560 via a message and degree of urgency receiving section 571 (step SN1). The media converting unit 570 checks the value of the degree of urgency at the degree of importance judging section (step SN2). When the value of the degree of urgency is negative, it means that the called party cannot receive the message, so that the received message is attached with "Reception rejected," and is returned to the calling party via the returning section 574 (step SN3). At step SN2, when the value of the degree of urgency is positive, the received message is written on the message board 578 (step SN4).

Further, when the value of the degree of urgency is smaller than the boundary value previously set in the boundary value recording section 573, it is left unchanged. Then, control waits for the called party to access the message at his convenience (step SN5). When the value of the degree of urgency is larger than the boundary value, the alarm generating section 575 informs the called party of arrival of the message. To do this, a check is made to see if the called party is in front of a terminal (step SN6). If he is at the terminal, the computer alarm is sounded (step SN8). If he is not at the terminal, his pager is beeped to notify the called party of arrival of the message (step SN7).

The media converting unit 570 may cause the speech recognition section 577 to convert the low-urgency message transmitted in voice into characters and store them in a spool (so that the called party may skip over it at his convenience), or may cause the sentence reading section 576 to convert character data into speech data to interrupt the called party (who can listen while continuing his work).

An example of the operation of the second embodiment will be explained. In this example, the calling party A transmits a message to the called party B by means of a computer.

Figure 34A:
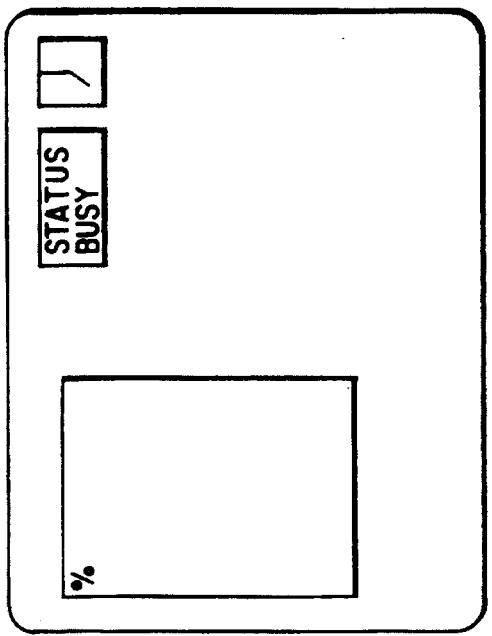
FIGS. 34A through 34C are views of operating screens in the system of the second embodiment.

FIG. 34A shows an example of a screen indicating the fact that a message that "An urgent meeting on project C will be held today at 1:00 p.m. Be sure to prepare material and attend the meeting," which A will send to B, has been created at 8:00 a.m.

When an instruction to send a message is given, the calling party degree of urgency judging unit 520 finds in the message the time limiting words "today at 1:00 p.m." and the strictness expressing words "be sure." It is judged from the word "prepare material" that much labor is required and from the words "project C" that it is important in connection with work. Therefore, the calling party degree of urgency judging unit 520 attaches very great urgency to the message and sends the message to the sender 530. The sender 530, because the message received is of very great urgency, sends the message to B using a reliable transmission channel even if it costs much.

Figure 34B:
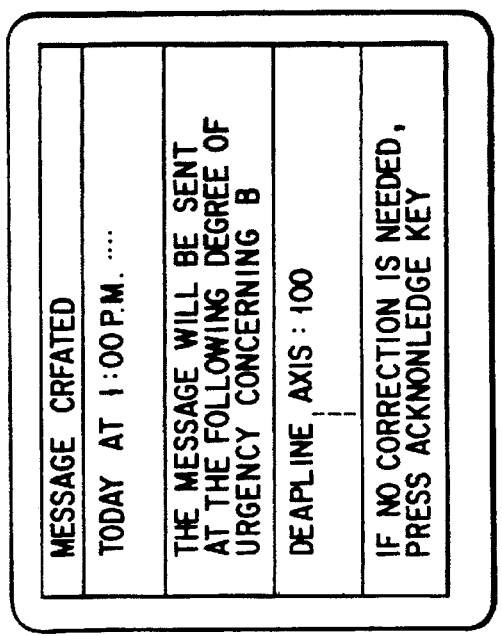
Figure 34C:
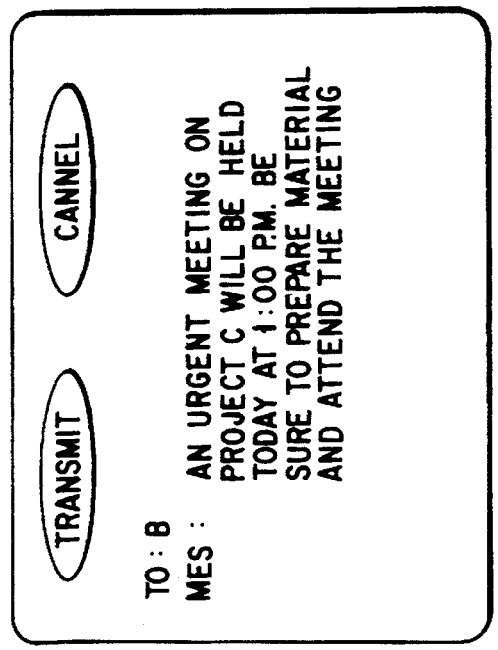

On the other hand, B enters in the state judging unit 550 the effect that the time 8:00 a.m. belongs to early in the morning, and the present state is judged to be a busy state (FIG. 34B). In the transmitting unit at the called party B, the receiver receives the message and the degree of urgency and transfers it to the degree of urgency arbitrating unit 560. Because B is in a busy state but the message has very high urgency from the superior, the degree of urgency arbitrating unit 560 judges that the message is of high importance for the called party and attaches high importance to the message and sends the resulting message to the media converting unit 570. To interrupt B at a high level, the media converting unit 570 causes the computer in front of B to produce a calling tone and display the message, overriding the other representation (FIG. 34C).

The calling party degree of urgency judging unit 520 can attach degree of urgency to the message of the calling party by the operation in FIGS. 25A to 25C. It can modify the degree of urgency if necessary by asking the user to confirm the degree of urgency.

Figure 35:
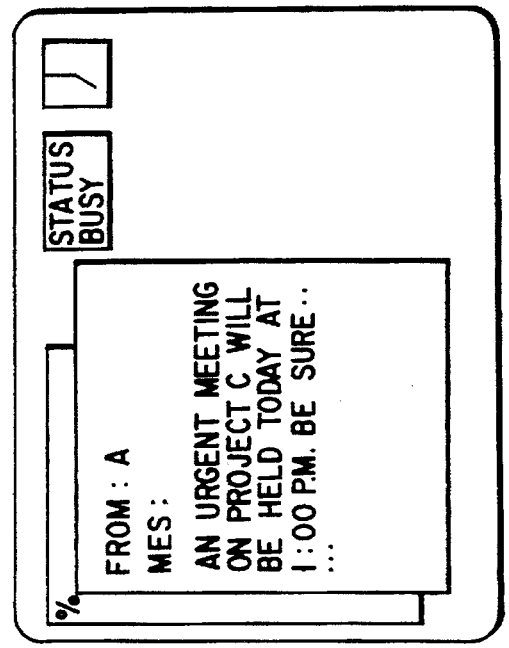
FIG. 35 is a view of a screen requesting the confirmation of added degree of urgency.

FIG. 35 shows an example of a screen for asking the user to confirm the attached degree of urgency. In FIG. 35, when the degree of urgency is modified, the contents of the modification are recorded, the modification can be used in a subsequent degree of urgency judgment to attach degree of urgency.

Figure 36:
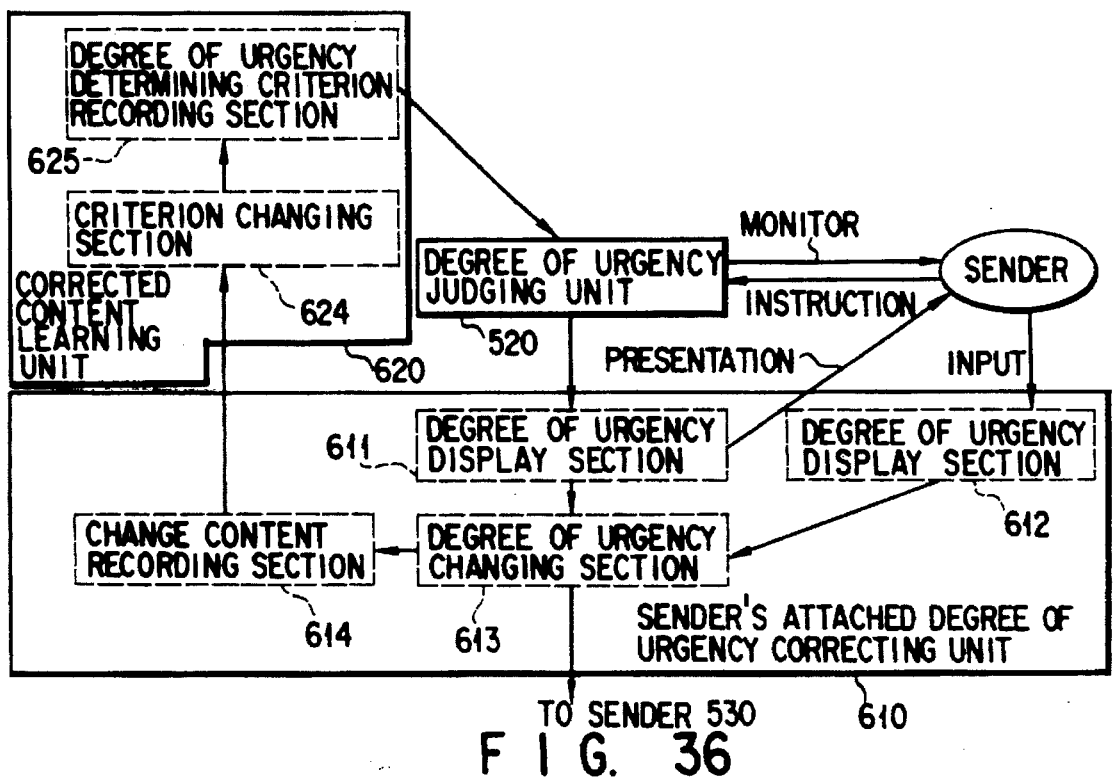
FIG. 36 is a schematic diagram of an arrangement for correcting the added degree of importance on the calling party side.

FIG. 36 is a block diagram of an arrangement for modifying the attached degree of urgency (in the order of calling parties).

The calling party's attached degree of urgency correcting unit 610 causes the degree of urgency display section 611 (normally composed of a CRT display, for example) to present the degree of urgency attached by the calling party degree of urgency judging unit 50 to the calling party. The calling party, seeing the display, enters degree of urgency from the degree of urgency input section 612 (normally composed of a keyboard, for example). Then, based on the value, the degree of urgency changing section 613 modifies the degree of urgency attached to the message and sends the new degree of urgency together with the message. The modification made here is recorded in the change content recording section 614. The recorded modification is then transferred to the corrected content learning unit 620. According to the transferred contents, the criterion changing section 624 changes criteria for determining degree of urgency and the resulting criteria are recorded in the degree of urgency determining criterion recording section 625. At this time, by knowing the called party's state through access to the called party's state judging unit 550 via a communication line and by displaying the called party's state together with the degree of urgency on the degree of urgency displaying section 611, the calling party may enter a new degree of urgency while comparing the sate with the degree of urgency.

The degree of urgency arbitrating unit 560 can modify and learn the degree of urgency by the user's instructions as well as determines the degree of importance to the called party by the operation shown in FIG. 27. Learning may be achieved for relations for computing degree of importance from the degree of urgency and the called party's state. It is possible to lower the calling party's degree of urgency only for a particular calling party.

Figure 37:
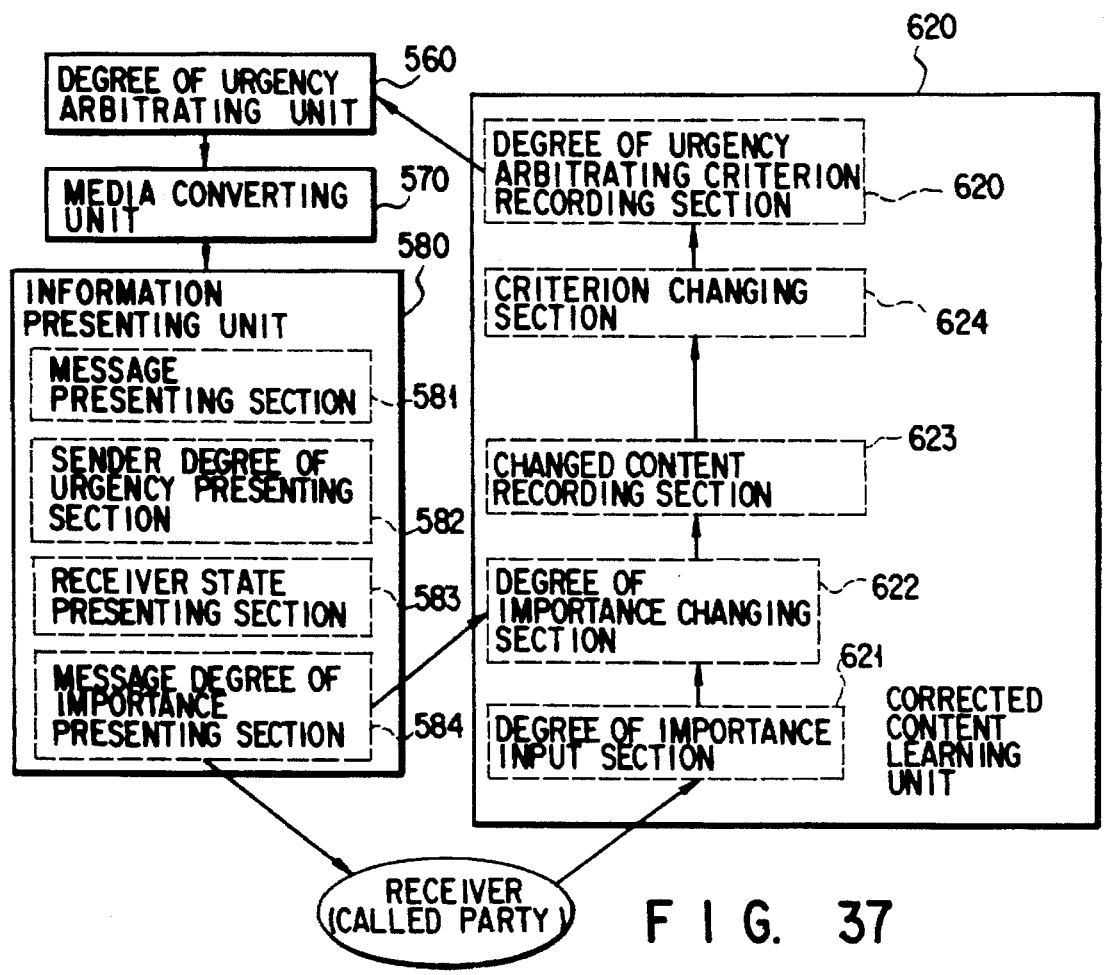
FIG. 37 is a schematic diagram of an arrangement for correcting the added degree of importance on the called party side.

FIG. 37 is a block diagram of an arrangement for modifying the determined degree of importance (the called party side).

With an information presenting unit 580 (normally composed of a CRT display, for example), the user looks at the contents of the message presented by a message presenting section 581 and the degree of importance of the message presented by the message degree of importance presenting section 584, and enters a degree of importance he thinks optimum. The degree of importance changing section 622, based on the entered degree of importance, changes the degree of importance attached to the message and the new degree of importance is recorded. The modification made here is recorded in the modified content recording section 623, and the criterion for determining the degree of importance is changed by the criterion modifying section 624 and stored in the degree of importance determining criterion recording section 625. The modification of the criterion is made so that the newly entered degree of importance is computed from the degree of urgency attached by the user (the calling party degree-of-urgency presenting section 582) and the state of the called party (the called party state presenting section 583).

FIG. 38 is a block diagram of an arrangement for letting the calling party know how the presented message has been handled.

The message presented by the information presenting unit 580 is entered in a called party reaction sensing unit 630 for sensing how the called party has handled the message. Specifically, a message processing section 631 allows the user to read the information and a processed content recording section 632 records how the called party has reacted to the information when reading. The contents that can be recorded in the processed content recording section 632 include, for example, to what degree of importance, the called party has understood the message, whether the called party has discarded or kept the message after reading, whether the called party has not read the message yet, whether the called party has entered the contents of the message in the scheduler, and the result of the called party observing means monitoring the state of the called party when he is reading. This information is recorded in the response recording section 640.

The contents of the response recording section 640 can be presented to the calling party by means of the message processed content checking unit 650 for investigating how the message sent by the calling party has been handled. Specifically, upon request from the calling party via the state inquiring section 651, the responding state of the called party is presented to the calling party by means of the state presenting section 652. This lets the calling party know how his message has been handled by the called party. In this case, for example, when the transmitted information has been treated against the calling party's expectation or when it is left unread for a long time, the degree-of-urgency changing and retransmitting unit 660 can send an alarm message to the calling party or change the degree-of-urgency of the message and send it again.

Figure 39:
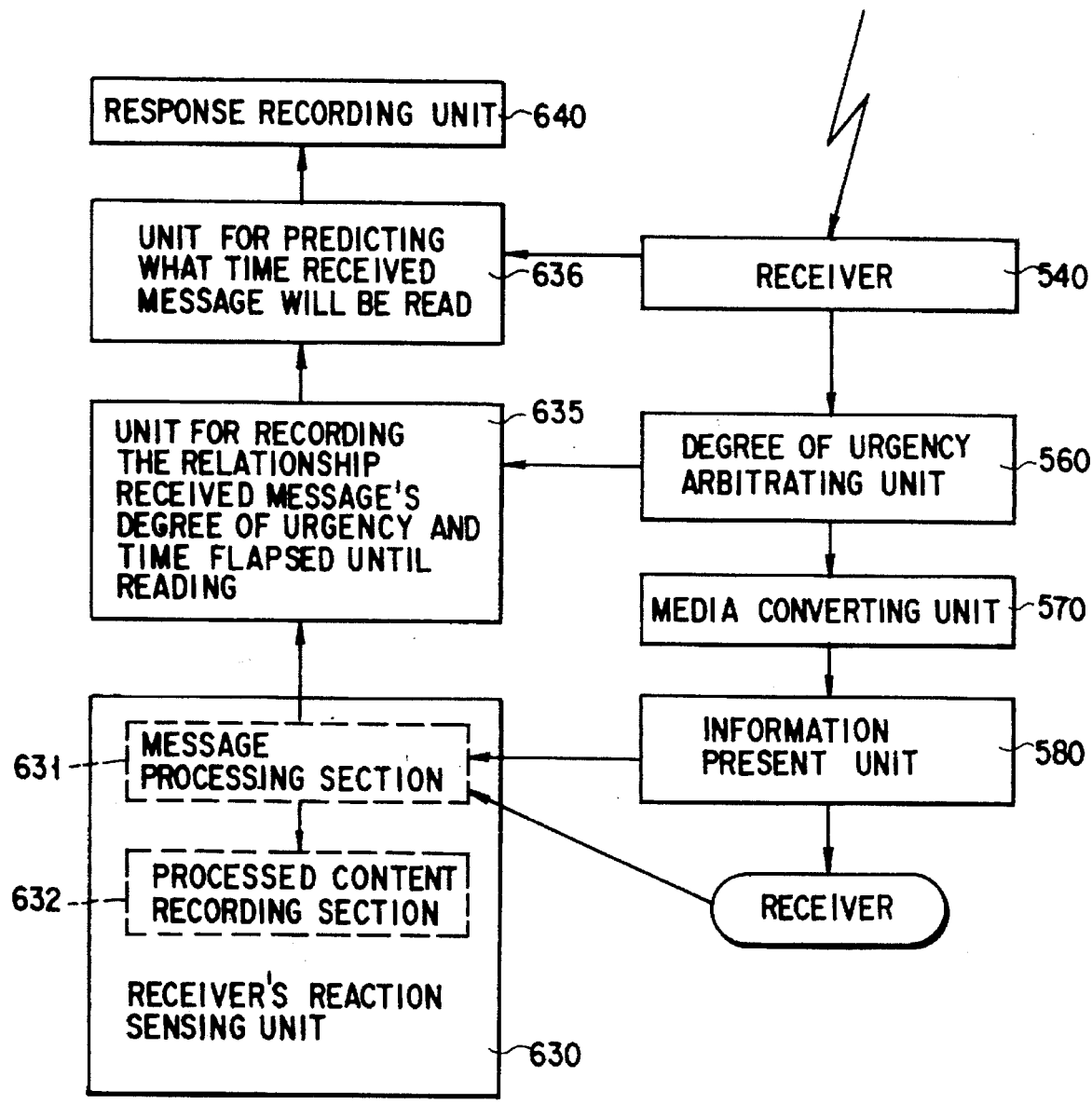
FIG. 39 is a schematic diagram of an arrangement for storing another piece of information in the response recording section of FIG. 38.

FIG. 39 is a block diagram of an arrangement for storing another piece of information in the response recording section 640 of FIG. 38.

By recording an interrelation between the degree of importance of the message from the degree of urgency-time elapsed before reading relationship recording unit 635 and the time from when the called party has received the message until he reads, and then predicting what time the called party will access the message newly received by the message processing time predicting unit 636, this prediction result can also be recorded in the response recording section 640. The contents recorded here are presented to the calling party via the message processed content checking unit 650.

Figure 40:
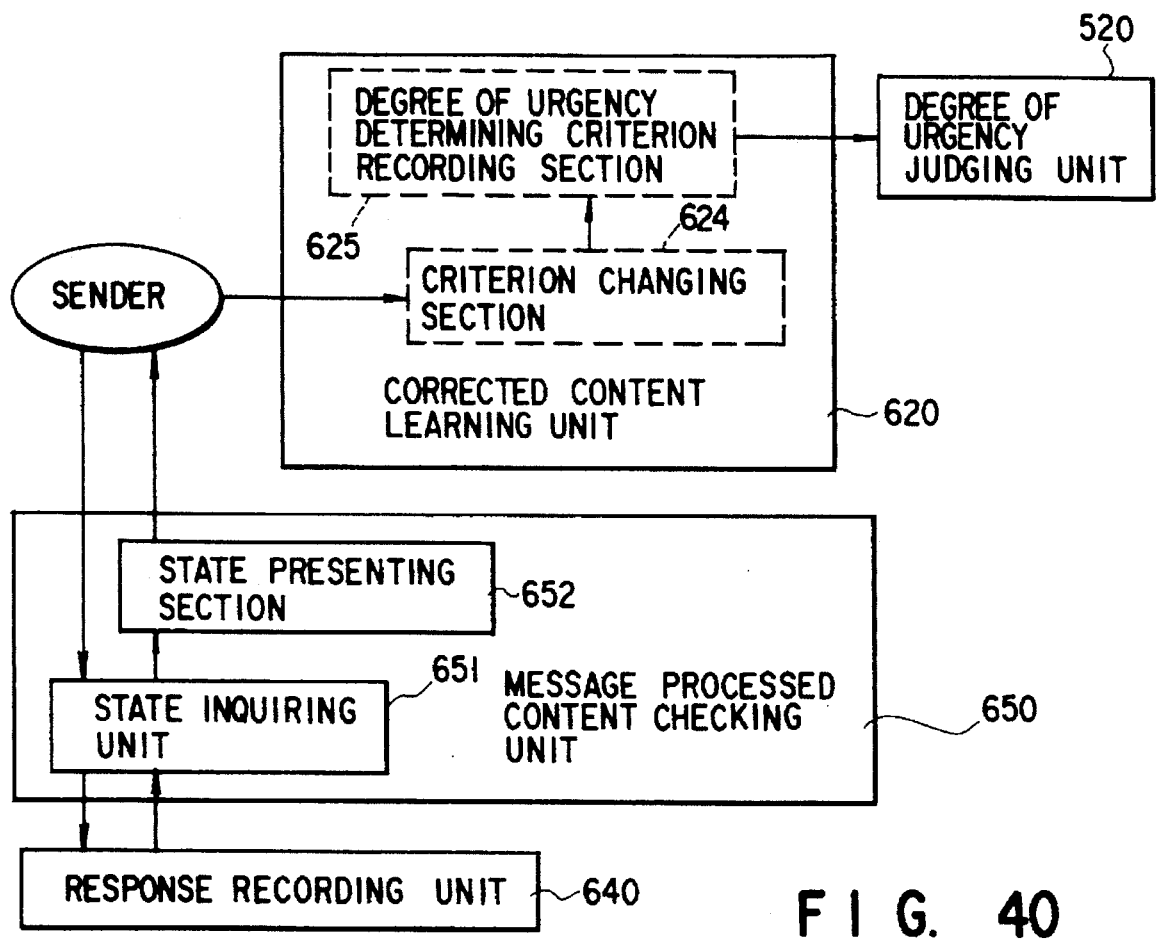
FIG. 40 is a schematic diagram of an arrangement for allowing the calling party to learn the relationship between the degree of urgency and how to handle the message.

FIG. 40 is a block diagram of an arrangement for the calling party to learn the relationship between the degree of urgency and the message.

The calling party degree-of-urgency judging unit 520 finds how the message sent by the calling party has been handled by the message processed content checking unit 650 by accessing the response recording section 640 and the modified content learning unit 620 for learning the relationship between the degree of urgency and the processed contents enable the learning of an interrelationship between the message sent by the calling party and the degree of importance attached to the called party. Thus, This serves as a reference in determining the degree of urgency when the calling party will next time send a message to the same called party.

Figure 41:
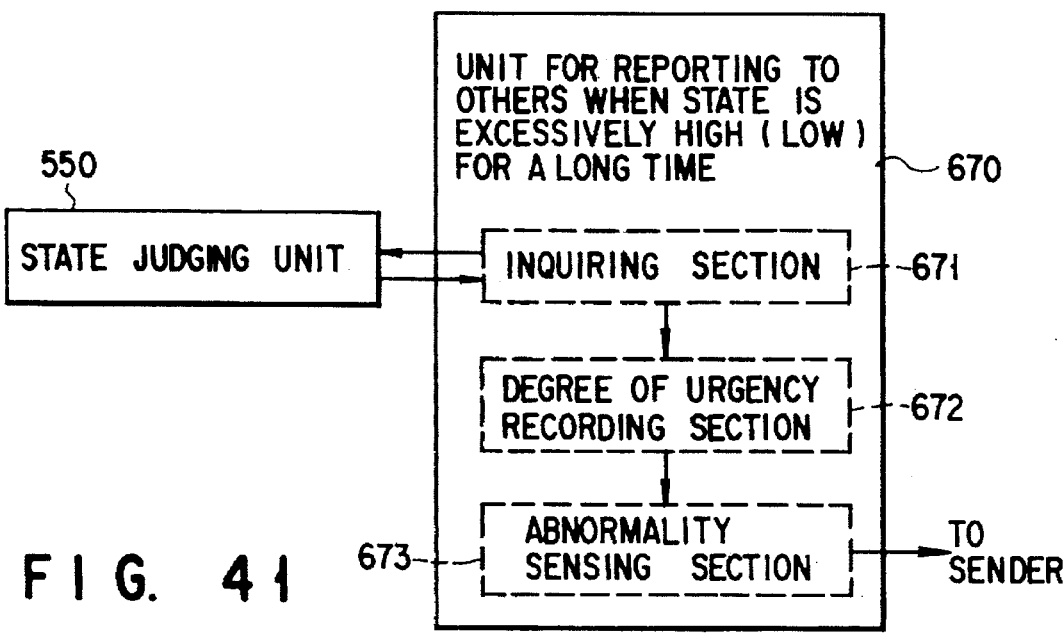
FIG. 41 is a schematic diagram of the state judging unit provided with another function.

FIG. 41 is a block diagram of an arrangement for adding another function to the state judging unit 550.

While the called party state judging unit 550 determines the state of the called party on the basis of the operation shown in FIG. 29, it may store the state determined here and present the present state when accessed by another person. When a busy state has continued for a very long time, it can be considered that something unusual has happened to the called party, the abnormality reporting unit 670 may alarm the other people of the situation.

Although in the above embodiment, one-to-one communication is used, the present invention is not limited to this type of communication. A notice of a conference and a record of the proceedings or the like are transmitted from a single calling party to more than one called party. In this case, since the called parties are specified, the same message may be sent separately to each called party. Therefore, the above function can be applied to this case.

The present invention may also be applied to a broadcast which does not specify called parties. Specifically, the message-creating person may set a called-party-independent value among degrees of urgency to the message and send the message. For example, to broadcast a notice of a lecture or the like, the message may be added with the degree of urgency concerning the deadline obtained from its date. Then, only called parties who are not busy undergo interrupt.

Figure 42:
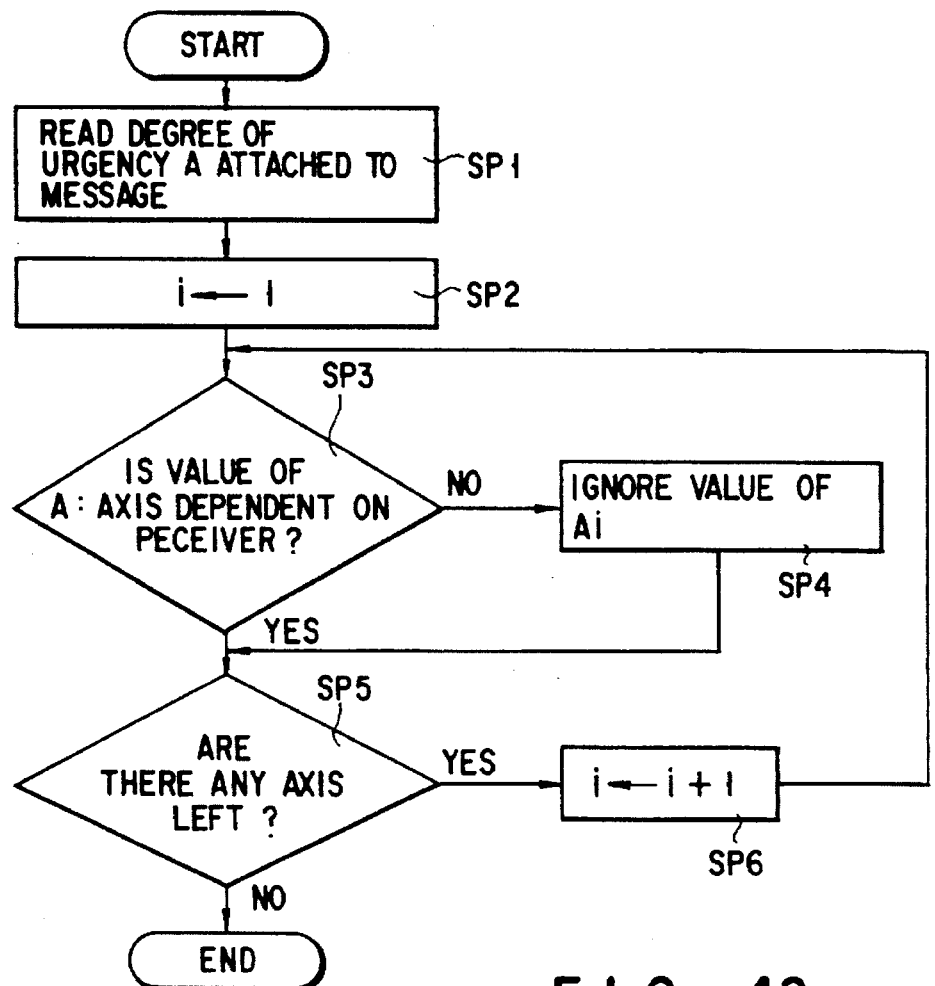
FIG. 42 is a flowchart for the addition of the degree of urgency of message to an unspecified called party.

FIG. 42 is a flowchart for the process of attaching a degree of urgency to a message to unspecified called parties.

The degree-of-urgency arbitrating unit 560 starts operation by reading degree of urgency A attached to the message (step SP1). The axis to be read is initialized to a first axis and the first axis of A is extracted (step SP2). A check is made to see if the axis is dependent on the called party (step SP3).

At step SP3, if the first axis of A is dependent on the called party, this axis is ignored (step SP4). A specified process is performed only when it is independent. By repeating the processes from step SP3 until all the axes of A are checked, a process for broadcasting is performed (step SP6).

Further, while in the above embodiment, a degree of urgency is attached to a message on the transmission side, the same function may be provided for a message sent from a transmitting source without a degree-of-urgency attaching function, by analyzing the message on the receiving side.

Figure 43:
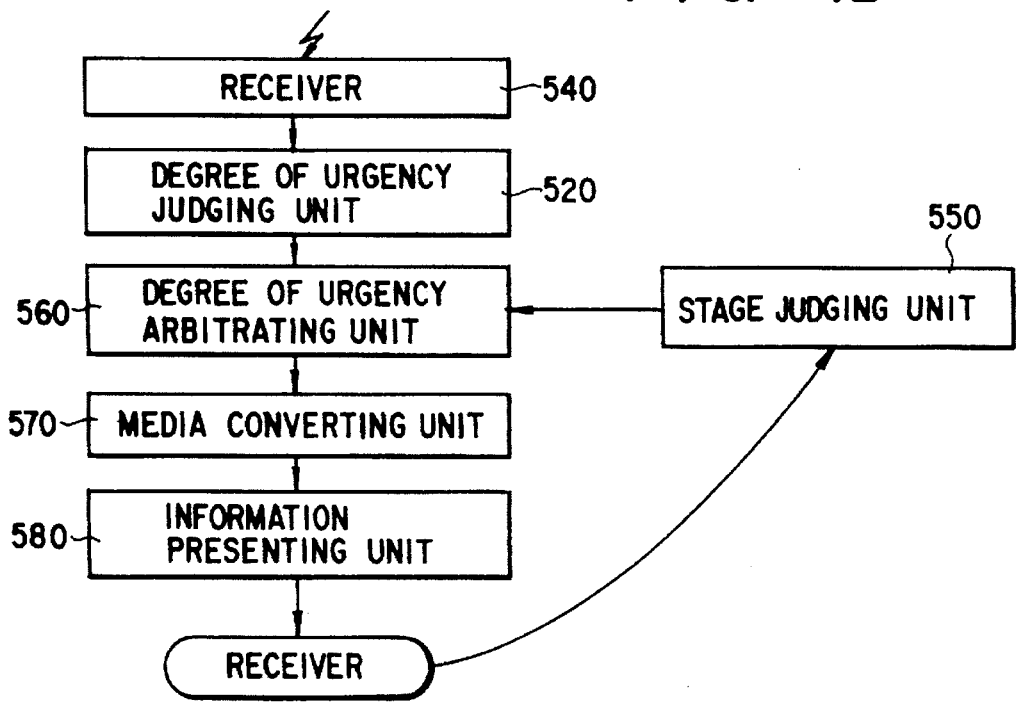
FIG. 43 is a schematic diagram of an arrangement where the calling party degree of urgency judging unit is provided on the called party side.

FIG. 43 is a block diagram of an arrangement for providing the calling party degree-of-urgency judging unit 520 for the called party side. In FIG. 43, the calling party degree of urgency judging unit 520, when the received message is not attached with a degree of urgency, operates in the same way as the calling party degree-of-urgency judging unit 520.

In FIGS. 42 and 43, how a degree of urgency of a message is processed for unspecified called parties has been explained. In a third embodiment, the present invention is applied to one-to-many broadcasts, which will be explained concretely below.

FIG. 44 is a schematic diagram of a human interface system according to a third embodiment of the present invention. In the third embodiment, one-to-one communication of the second embodiment is applied to a broadcast centered around an information station.

In FIG. 44, more than one work station 700 is connected to each other through a network 950, to which an information broadcasting station 750 is connected. The information broadcasting station 750 corresponds to a site handler 240 in FIG. 3. Each work station 700 corresponds to a client 300. The information station 750 may be constructed separately from the site handler 240.

Each work station 700, which is composed of, for example, a personal computer-based terminal unit, is placed on the desk of each user for dealing with various duties. The information broadcasting station 750 collects and processes various types of information needed by the user at each work station, and broadcasts those pieces of information to each work station 700. In this case, the information broadcasting station 750 is composed of similar hardware to that of the work station 700.

Each work station 700 and the information broadcasting station 750 will be explained in more detail.

To deal with various duties, each work station 700 has the functions as shown in FIG. 45: a computer program synthesis function 700a, a personal schedule managing function 700b, a telephone/electronic mail function 700c, an electronic conference function 700d, a data base retrieving function 700e, a text file creating function 700f, a presentation material creating function 700g, a presentation function 700h, a reading function 700i, a TV watching function 700j, a game function 700k, and other functions 700l. In this case, dedicated application programs are prepared for the individual functions. Each function is achieved by using a corresponding program.

Each work station 700 contains an information broadcast receiving section 710, an information representing section 712, a user interface connecting section 714, and an information retrieving section 716 as shown in FIG. 46.

FIG. 47 is an explanatory diagram for the operation of the information broadcast receiving section 710.

The information broadcast receiving section 710, receiving an information broadcast transmitted from the information broadcasting station 750 through a network 950 (step SQ1), executes the operations explained below, according to the received information.

When receivers are selectively specified in the received information (step SQ2), for example, when there are requirements for receivers such as all the user or the user in their thirties, the users receive an information broadcast only when they fit to the requirements. When the user has specified by a keyword (step SQ3), the information transmitted by a previously entered keyword is selected and only the necessary information is received and the rest is discarded. Here, keywords corresponding to pieces of information the user wants are entered previously.

If there is pay information in the received information, a charging process is executed (step SQ4). There are two types of charging systems: in one type of charging system, the user or the subscriber, when receiving the information, pays a charge to the broadcasting station or the informant, and in the other type of charging system, the broadcasting station or the informant (publicity man) pays a charge to the subscribers in anticipation of the users receiving and reading advertisement. In the latter case, it is possible to charge more money as the degree of urgency is made greater.

The information received at the information broadcast receiving section 710 is sent to the information presentation section 712. The information presentation section 712 determines an information representing method to display the received information in a suitable manner for the user.

As shown in FIG. 48, the information representing section 712 determines an information representing method according to the degree of urgency of the information received and the user's present working conditions (step SR1). A degree of urgency is obtained in three manners: one method is that the information broadcasting station attaches a degree of urgency to the information to be transmitted; another method is that the user sets a degree of urgency to the keyword to be entered and determines the degree of urgency of the selected information (or the degree of importance) when the user selects the desired information by a keyword; and a final method is to determine the degree of urgency after examining these two types of degree of urgency in every respect. When the information broadcasting station attaches a degree of urgency, how similar information sent in the past was presented at the user's work station 700 may be sensed in addition to the priority of the information to be transmitted and based on the result, the degree of urgency may be increased or decreased.

The following information presenting methods can be considered:

The information received is stored in a spool area and when the user has settled his present work for the time being, the user himself accesses the spool to get information (normal case).

The information received is notified immediately to the user (in case of emergency, interruption is made and large representation is provided).

For reference, small, rough representation is provided so as not to interfere with the user's work.

Next, a method of displaying to the user is determined (step SR2). The following displaying methods can be considered:

Arrival of information is displayed in a small size at one end of the multi-window screen. For example, it is suitable for display of the present exchange rate of the yen.

The message received at the sacrifice of the interruption of the user's work is displayed. For example, it is suitable for display of emergency information such as typhoon information.

Information is converted to transmit it over a different communication channel. For example, when the user is away on business, his pager is operated to inform him of urgent information.

The user is informed by a change in sound. For example, when an important mail has arrived, a mail arrival tone is sounded in a manner different from ordinal mails. Or when a mail has arrived from a particular person, the mail arrival tone is sounded differently.

The user is informed by the change of BGM. For example, when it is found from weather information that it is raining outside, the music is changed.

Colors and brightness on the screen are changed. For example, when it gets dark, the screen is made brighter (it is suitable for an office without windows).

The information whose representing method and display method have been determined at the information representing section 714 is sent to the user interface section (not shown) of the work station 700 via the user interface connecting section 714 and is displayed to the user.

When the user wants to get the information saved at the information broadcasting station 750, the information retrieving section 716 is connected to the information retrieving section of the information broadcasting station 750 to retrieve the data saved in the information managing section. This is the same as a conventional data base retrieving technique.

Figure 50:
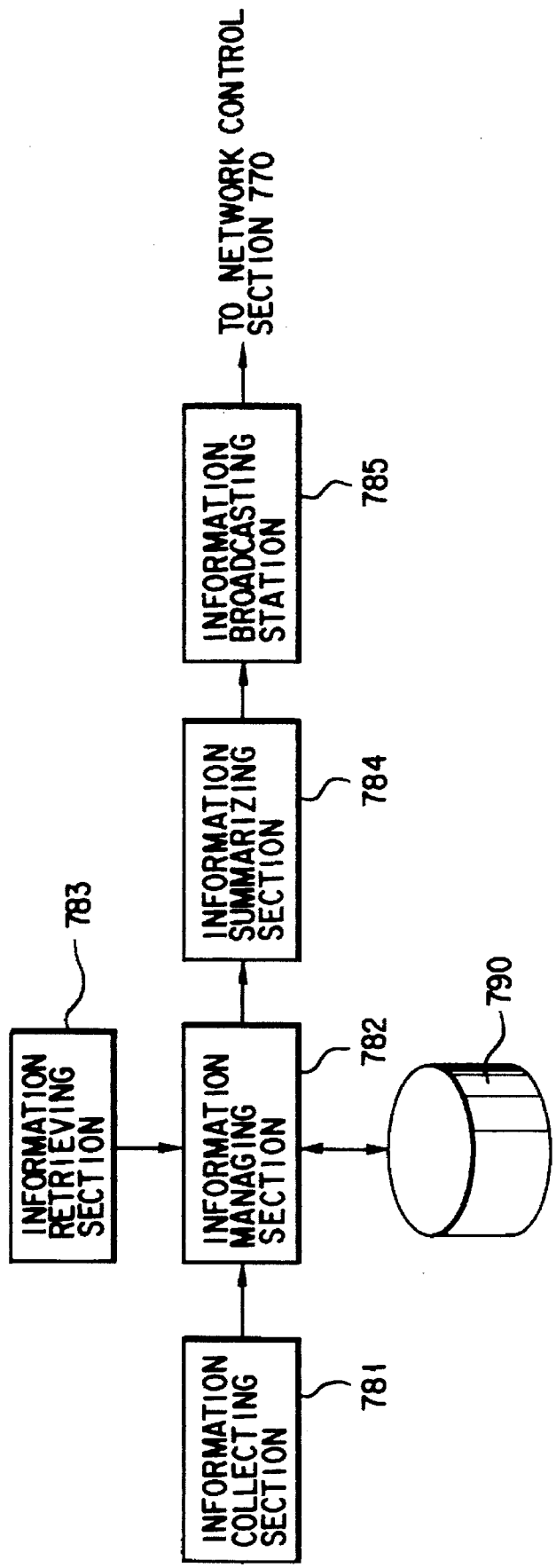
FIG. 50 is a schematic diagram of the control section.

The information broadcasting station 750, as shown in FIG. 49, is composed of an input/output unit 760, a network control section 770, a control section 780, and a storage section 790. The control section 780 contains an information collecting section 781, an information managing section 782, an information retrieving section 783, an information summarizing section 784, and an information broadcasting section 785, as shown in FIG. 50.

The information collecting section 781 collects various types of information to be acquired. For example, it collects information on the users entered in the computer, attendance information on whether the user is working at the terminal of work station 700, positional information on where the user is now, working information on what the user is doing, user's schedule information, information on the electronic conference being held at present, and information on a record of the proceedings for the electronic conference. In this case, it is necessary to collect only pieces of information that are allowed to see in terms of security.

The operation of the information collecting section 781 is shown in FIG. 51.

An item to be collected is selected from various types of data to be acquired (step SS1). This item is previously specified in a file or the like. A collecting action is carried out according to the procedure in a file in which the procedure for collecting the selected item (step SS2). The information obtained from the execution is collected as the collected information (step SS3). The collected information is put in specified order for later retrieving (step SS4).

The information managing section 782 manages the collected information in a unified manner. In this case, the information managing section 782 puts the collected pieces of information in order by assigning them keywords for easy retrieving, stores them in the storage section 790, or reads the stored information from the storage section 790.

The information summarizing section 784 processes the collected information into a form suited for broadcasting, selects a theme suitable for a broadcast, retrieves and edits retrieves and edits the information suitable for creating information on the theme. For example, the following types of information are prepared in the form of theme: information on the people now accessing the computer, a list of attendants at the electronic conference now going on the computer, a prompt report of the proceedings, information on the minutes of the proceedings, information on the questions in the conference, advertising information on new products, a weather forecast, information on exchange, etc. The procedures for processing information on these themes are previously prepared, whereby these types of informations are processed into suitable forms for the user.

The operation of the information summarizing section 784 is shown in FIG. 52. The previously specified theme is selected (step ST1). For the selected theme, the necessary data to create the information related the theme is retrieved (step ST2). The retrieving sequence is specified in a similar manner to the selection of a theme. The retrieving data is then processed in a form that the user can watch easily (step ST3). The processing here includes providing a table of contents, graphing, and providing speech data and image data. The procedures for processing are specified at the time of selection of a theme.

The information broadcasting section 785 sends the information to be transmitted to the transmitting side. The operation of the information broadcasting section 785 is shown in FIG. 53. A keyword to facilitate information retrieving is added (step SU1) and then the addressees of information are attached (step SU2). At step SU2, for example, the addressees include all the user under a reception contract and people under a reception contract by field. They form a delivery range specified by the addressees. The information-providing side may, of course, information-receiving people. Those people include, for example, all the employees in a company and all the elementary school children. Next, a level at which the information is provided is selected (step SU3). By graduating the information to be given according to the contents of the contract, for example, contractors in one section are provided with headline information and those in another section are provided with more detailed information. These pieces of information are subjected to encoding or the like as required (step SU4). Further, they are added with charging information (step SU5) and then transmitted (step SU6).

The information thus processed at the control section 780 is supplied to the network control section 770. The network control section 770 sends the broadcasting information for each work station 700 to the network 950 shown in FIG. 44. The network control section 770 collects from the network 950 the various types of information necessary for information acquisition at the information collecting section 781.

A concrete example to which the third embodiment of the present invention is applied is explained.

In this embodiment, it is assumed that people belonging to a department are working in a satellite office system, where they are in different places far away from each other, performing their duties in harmony with one another.

In this case, at the work station 700 of each member of the department, various types of information broadcasted from the information broadcasting station 750 via the network 950 are displayed in addition to the representation related to their work.

FIG. 54 shows an example of a screen display at the work station 700 at which each member of the department is working. The screen, which is displayed in a bit-map multi-window mode, is constructed so that the member may give instructions on the screen by clicking the mouse, enter characters from the keyboard, input sound by means of audio equipment, such as a microphone or a CD player, if necessary, and be able to listen to sound with a speaker or a headphone. Moving pictures can also be displayed in the bit-map window. In this case, moving pictures are taken in by video equipment such as a TV camera or a VTR.

On the initial screen shown in FIG. 54, an imaginary office is displayed. In this example, the various types of information previously collected and broadcasted by the information broadcasting station 750, including the user's attendance information, the user's positional information, and the user's working information, are received at the work station 700 and a presenting method and a displaying method are determined. In this case, seats for all the members of the department A, B, C . . . are displayed imaginarily in one office 720, with the present states of the individual members A, B, C, . . . indicated differently in such a manner that "present" is denoted by a white background, "absent" by hatching, and "on a business trip" by a mesh. In the case of "on a business trip," whether he can be paged or accessed may also be displayed. In the case of "absent," whether he is in another room (laboratory 723), is having a break, or is absent for a long time may also be displayed. People performing the same duties are displayed side by side together with their states including attendance. Further, section chief Q, manager R, general affairs S, etc. are displayed in different places.

With the screen example of FIG. 54, based on the information on the electronic conference from the information broadcasting station 750, the imaginary conference room 721 is displayed to allow confirmation of the room being occupied or vacant. When other persons are in conference and occupied the room, the color displayed is changed. When the user himself is in conference, a conference tool 722 is displayed. Duties are performed on the window 724, where the users are running a program writing tool (700a), a text file creating tool (700f), etc while carrying out his work.

Figure 55:
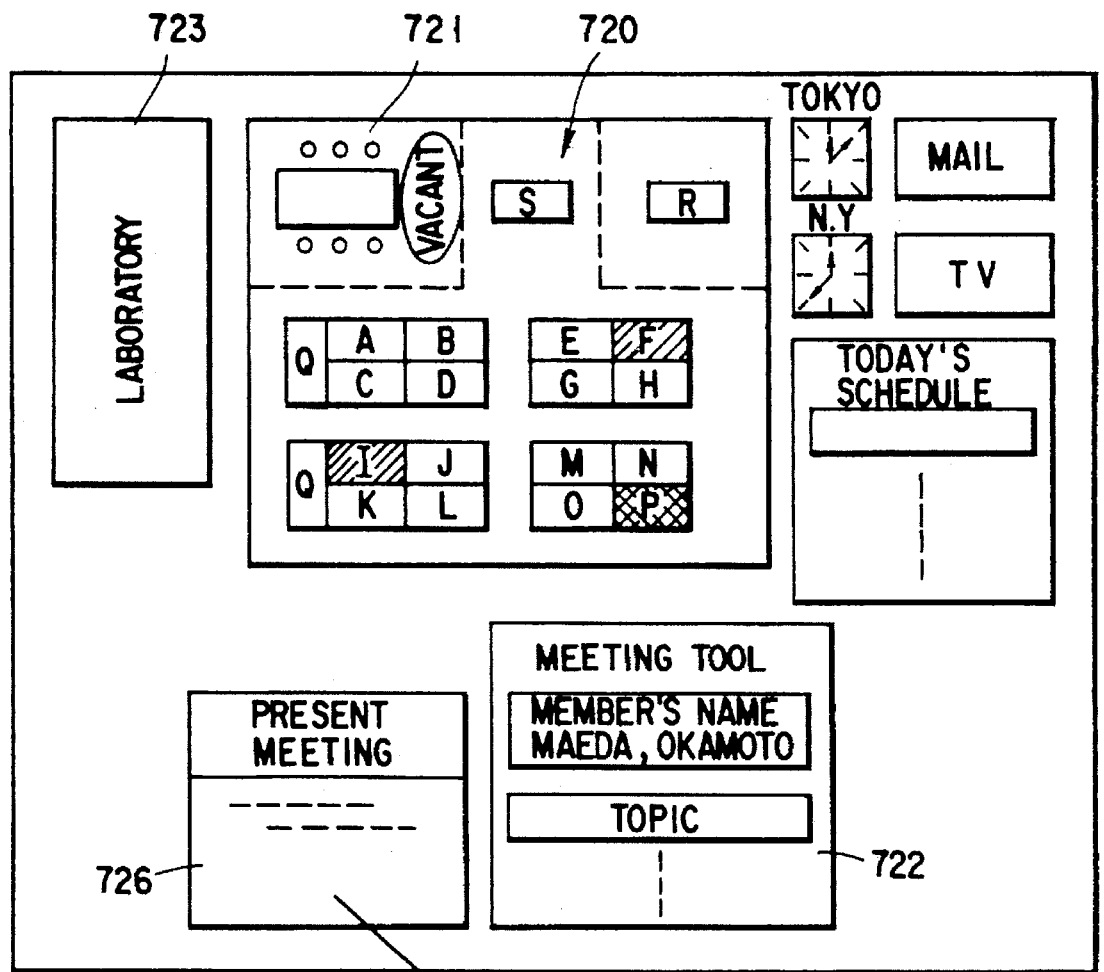
FIG. 55 is a view for explaining a screen display in the third embodiment.

In this state, when needing detailed information on the conference, the operator can get the detailed information as shown in FIG. 55 by clicking the mouse at a corresponding position. The information of FIG. 55 is obtained by connecting to the information retrieving section 783 of the information broadcasting station 750 to read detailed information on the conference from the storage section 790. In this case, as the detailed information 6n the conference, the present conference state (contents, members, time, etc.) 726 are displayed. A list of the past conferences and a list of conferences to be held in the future, etc. may be displayed.

When the user himself wants to participate in the meeting, he selects the conference application (the conference tool) 700d from the menu in the window and starts it (FIG. 56). In this case, when each participant starts his own tool and the conference begins, the conference application presents information on the conference to the information broadcasting station 750, thereby allowing the display of the imaginary conference room 721 to change while the conference is in progress.

By a similar technique, it is possible to interrupt another conference.

In this case, the conferences being held at present are known from the conference information, and the conference application is started to issue a request to connect to the conference. Then, the interrupt request arrives at conference members and the chairman decides whether or not they participate in the conference. If he decides to participate, they can take part in the conference. The information that new members have participated in the conference is presented from the conference application to the information broadcasting station 750. This enables the latest conference information to appear on each screen, when the conference information from the information broadcasting station 750 has been received by each work station 700.

Figure 57:
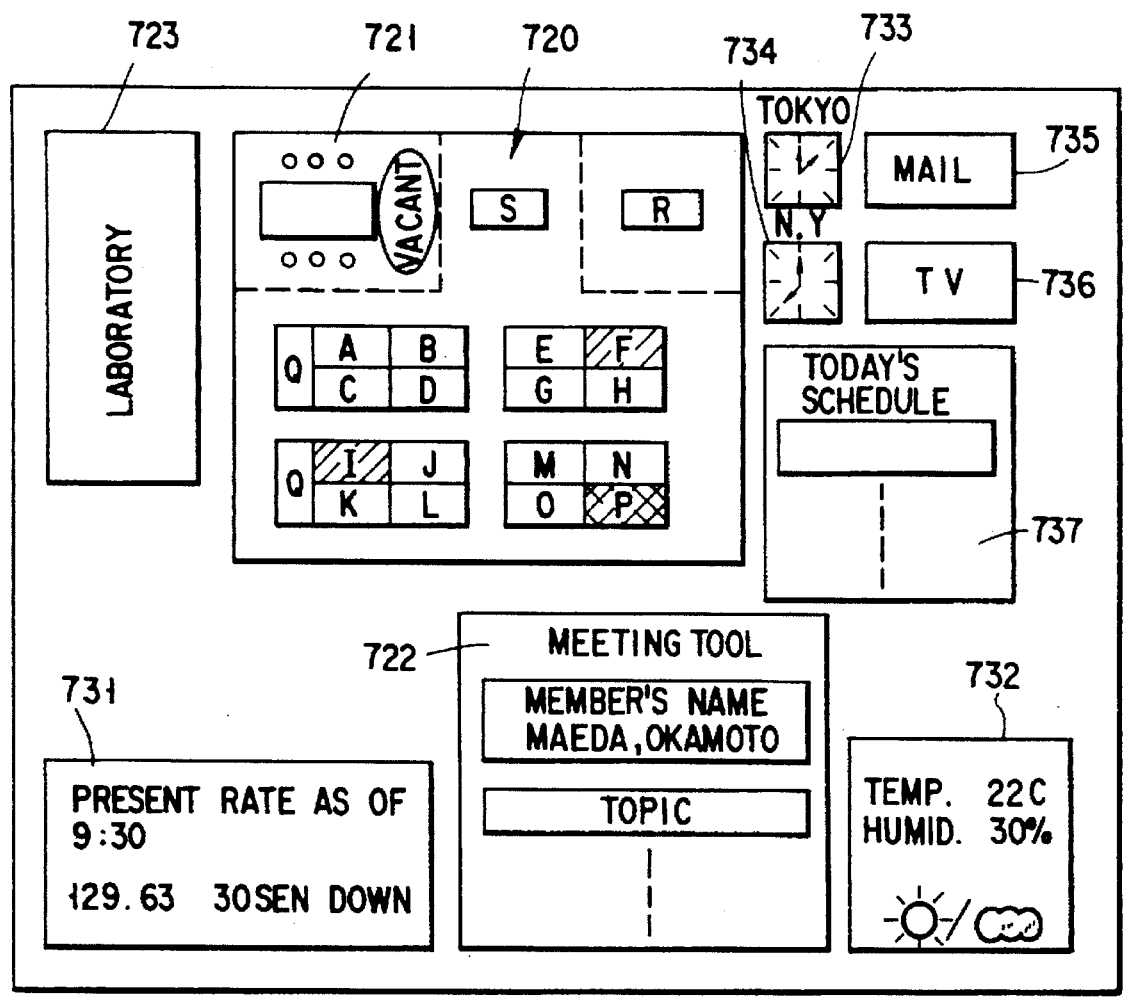
FIG. 57 is a view for explaining a screen display in the third embodiment.

Further, as the information from the information broadcasting station 750, the following types of information can be displayed on the screen as shown in FIG. 57: exchange information 731, weather information 732, time information (Tokyo) 733, time information (New York) 734, information on arrival of mail 735 (clicking the mouse here starts electronic mail tool 700c to display the contents of the mail), TV information delivering news etc. (clicking the mouse here starts TV tool 700j to widen the screen for TV display), and today's schedule information read from scheduler 700b, etc. A method of displaying these types of informations is displayed at a corner of the screen. This can be realized by the user previously instructing by a keyword the information presentation section 712 how to receive the information, so that the information presentation section 712 may display an information presenting method and a display method at the corner of the screen without interfering with the work.

Figure 58:
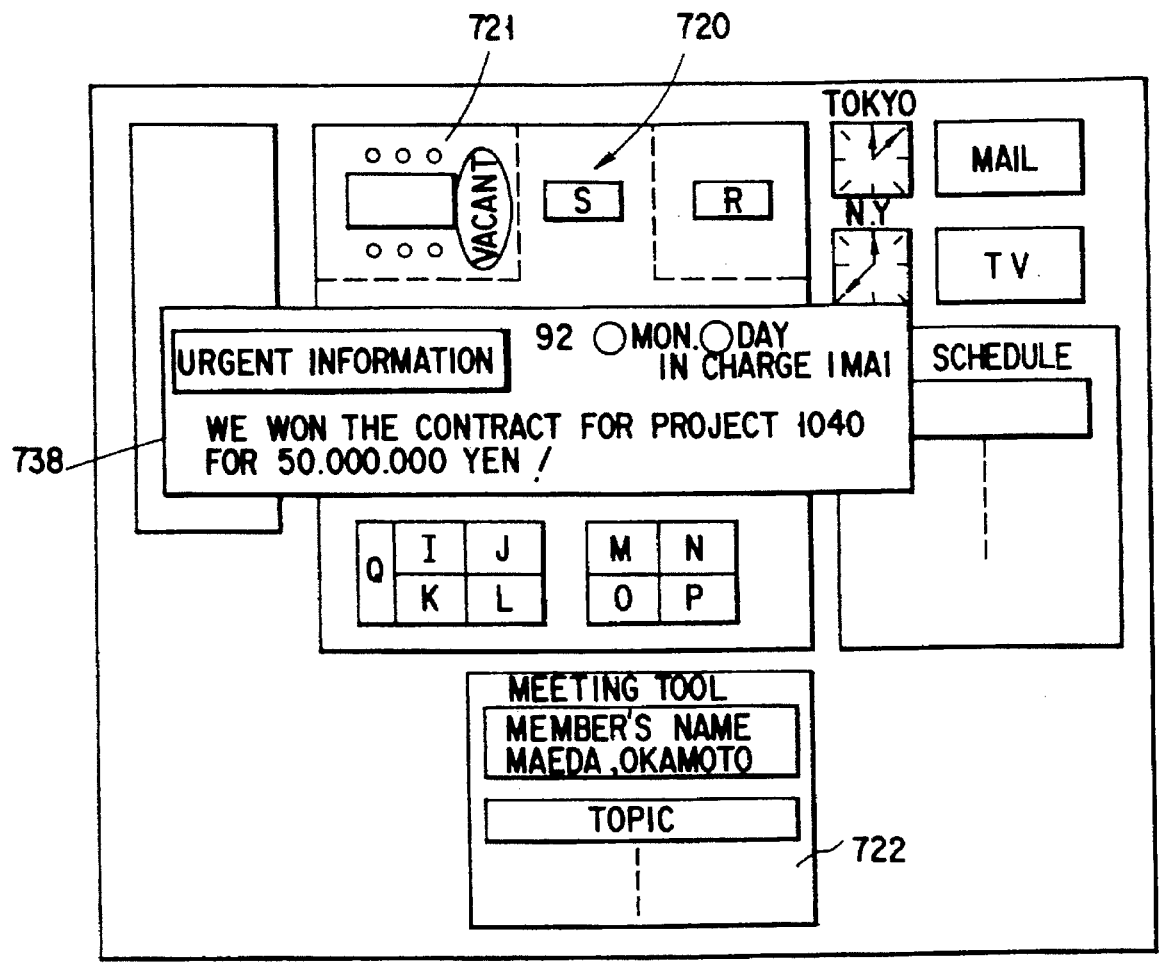
FIG. 58 is a view for explaining a screen display in the third embodiment.

When urgent information has been broadcasted, it is displayed, overriding the keyword selection at the receiving section, in a manner to interrupt the user's work. In this case, as shown in FIG. 58, the urgent information 738 is displayed in a large size in the center of the screen.

Further, viewing the imaginary office gives a grasp of the other members of the department. Because they can be contacted if necessary, a combination of necessary business applications enables the following use.

For example, when the user wants to communicate with Mr. Takahashi, he clicks the mouse at Takahashi's desk, which displays the state in which Mr. Takahashi is working. Conversely, a peeping indication appears on Takahashi's screen. Then, this allows the both parties to communicate with each other, using the telephone function and the electronic mail function on the work station 700. In this case, a dedicated window appears on the screen for use.

Clicking the mouse at coffee brings the state into a break mode, which allows the users to have an electronic chat or read electronic newspapers or weekly magazines. The user may actually leave the work stations 700 to take a break or have a lunch. In this case, the effect that the user is taking a break is displayed to the other members.

After that, when the work station 700 is terminated, the office is closed and the desks of the other members in the imaginary office are displayed as absent.

With the system of the third embodiment, the contents of the conference can be overheard, for example. In this case, when information on the electronic conference is broadcasted from the information broadcasting station, the user at work station 700 can, for example, know the contents of the conference delivering by second audio, while continuing his duties. That is, he can hear what is going on in the conference even if he has not participated in it. When the user wants to know only the attendants at the electronic conference or the keywords for topics for discussion or the contents of the conference, he can display the information extracted from the proceedings or the proceedings themselves on the screen by retrieving in his spare time the specified information broadcasted from the information broadcasting station and stored in the work station 700. The user can also can find from occupied/vacant information on the conference room displayed at the corner of the screen from the information broadcasting station whether the conference is in progress or has finished or how far the conference has proceeded.

It is possible to know what the user at another work station 700 is doing. In this case, when the working conditions of each user are broadcasted from the information broadcasting station, a table of seats in the imaginary office is displayed on the screen to tell the user whether the members are at their desks, busy, or free by color indication.

Such a method of presenting various types of information may be determined making use of the properties of information mediums. For example, when the user wants to get an outline by skipping over in a short time, a method of reading what is previously stored in text form and presenting it is suitable. When the user wants to know what is going on in the conference by sometimes paying attention, while performing his duties, a method of presenting the information in sound real-time.

While in the above explanation, the invention is applied to a satellite office environment where the imaginary office is displayed on the work station 700, it may be applied to other environments.

Figure 59:
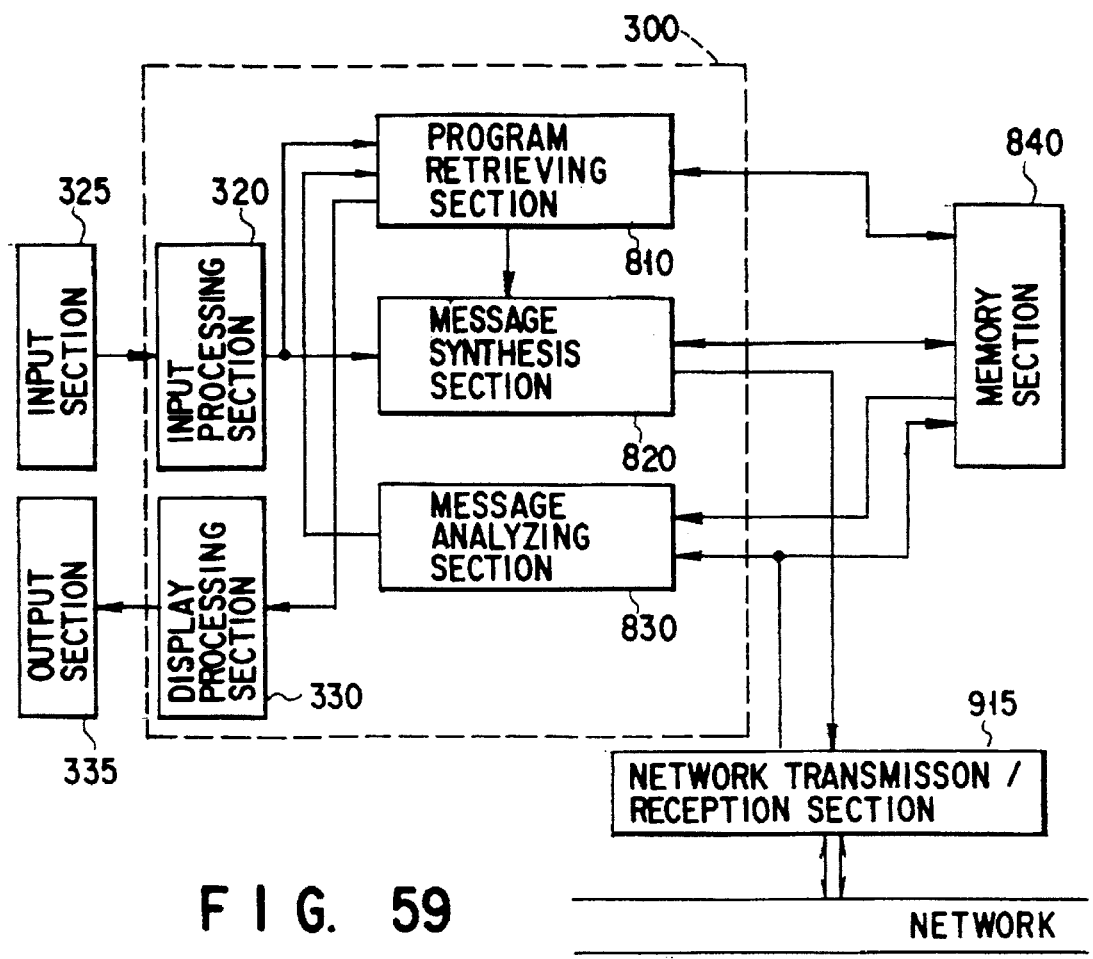
FIG. 59 is a schematic diagram of a human interface system according to a fourth embodiment of the present invention.

FIG. 59 is a schematic diagram of a human interface system according to a fourth embodiment of the present invention. The apparatus of this embodiment corresponds to the client 300.

A retrieving instruction and a keyword entered from an input section 325 are inputted to a program retrieving section 810 and a message synthesis section 820 via an input processing section 320. The program retrieving section 810 first accesses a storage section 840 of an internal storage and checks to see if there is an application program and others corresponding to the desired keyword. If such an application program does not exist, the message synthesis section 820, Using the entered keyword, changes a message into a message forming suitable for transmission to a network, and transmits it to the network via a network transmission/reception section 960.

On the other hand, when there is a reply from another user on the network corresponding to the transmitted message, this reply is inputted to a message analyzing section 830 via the network transmission/reception section 960. The message analyzing section 830 analyzes the reply in terms of correspondence, and sends the result to the program retrieving section 810. The program retrieving section 810 performs a process later explained and stores the retrieved program in the storage section 840. The fact that the desired application program has been found is displayed on an output section 335 via a display processing section 330. The human interface system is constructed this way. The client 300 (control section) is composed of the program retrieving section 810, the message composing section 820, the message analyzing section 830, the input processing section 320, and the display processing section 330.

Figure 60:
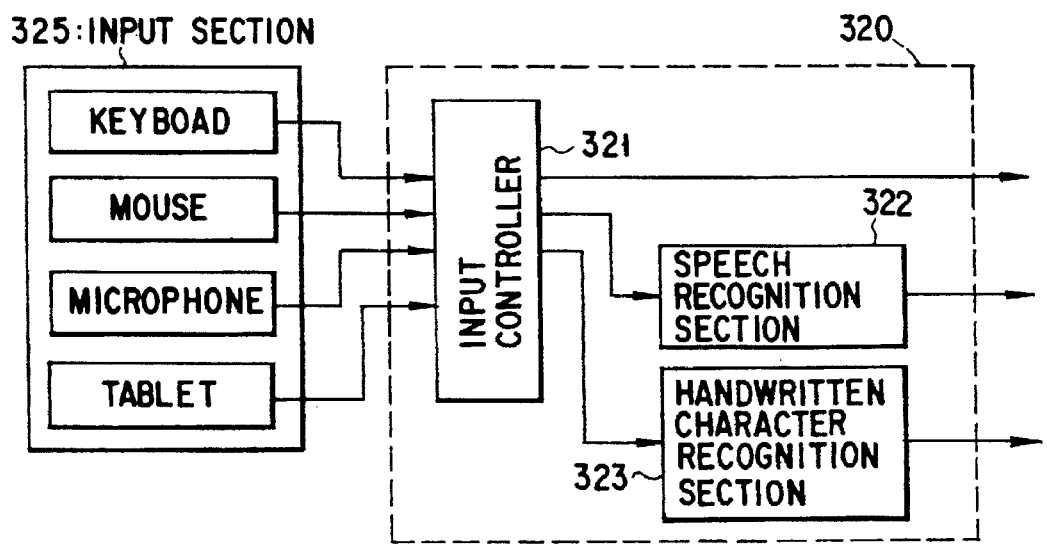
FIG. 60 is a block diagram of the input section and the controller.

FIG. 60 is a detailed block diagram of the input section 325 and the input processing section 320.

The input section 325 is made up of a keyboard, a mouse, a microphone, a tablet, etc. Keywords for retrieving are entered in code form from the keyboard and the mouse. The microphone is used to enter keywords in sound. The tablet is used to enter hand-written keywords. An input controller 321 judges from which input means such information (keywords) is entered. In the case of the speech input, it is recognized at a speech recognition section 322, which supplies the result in code form. In the case of the handwritten characters from the tablet, it is recognized at a hand-written character recognition section 323, which supplies the result in code form. The code data on these keywords are outputted to the next stage.

Figure 61:
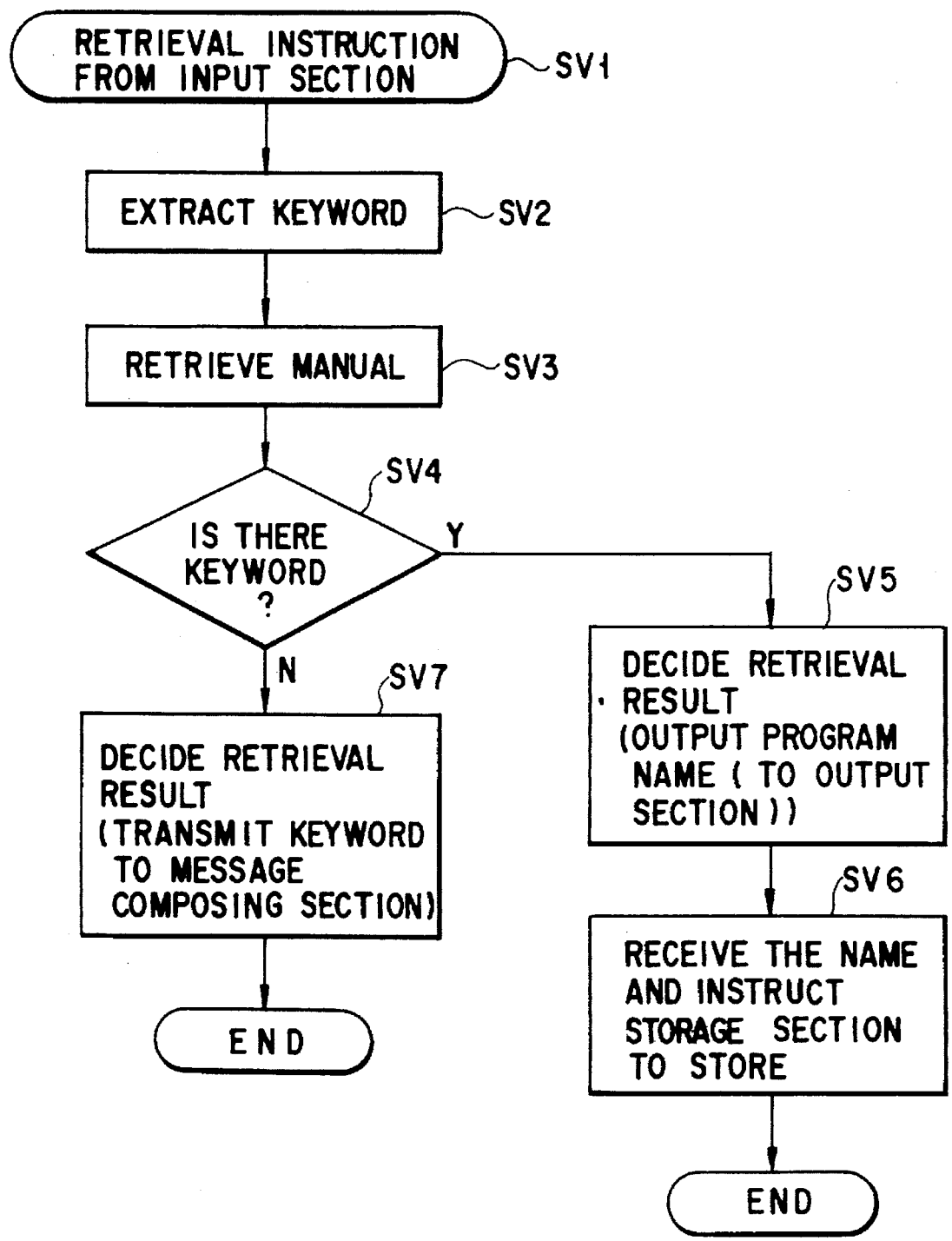
FIG. 61 is a flowchart for the processing at the program retrieving section.

The flow of a process at the program retrieving section 810 will be explained, referring to FIG. 61.

When a keyword for retrieving an application program is entered by the user to the program retrieving section 810 via the input/output section (step SV1), the program retrieving section 810 extracts the keyword entered (step SV2), and retrieves a manual according to the keyword (step SV3). The manual is stored in a file in text form as shown in FIG. 62. At step SV3, a check is made to see if there is a keyword specified by a method called full text retrieving, and a file containing key words is retrieved. After it is judged whether or not the keyword exists (step SV4), if the retrieving is successful, the program retrieving section 810 outputs the selected program name to the output section 335 (step SV5), and the program name is stored in the storage section (step SV6). Then, the process is terminated.

A method of retrieving a full text in specifying more than one keyword may be achieved by using known techniques. There may be a case where some type of manual has keywords previously given in the form of indexes. In this case, by storing keywords in tree structure, a higher-speed keyword retrieving method can be realized. Its detailed explanation will be omitted because this method is off the main point of this application.

The program retrieving section 810, when at step SV4, failing to retrieve the program, transfers the keyword used in retrieving to the message composing section 820, and at the same time, tells the user on the output section that retrieving via the network is started because direct retrieving has failed (step SV7).

Figure 63:
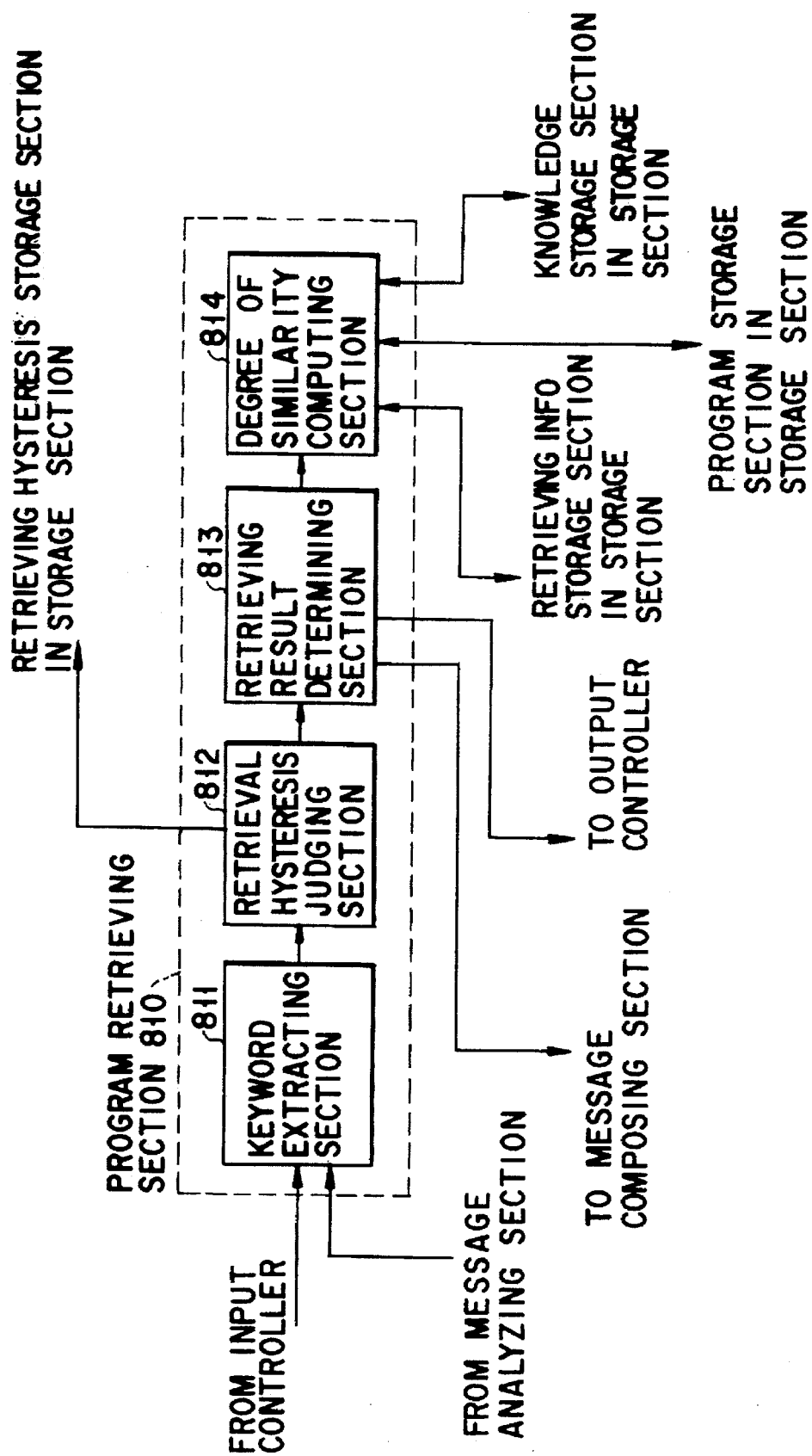
FIG. 63 is a block diagram of the program retrieving section.

FIG. 63 is a block diagram of the program retrieving section 810.

The program retrieving section 810 is composed of a keyword extracting section 811, a retrieving hysteresis judging section 812, a retrieving result determining section 813, and a degree of similarity measurement calculating section 814.

The keyword extracting section 811 extracts keywords for retrieving from a natural-language sentence entered by the user. The retrieving hysteresis judging section 812 judges whether or not the same retrieving as that by the keyword inputted by the keyword extracting section 811 was performed in the past, by referring to the retrieving hysteresis storage section 841 in the storage section 840. When it is found that there was the same retrieving in the past, the result is returned to the output section via the retrieving result determining section 813.

The similarity measurement calculating section 814 calculates the similarity to the keyword of the retrieving command for each manual, using the information used in judging the similarity to the keyword of the retrieving command, when retrieving the manuals stored in the retrieved information storage section 842 in the storage section 840. The retrieving result determining section 83 presents the high similarity result to the user via the output section.

The processes at each section will be explained in detail.

The process performed at the keyword extracting section 811 is based on known techniques. For example, the keyword extracting section 811 is composed of a morpheme analyzing section, a keyword judging section, etc. The morpheme section analyzes morphemes of the entered sentence and extracts independent words. The keyword judging section judges keywords form these independent words. For judgment, the keyword judging section, for example, has previously stored unacceptable independent words for keywords, and does not use independent words corresponding to those stored independent words as keywords.

Figure 64:
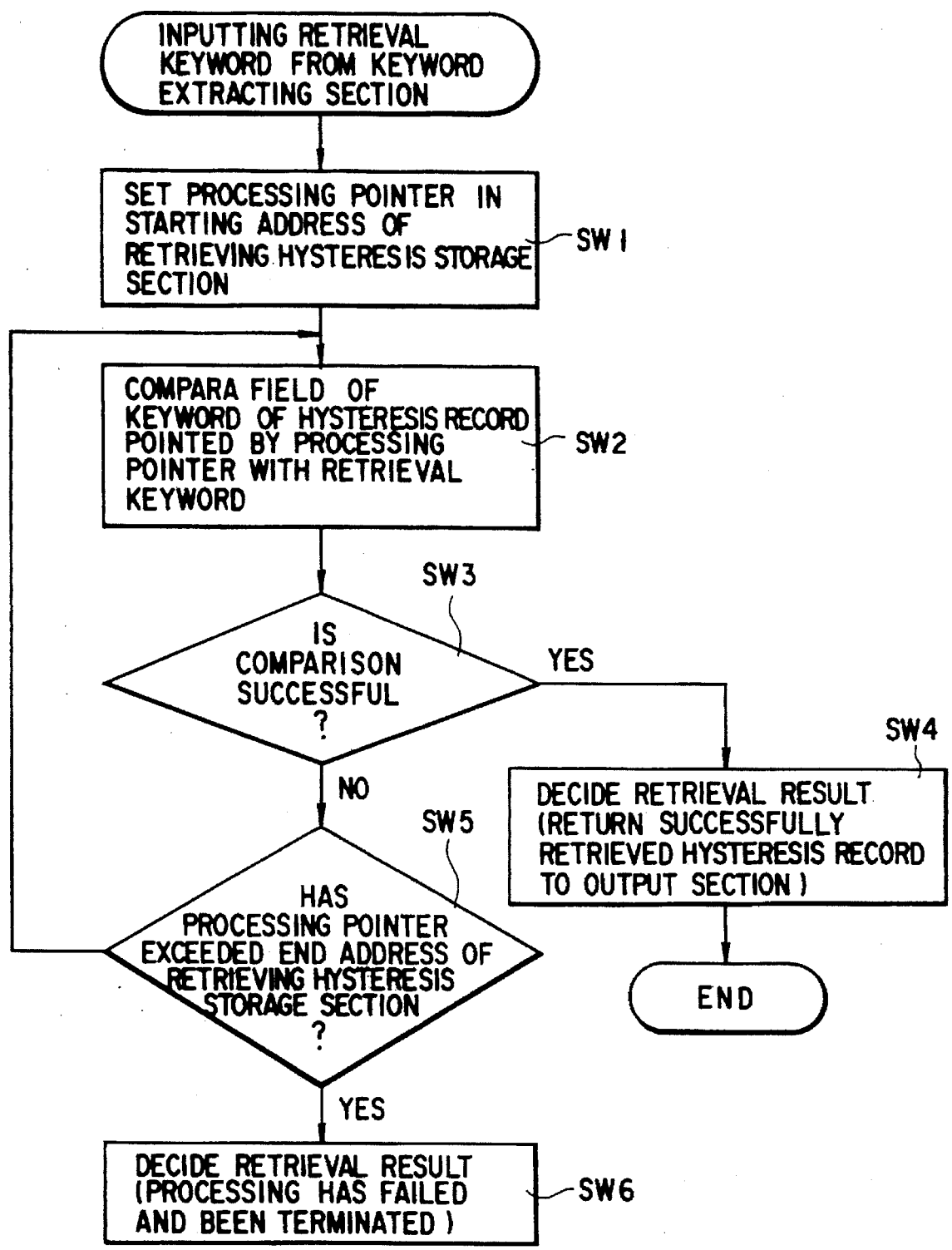
FIG. 64 is a flowchart for the processing at the retrieving hysteresis judging section.

The flow of a process at the retrieving hysteresis judging section 812 is shown in FIG. 64. An example of what is stored in the retrieving hysteresis storage section 841 is shown in FIG. 65. In retrieving hysteresis, the keyword used in retrieving and the results are paired with each other and the pair is stored. Information on the user who made retrieving is also stored. By comparing the fields of the keywords of the individual retrieving hysteresis records stored in the retrieving hysteresis section 841, a hysteresis record to be collated is determined.

The retrieving hysteresis judging section 812 first sets a processing pointer in the starting address of the retrieving hysteresis storage section 841 (step SW1). Next, the retrieving hysteresis judging section 812 processes the hysteresis records pointed by the processing pointer (step SW2). The retrieving hysteresis judging section 812 compares the field of the keyword in the hysteresis record with the retrieving keyword (step SW3). When the collation is successful, the result is sent to the input/output section and the process is terminated (step SW4). If unsuccessful, the processing pointer is increased by 1, the next hysteresis record is compared with the retrieving keyword (step SW5). When comparison has failed for all the hysteresis records, the retrieving hysteresis judging section 812 sends the retrieving keyword to the retrieving result determining section 813 and starts the retrieving result determining section 813 (step SW6).

For comparison of the retrieving keyword with the keyword set in the field of the keyword of the hysteresis record, "collation is successful" means that those keywords belong to the same keyword set or that the ratio of the same keywords to the total number of keywords exceeds a predetermined constant value.

For example, it is assumed that the keyword extracting section 811 sends the keywords "file", "transfer", "remote" to the retrieving hysteresis judging section 812 and the retrieving hysteresis storage section 841 is in the state shown in FIG. 65. At this time, the same keywords do not exist at all in the keywords "text", "conversion", "JIS record", and "SJIS code" stored in the field of the keyword of the hysteresis record stored. In the hysteresis record 2, two of the three keywords are equal to the transmitted keywords. Then, the contents of the hysteresis record 2 are returned to the output section.

When the retrieving hysteresis judging section 812 cannot collate the keywords with those in the retrieving hysteresis storage section 841, this means that the same retrieving instruction entered did not exist in the past. That is, it means that the present user and the other users did not make such a retrieving in the past.

Therefore, in this case, a desired program is retrieved from the manual text file stored in the program storage section 140 in the storage section 840. The similarity between each manual text file and the retrieving keyword is computed at the similarity measurement calculating section 814. Then, retrieving is performed at the retrieving result determining section 813 that decides the optimum retrieving result on the basis of the similarity computed at the similarity measurement calculating section 814.

The similarity measurement calculating section 814 computes similarity for each text file on the basis of the retrieving keyword entered, each manual text file, the retrieving information stored in the retrieving information storage section 842.

The similarity to the retrieving keyword is obtained by expressing words used in each text file by vectors and computing an inner product of the retrieving keyword and the vector expression.

$$S = w_{qj} \times w_{dj} / (\Sigma w_{qj}^2 \times \Sigma w_{dj}^2)^{1/2}$$

In the above similarity equation, vectors are of t dimensions. $w_{qj}$ is a weight for the j-th keyword in the retrieving keywords, and $w_{dj}$ is a weight for the j-th word in text d. The weight for each of words and keywords is determined by a relative frequency at which the word is used in the text (the number of occurrences of the word/the total number of words used in the text) etc. For example, it is assumed that there are five words a, b, c, d, and e expressed in vectors and the text is expressed using 5-dimensional vectors. If in text 1, a is used three times and b is used twice and in text 2, b is used once, c is used twice, and e is used twice, a vector for the word representing text 1 is expressed as [3/5, 2/5, 0, 0, 0] and a vector for the word representing text 2 is expressed as [0, 1/5, 2/5, 0, 2/5].

When the retrieving keyword is expressed by the vector [0, 1/2, 0, 0, 1/2] (b and e are given the same weight), the similarity to the retrieving keyword is computed for text 1 and text 2 as follows:

Text file 1

$$(1/2 \times 2/5) / \{((1/2)^2 + (1/2)^2)^{1/2} \times ((3/5)^2 + (2/5)^2)^{1/2}\} = 0.2/0.51 = 0.39$$

Text file 2

$$(1/2 \times 1/5 + 1/2 \times 2/5) / \{((1/2)^2 +$$

$$(1/2)^2)^{1/2} \times ((1/5)^2 + (2/5)^2 + (1/5)^2)^{1/2}\} = 0.3/0.42 = 0.71$$

Therefore, since text 1 has a higher degree of similarity than text 2 with respect to the retrieving keyword, the former is a more similar text.

The retrieving result determining section 813, according to the similarity thus obtained, determines that a text file with the highest degree of similarity or a text file with a degree of similarity larger than a certain value.

While a relative frequency of use explained above is used in obtaining the weight for each of keywords and word, a method of obtaining a weight that gives priority to words occurring concurrently.

For example, when the expression "transfer a file" is in the natural language sentence entered by the user, it can be understood that there is a concurrence relationship between words like "transfer—file." For such a retrieving instruction, when there is a text file with such a concurrence relationship, the file should be given priority as the retrieving result. To do this, when there is a concurrence relationship in connection with the retrieving instruction, the weight for each word is multiplied by a certain value. When words do not occur with a concurrence relationship but appear separately in independent sentences, they have their original values, with the result that the concurrence relationship is given priority.

For example, it is assumed that there are five words a, b, c, d, and e expressed in vectors and the text is expressed using 5-dimensional vectors. If in both text file 1 and text file 2, b is used once, c is used twice, and e is used twice, vectors for the words representing text are expressed as [0, 1/5, 2/5, 0, 2/5]. Here, it is assumed that there is a concurrence relationship between b and e in text file 1, whereas there is no concurrence relationship between them in text file 2.

A case is considered where during the retrieving instruction in which the retrieving keyword is pressed as the vector [0, 1/2, 0, 0, 1/2] (b and e are given the same weight), b concurs with e. The degree of similarity to the retrieving keyword is obtained for text file 1 and text file 2 as follows. Here, factor C by which a weight is multiplied because of concurrence is set to 2.

Text file 1

$$(C \times 1/2 \times 1/5 + C \times 1/2 \times 2/5) / \{((1/2)^2 +$$

$$(1/2)^2)^{1/2} \times ((1/5)^2 + (2/5)^2 + (2/5)^2)^{1/2}\} = 0.6/0.42 = 1.42$$

Text file 2

$$(1/2 \times 1/5 + 1/2 \times 2/5) / \{((1/2)^2 +$$

$$(1/2)^2)^{1/2} \times ((1/5)^2 + (2/5)^2 + (2/5)^2)^{1/2}\} = 0.3/0.42 = 0.71$$

Therefore, in this case, text file 1 is retrieved as a more similar file.

The retrieving information storage section stores synonymous information and similar expression information. FIGS. 66A and 66B show examples of synonymous information and similar expression information stored in the retrieving information storage section 842. In the synonymous information shown in the figure, the word "CHECK" corresponds to the word "INSPECTION" as a synonym, and the word "COPY" corresponds to the word "TRANSFER" as a synonym.

In the similar expression information shown in the figure, the expression "TRANSFER A FILE" is similar to the expression "COPY A FILE", and the expression "TRANSFER A MESSAGE" is similar to the expression "send a mail."

The degree-of-similarity measurement calculating section 814 calculates the degree of similarity using the information stored in the retrieving information storage section 842. Specifically, when the retrieving keyword is expressed by a vector, a value is also set for a synonymous element, and the degree of similarity is computed using the vector.

For example, it is assumed that there are five words a, b, c, d, and e expressed in vectors and the text is expressed using 5-dimensional vectors. If in text 1, a is used three times and b is used twice and in text 2, b is used once, c is used twice, and e is used twice, a vector for the word representing text 1 is expressed as [3/5, 2/5, 0, 0, 0] and a vector for the word representing text 2 is expressed as [0, 1/5, 2/5, 0, 2/5].

Here, it is assumed that the retrieving keyword is composed of b and e, and e is synonymous with a. It is also assumed that when there is a synonym, a value equal to the product of the vector element of the corresponding word multiplied by an integer multiple of the element of the original word. Here, because the vector element of e is 1/2, the original vector of the retrieving keyword is [Rx1/2, 1/2, 0, 9, 1/2]. Here, if R is 0.6, the degree of similarity of text file 1 and text file 2 can be computed as follows:

Text file 1

$$(R \times 1/2 \times 3/5 + R \times 1/2 \times 2/5) / \{((1/2)^2 +$$

$$(1/2)^2)^{1/2} \times ((3/5)^2 + (2/5)^2)^{1/2}\} = 0.38/0.51 = 0.75$$

Text file 2

$(1/2 \times 1/5 + 1/2 \times 2/5)/\{((1/2)^2 +$ $(1/2)^2)^{1/2} \times ((1/5)^2 + (2/5)^2 + (2/5)^2)^{1/2}\} = 0.3/0.42 = 0.71$ Therefore, in this case, in the retrieving result determining section 813, text file 1 is given priority.

While the retrieving information storage section 842 in FIG. 66A contains only one piece of information on synonymous words and similar expressions, it may, of course, be modified so as to deal with more than one piece of information.

The flow of the processing at the message synthesis section 820 will be explained, referring to FIG. 67.

The message synthesis section 820, receiving a retrieving keyword from the program retrieving section 810, converts the keyword into easy-to-read text (an interrogative sentence) (step SX1). An example of a retrieving keyword and an example of an interrogative sentence are shown in FIG. 68 and FIG. 69, respectively.

Figures 67, 68, 69:
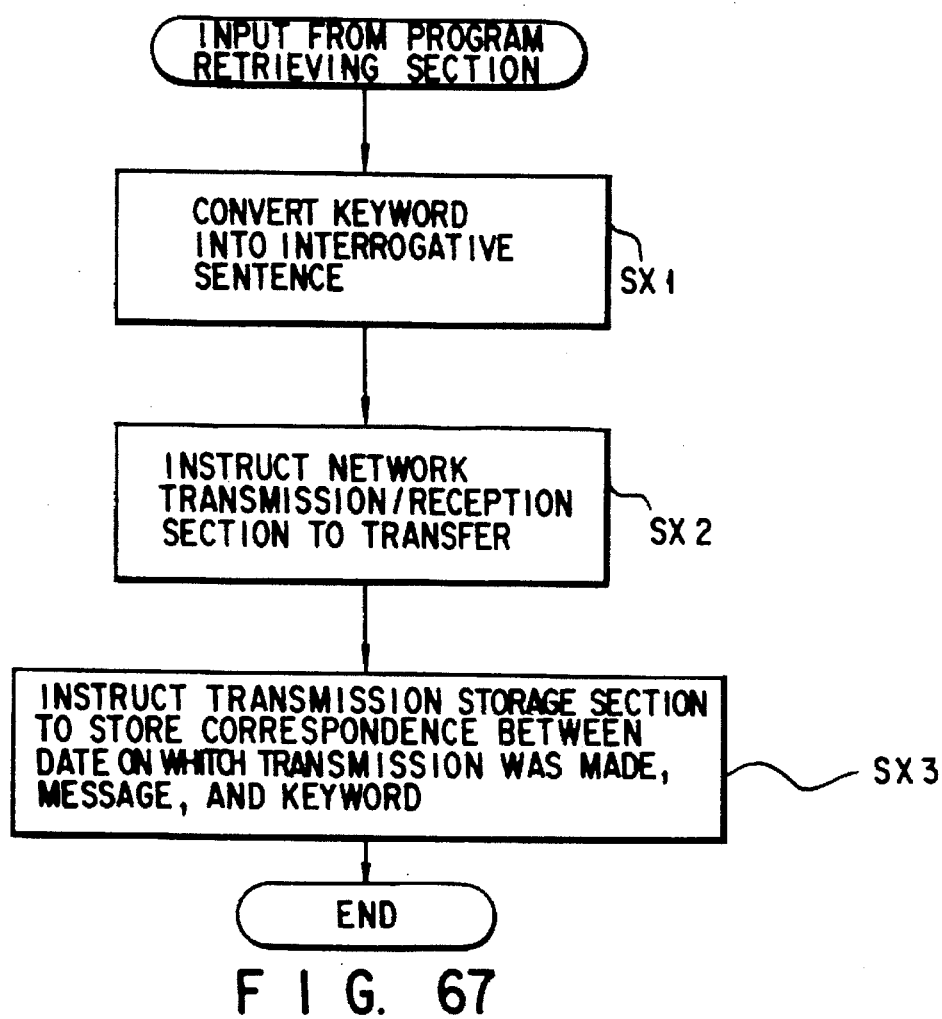
FIG. 67 is a flowchart for the processing at the message synthesis section.
FIG. 68 shows an example of a retrieving keyword.
FIG. 69 shows an example of an interrogative sentence.

The result of converting the keyword into an interrogative sentence by the simplest method is shown in (1) in FIG. 69. This sentence can be composed by concatenating the character string "Please, let me know a program concerning . . . if you know" to a character string of given retrieving keywords arranged side by side.

After the synthesis of the sentence is complete, it is transmitted to other users previously entered via the network transmission/reception section according to an electronic mail format or the like, and the process is terminated. At this time, the correspondence between transmitting dates, messages, retrieving keywords, etc. are stored in the transmission storage section 140 in the storage section 840. This example is shown in FIG. 70. In FIG. 70, the storage section 840 stores retrieving keywords, transmitted messages, and dates.

An interrogative sentence may be composed using an electronic dictionary. The retrieving keywords in FIG. 68 can be converted as in FIG. 69 by providing an electronic dictionary unit that stores a vocabulary including nouns and verbs, which has been used in a kana-kanji converting system, a machine translation system, or a proofread supporting system. Specifically, the dictionary is referred to for parts of speech of each keyword (a noun, a conjugated noun, a verb, an adjective, . . . ). In an attempt to look up the dictionary, the words "what" and "want to do" tend to appear at the head of a keyword. Therefore, based on the first two keywords, a sentence can be composed. Of the two keywords, the verb and the conjugated noun are set for the predicate and the noun is set to either the nominative case or the objective case.

This can be made more sophisticated by making rules that "What do you want to do?" should be previously specified for the first two keywords as retrieving keywords in program retrieving.

FIG. 71 is a block diagram of the message synthesis section 820. In this example, it is constructed so as to send an electronic mail to a predetermined receiver's address, referring to the receiver's address information storage section 140 that stores information on where to send a mail.

The message synthesis section 820 converts the user input into natural language for electronic mail. The receiver's address information storage section 140 stores information on receiver's addresses. The receiver's address determining section 824 decides a receiver's address according to the contents of the receiver's address information storage section 140. The message combining section 821 composes an electronic mail message on the basis of the results of the message converting section 822, the addressee determining section 824, and the title synthesis section 823.

FIGS. 72A and 72B show examples of the contents stored in the receiver's address information storage. The receiver's address information is made up of an individual list shown in FIG. 72A and a general list shown in FIG. 72B. The personal list stores a list of users who know individual topics well, and the general list stores a list of users who know general topics well. The individual list is composed of a field where each topic is given a keyword and a user name field where the names of users who know individual topics well.

FIG. 73 shows the flow of the processing at the message composing section 820.

First, the retrieving keyword inputted from the program retrieving section is converted into natural language (step SY1). Also, the title in the electronic mail is composed based on the retrieval keyword (step SY2). Next, referring to the individual list stored in the receiver's address information storage section, it is judged whether or not there is an item to be collated with the retrieval keyword (step SY3). At step SY3, if YES, the corresponding user is decided to be a receiver's address (step SY4). If NO, the user list stored in the general list is made a receiver's address (step SY5). Based on a natural language corresponding to the retrieving keyword and the receiver's address, a message is synthesized, which is then sent to the network transmission/reception section, and the process is terminated (steps SY6 and SY7).

For example, at step SY1, when the retrieving keywords are "latex," and "how to indent," these keywords can be converted into the natural-language sentence "Please let me know latex, how to indent" by concatenating the character string "Please let me know" to the string of the keywords.

In synthesizing a title at step SY2, selection of the keywords entered is made and a predetermined character string is added to the selection result to synthesize a title. Depending on the electronic mail, codes usable for the title section may be limited. Thus, in this embodiment, only ASCII codes are taken out of the retrieving word. In this case, the character string "Step Subject: onegai" is added to the keyword "latex" to compose the title "Step Subject: onegai latex." When a check is made to see if the keywords "latex" and "how to indent" are given in the individual list of receiver's address information, it is found that there is an item to which the keyword "latex" is given. Then, from the user list for the item, the character string "To: tanaka, saitoh" is obtained.

Finally, at step SY6, by concatenating the receivers's address character string "To: tanaka, saitoh", the title "Subject: onegai latex" and the sentence "latex, please tell me how to indent" to one another, the message shown in FIG. 74 can be synthesized.

The receiver's address is obtained from an exchange of words with other users about programs or is newly added by the user.

The network transmission/reception section 960, receiving the output from the message synthesis section 820, transmits a message to another user via the network. This process has been used for electronic mails and electronic news. This is not related to the main point of the invention, and the function will not be explained in detail.

When a certain user has returned an answer to the previous interrogative message, its answer is sent to the network transmission/reception section 960. For example, in the case of UNIX electronic mail, a message as shown in FIG. 75 should be received.

In this case, that the reply is to the electronic mail of what day is set in the field "In-Reply-To field.

Figure 76:
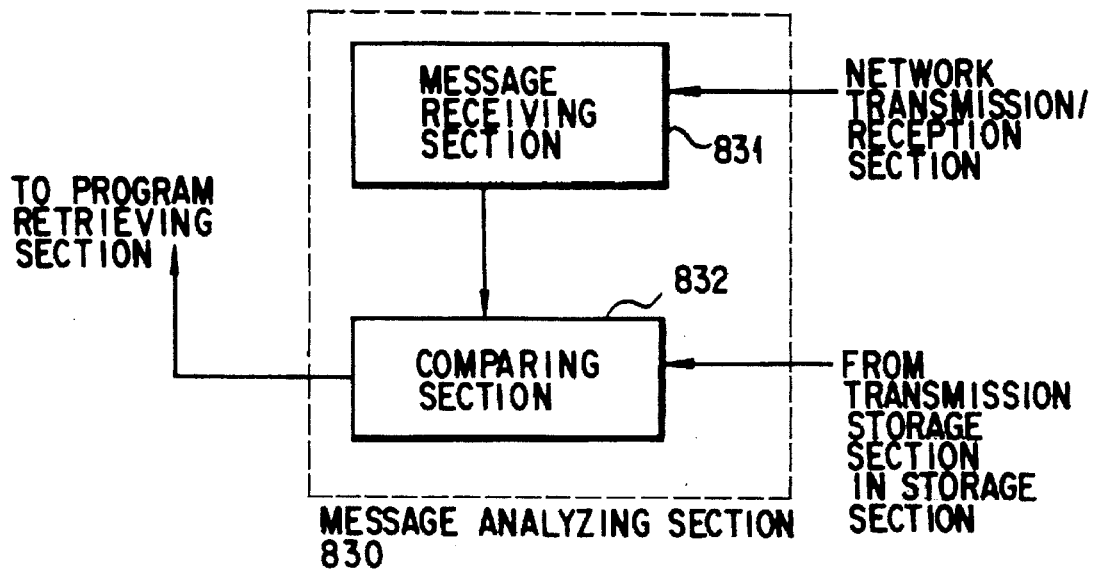
FIG. 76 is a block diagram of the message analyzing section.
Figure 77:
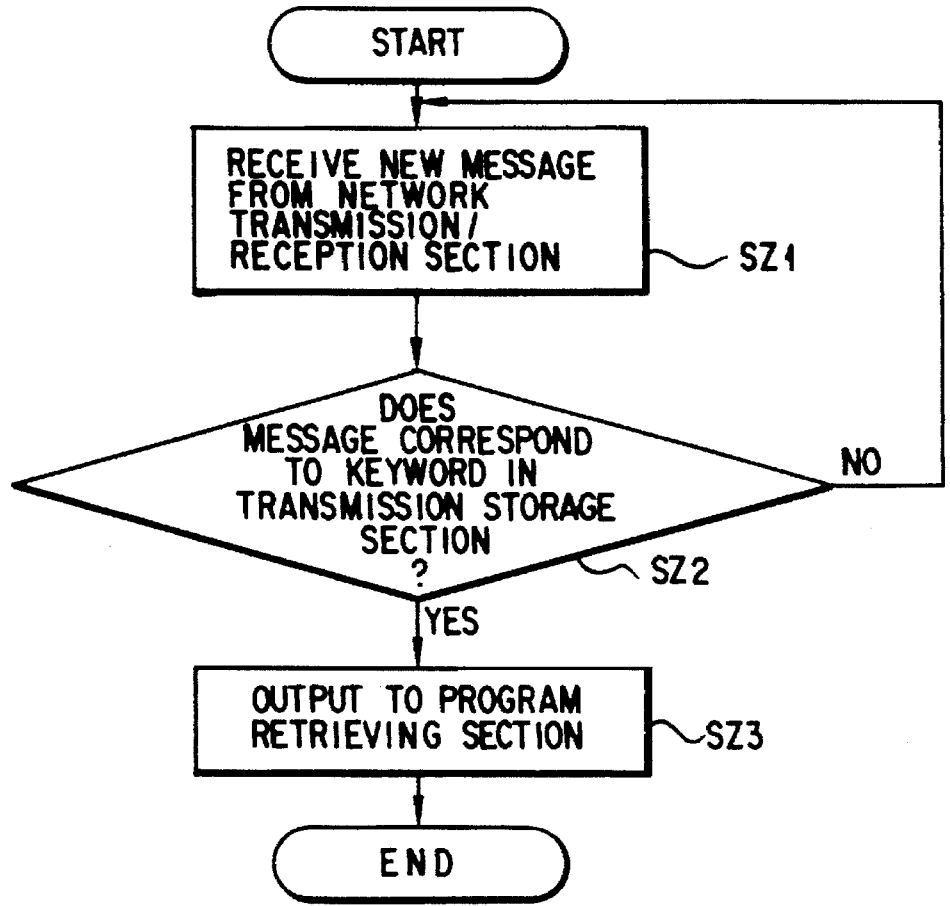
FIG. 77 is a flowchart for the processing at the message analyzing section.

FIG. 76 is a block diagram of the message analyzing section 830 and FIG. 77 shows the flow of the processing at the message analyzing section.

The message analyzing section 830 checks at specified regular intervals (for example, at intervals of ten minutes) to see if a new message has arrived at the network transmission/reception section 960. If a new message has arrived (step SZ1), the message from the network transmission/reception section 960 is temporarily stored in the message receiving section 831, and the comparing section 832 judges whether or not the message corresponds to the retrieving keyword stored in the transmission storage section in the storage section 840 (step SZ2). At step SZ2, if it is found that it corresponds to the keyword, the transmission message, the reception message, and the keyword data are reported to the program retrieving section 810, and the process is terminated (step SZ3). Correspondence of the reply message with the retrieving keyword stored in the transmission storage section can be sensed by comparing the date set in the In-Reply-To field in the reply message with the data set in the transmission storage to find out that they coincide with each other or that the character string . . . in the character string . . . 's message set in In-Reply-To coincides with the name of the user.

When receiving another user's message from the message analyzing section 830, the process in FIG. 62 is carried out. At this time, the program retrieving section 810 displays the fact that what is being retrieved has been found or warning. It also stores the keyword, the date, the reception message, the transmission message in the reception storage section in the storage section 840. The storage format of the reception storage section, which is the same as that of the transmission storage section, is provided with the Replay-Message field, a new field, whose contents can be displayed to the user.

The retrieving of programs is performed by keyword. It is easy to modify the retrieving method so as to be performed by natural language. It can be done by providing a unit that converts natural language used for retrieving into retrieval keywords. Various methods of converting natural language into retrieving keywords have been disclosed, so that those techniques can be used.

While in the embodiments, there is provided a network, a similar process may, of course, be performed without a communication network. In this case, transmission and reception to and from another user performed at the network transmission/reception section 960 may be achieved also in a computer system which is used by many users simultaneously.

While in the above embodiments, an object to be retrieved is an application program, it is not necessarily limited to a program. For example, with a programming language based on an object-oriented language, the functions of some objects are inherited as program components to form a new object. In this case, by considering an object to a program, what has been explained in the above embodiments can also be realized.

There is an agent-oriented program language as a programming language higher in level than an object-oriented language. The former operates actively in contrast to the object-oriented program, which is executed only when passively receiving a start message. It is easy to make such agents objects of retrieving by this apparatus.

It goes without saying that it is easy to organize subroutines written in programming languages such as widely-used C language or FORTRAN into a library, not keeping programs in independent form such as application programs, objects, or agents, and make those subroutines objects of retrieving according to the present invention.

There may be a case where programs and agents to be retrieved are made up of known server clients. With an apparatus of the invention, a server with a certain function can be made an object to be retrieved. In such a case, the server should exist on another computer which is connectable via the network. Therefore, the construction of FIG. 59 can be modified so that the program storage section in the storage section 840 may be accessed via the network.

Although in the above embodiments, a program has been retrieved, a common data base may be stored in the program storage section. Thus, by storing files including a bibliography, full literature, manuals, news articles, retrieving of these files can be made readily.

As seen from the above explanation, the storage section 840 is constructed as shown in FIG. 78. Specifically, the storage section 840 contains a retrieving hysteresis storage section 841 used with the program retrieving section, a retrieving information storage section 842, a program storage section 843, a reception storage section 844, and a transmission destination information storage section 845. It also contains a transmission storage section used with the message synthesis section. It may contain an information storage section 847 that stores information on knowhow used in retrieving information etc. An arrangement of data storage in the storage section 840 is shown in FIG. 79.

Figure 80:
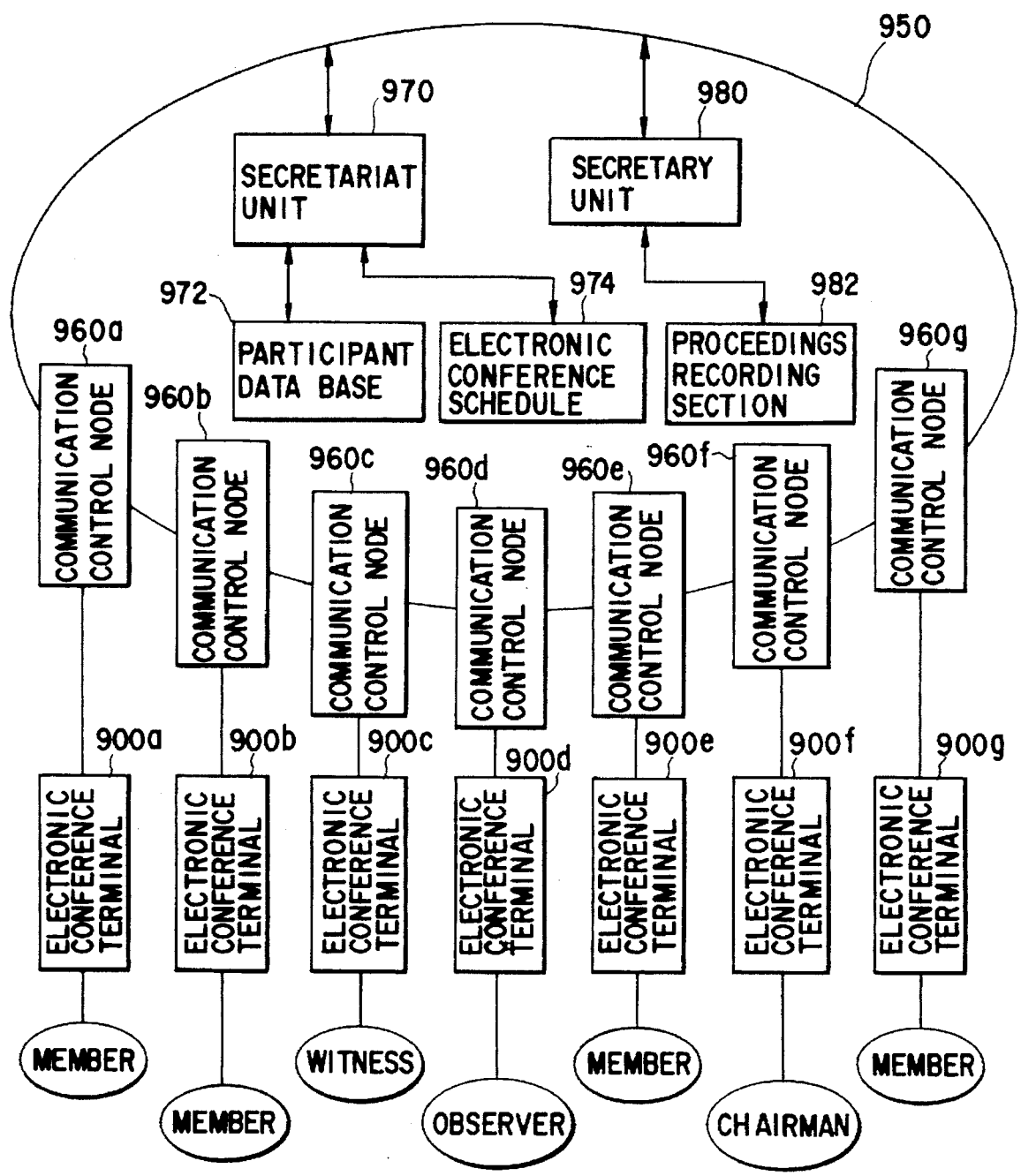
FIG. 80 is a schematic diagram of a human interface system according to a fifth embodiment of the present invention.

FIG. 80 is a schematic diagram of a human interface according to a fifth embodiment of the present invention. In FIG. 80, electronic conference terminals 900a through 900g and communication control nodes 960a through 960g correspond to clients 300 in FIG. 3.

In FIG. 80, the electronic conference terminals 900a through 900g composed of work stations (including cameras and microphones) used in the electronic conference are designed to specify the qualifications for attending the conference on the basis of an attendant data base 972 explained later.

In the figure, the electronic conference terminal 900f is specified for the chairman; the electronic conference terminals 900a, 900b, 900e, and 900g are specified for members; the electronic conference terminal 900c is specified for a witness; and the electronic conference terminal 900d is specified for an observer. The chairman has a rank that serves to direct the conference. Members has a rank that is allowed to ask and speak as they want. The witness has a rank that is allowed to reply only to a question occurred in the conference. The observer has a rank that is allowed to listen to the conference but not to speak.

The electronic conference terminals 900a through 900g are connected to a transmission channel 950 via the communication control nodes 960a through 960g. With this configuration, the electronic conference terminals 900a through 900g enable mutual communication by moving around the transmission channel (network) via the communication control nodes 960a through 960g.

A secretariat unit 970 and a secretary unit 970 are connected to the transmission channel 950. The attendant data base 972 and the electronic conference schedule section 974 are connected to the secretariat unit 970. The proceedings recording section 982 is connected to the secretary unit 970. These units correspond to the site servers in FIG. 3.

The secretariat unit 970 manages the entire electronic conference. Specifically, the secretariat 970 accepts applications for the electronic conference on the basis of the participant data base 972, causes the electronic conference schedule section 974 to announce the holding of the conference, makes the time managing section keep track of elapsed time, and serves as a timekeeper for the opening and closing of the conference.

Figures 81, 83:
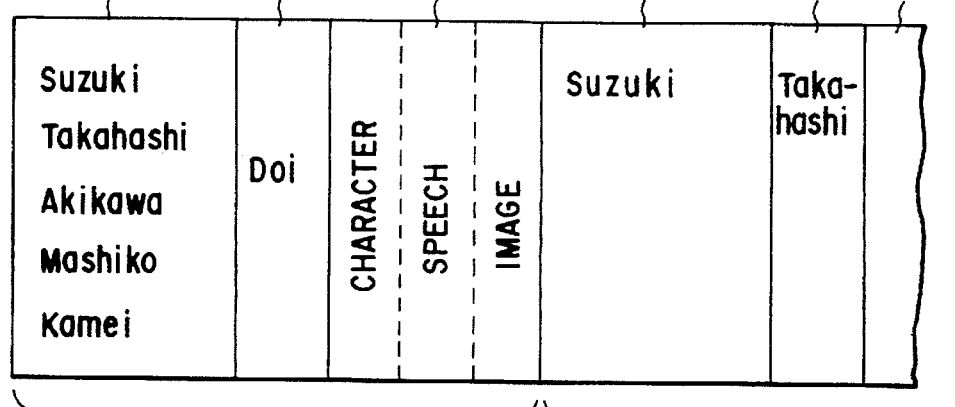
FIG. 81 shows a database for participants used in the fifth embodiment.
FIG. 83 shows the format of a packet used in the fifth embodiment.

The secretary unit 980 monitors the progress of the conference and causes the proceedings recording section 982 to record the proceedings. The participant data base 972 stores various types of data on, for example, the participants in the electronic conference as shown in FIG. 81. In this case, it stores data on the items of name 972a, capacity (rank) 972b, post 972c, charge 972d as well as definitions of the distance between individual participants (not shown).

FIG. 81 is a schematic diagram of electronic conference terminals 900a through 900g.

Packets are received as follows.

A packet receiving section 911 receives the contents of the electronic conference transmitted over the transmission channel 950 in the form of a packet 952 of FIG. 83, whose details will be explained later. An addressee sensing section 912 senses the addressee area 952a in the packet 952. An addressee judging section 913 judges whether or not the addressee of the received packet falls under a terminal user. If not, it reads through to the next packet. If true, an addresser sensing section 924 senses the addresser area in the packet 952. An addresser capacity judging section 915 judges whether or not the capacity (rank) of the addresser of the packet 952 falls under a participant allowed to speak, using the participant data base 972. If not, it reads through to the next packet. If true, an electronic conference body extracting section 916 extracts the packet body 952c, causes the control section 912 to output character information to the monitor 918, makes the image analyzer 919 output image information to the monitor 928, and causes the speech analyzer 920 to output speech information to the speaker 921.

Packets are transmitted as follows.

The character information inputted from the keyboard 922 is send to the control section 923, the speech information from the microphone 924 is transmitted to the speech synthesizer 925, and the image information from the TV camera 926 is transferred to the image synthesizer 927. Based on the outputs of the control section 923, the speech synthesizer 925, and the image synthesizer 927, the electronic conference body creating section 928 produces the packet body 952c. An addressee writing section 929 writes the addressee in the addressee area 952a in the packet 952, and an addresser writing section 930 writes the addresser in the addresser area 952b in the packet 952. A packet transmitting section 931 transmits the packet 952 to the transmission channel 950.

FIG. 83 shows an example of a format of a packet 952. The packet 952 is made up of an addressee area 952a, an addresser area 952b, and a packet body (character, speech, image) 952c. In global communication aiming at communication with all the participants, as shown in packet A, the names of all participants except for the addresser are written in the addressee area 952a, the name of the addresser is written in the addresser area 952b, and the speech and image information are written in the packet body 952c. In local communication aiming at communication with part of the participants, as shown in packet B, only the name of the other party (Suzuki) is written in the addressee area 952a, the name of the addresser (Takahashi) is written in the addresser area 952b, and the speech and image information are written in the packet body 952c.

Next explained will be the operation of the fifth embodiment thus constructed.

Figure 84:
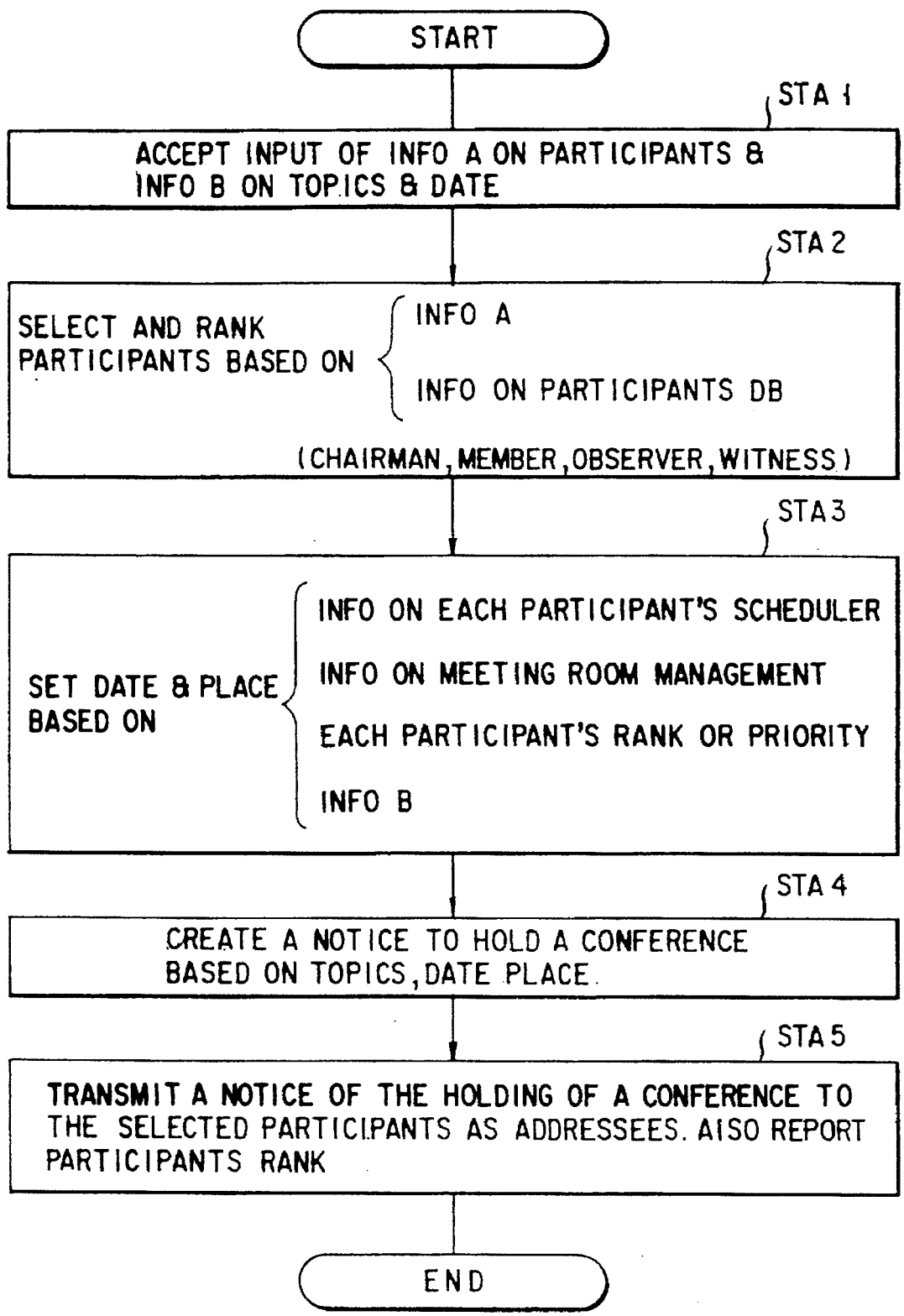
FIG. 84 is a flowchart for the operation of the fifth embodiment.

A case where the secretariat unit 970 sets an electronic conference will be explained, referring to FIG. 84.

The input of information A on attendants at the conference and information B on the topics and date of the electronic conference is accepted (step STA1). Based on information A on attendants at the conference and the information from the attendant data base 972, attendants are selected and their ranks are set (step STA2). In this case, each attendant is given a rank, such as chairman, member, observer, or witness, on the basis of the capacity 972b in the attendant data base 972 shown in FIG. 81.

Based on the information on each attendant's scheduler, the information from the conference room managing data base, each attendant's rank or priority (degree of importance of attendance at the conference, taking into account the post 972c and charge 972d in the attendant data base 972 in FIG. 81), and information on the topics and date of the electronic conference; the data and place of the electronic conference is set (step STA3).

Based on the topics, date, and place of the electronic conference, a notice to hold a conference is created (step STA4), the notice of the holding of a conference is transmitted to the selected attendants as the addresses for distribution. At the same time, the rank of each attendant is also reported (step STA5). The operation of the secretariat unit 970 may be realized by starting a program in the terminal set for the chairman. In this case, when the person who has set the electronic conference is the chairman himself, the input at step STA1 starts the program in the terminal, whereby the processes at step STA2 and later are executed. When the person who has set the electronic conference is a person other than the chairman, if a chairman is specified at step STA1, the information entered at step STA1 is sent to the chairman terminal, which starts the program in the chairman terminal, whereby the processes at step STA2 and later are executed.

A case where the secretariat unit 970 holds an electronic conference will be explained, using FIG. 85.

Access of an attendant to the conference is accepted (step STB1). It is judged whether or not access has been accepted for all the attendants (step STB2). At step STB2, when there is an attendant whose access has not been accepted, the attendant who has not accessed yet is forced to know a notice of the holding of a conference by interruption (step STB3). When the time at which the conference is opened is reached, each attendant's terminal may be forced to connect without accepting the access from each attendant as shown at step STB1.

After the acceptance of access from all the attendants is completed, a flag indicating the rank of each person is send to all the attendants (step STB4).

In determining the theoretical distance between the individual attendants, it is judged whether or not the existing definitions of the distance between attendants in the attendant data base 972 are used for defining the theoretical distance between each attendant (step STB5). A method of using the existing definitions in the attendant data base 972 is to determine the distance from each data item, the post 972c and charge 972d of the attendant in FIG. 81 in such a manner that, for example, the distance between attendants in the same post may be shorter and the distance between attendants in a state of confrontation may be longer.

At step STB5, if NO, each attendant's request, such as "I want to sit next to Mr. . . . " is accepted (step STB6). Based on these requests, the distance between attendants is defined (step STB7). The defined distance is stored (updated) in the attendant data base 972. After step STB8 is completed or if YES at step STB5, the seating order of attendants is decided based on the definitions of the distance and information on the seating order is sent to each attendant (step STB9).

The conference open is declared (step STB10). At this time, as shown in FIG. 80, by connecting the terminals 900a through 900g of the individual attendants with the closed transmission channel, the conference information is prevented from flowing to terminals other than that of the attendants at the conference and information from those other than the attendants at the conference is prohibited from going into the conference. Further, by starting the secretary unit 980 with the initialized proceedings storage section 982, the terminals 900a through 900g of the individual attendants can access the contents of the attendant data base related to the conference.

By the chairman's access, the contents of the attendant data base 972, such as ranks of attendants or the seating order, can be changed (step STB11). The time managing section (not shown) reports information on elapsed time to attendants or the chairman (step STB12). After the closing of the conference is declared, the process is terminated (step STB13).

Figure 86:
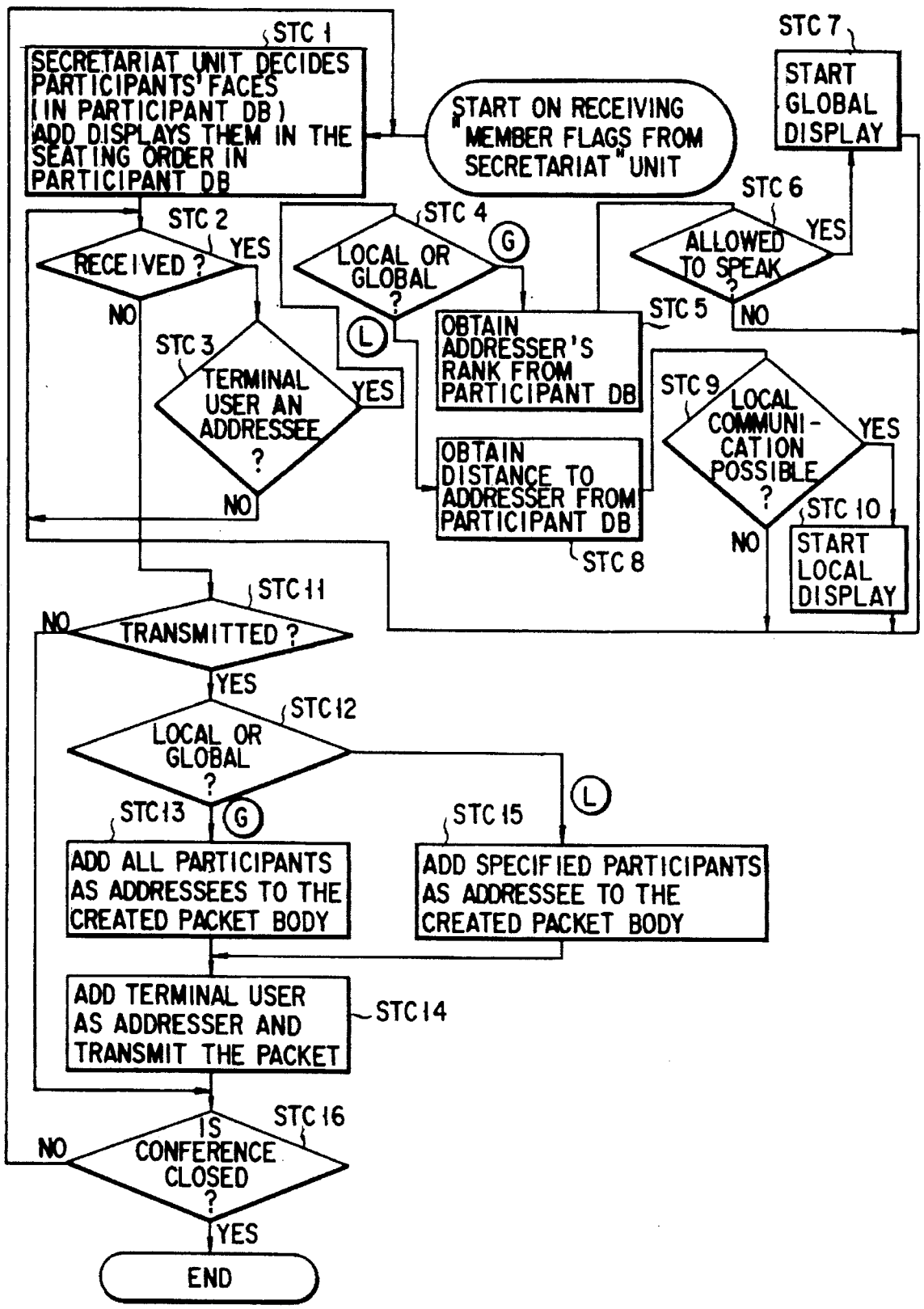
FIG. 86 is a flowchart for the operation of the fifth embodiment.

Referring to FIG. 86, the program started by the terminals of the members among the attendants at the conference, that is, electronic conference terminals 900a, 900b, 900e, and 900g will be explained.

Electronic conference terminals 900a, 900b, 900e, and 900g, receiving member's flags from the secretariat unit 970, the face of each attendant at the conference is displayed in the order of seats determined by the secretariat unit 970 and stored in the attendant data base 972 (step STC1).

It is judged whether or not the packet receiving section 911 has received a packet 952 (step STC2). At step STC2, if YES, the addressee sensing section 912 sensed the addressee area 912a in the packet and judges whether or not the addressee in the received packet falls under a terminal user (step STC3). At step STC2, if NO, it reads through to the next packet. At step STC3, if YES, it is judged whether it is intended for global communication aiming at communication with all the attendants or local communication aiming at communication with part of the attendants (step STC4). In this case, judgment is made from whether or not all addressees are written in the addressee area 952a in the packet 952.

At step STC4, when it is judged that global communication is intended, the addresser sensing section 14 senses the addresser area 952b in the packet 952, and the addresser capacity judging section 915 determines the capacity of the addresser of the packet 952, or his rank, using the attendant data base 972 (step STC5). The addresser capacity judging section 915 judges whether or not the addresser fall under an attendant allowed to speak (step STC6). At step STC6, if NO, it reads through to the next packet. At step STC6, if YES, the packet body 952c of the packet 952 is extracted and global display is started (step STC7). In this case, the packet body (the contents of speech) is displayed, with the addresser moving his lips.

At step STC4, if it is judged from the fact that only a particular person is written in the addressee area 952a in the packet 952 that local communication is intended, the theoretical distance between the addressee and the addresser is obtained from the attendant data base 927 (step STC8). The secretariat 970 judges whether or not local communication is possible (step STC9). If it is impossible because the defined distance is too long, local communication is rejected, whereas if it is possible because the defined distance is short enough, local communication is permitted.

Then, the packet body 952c of the packet 952 is extracted and local display is started (step STC10). In this case, the addressee is displayed so as to face the addresser and the contents of the packet body (the contents of speech) are outputted in the form of speech.

In the above embodiment, a presenting mode of speech in global communication is made different from that in local communication. This may be achieved by any combination, such as speech/text, large characters/small characters, low voice/loud voice, etc. At steps STC8 and STC9, when the distance between the addressee and the addresser is too long, local communication is impossible. When the same addresser transmits the packet many times in a short time, however, it may be sensed for local communication.

Figure 82:
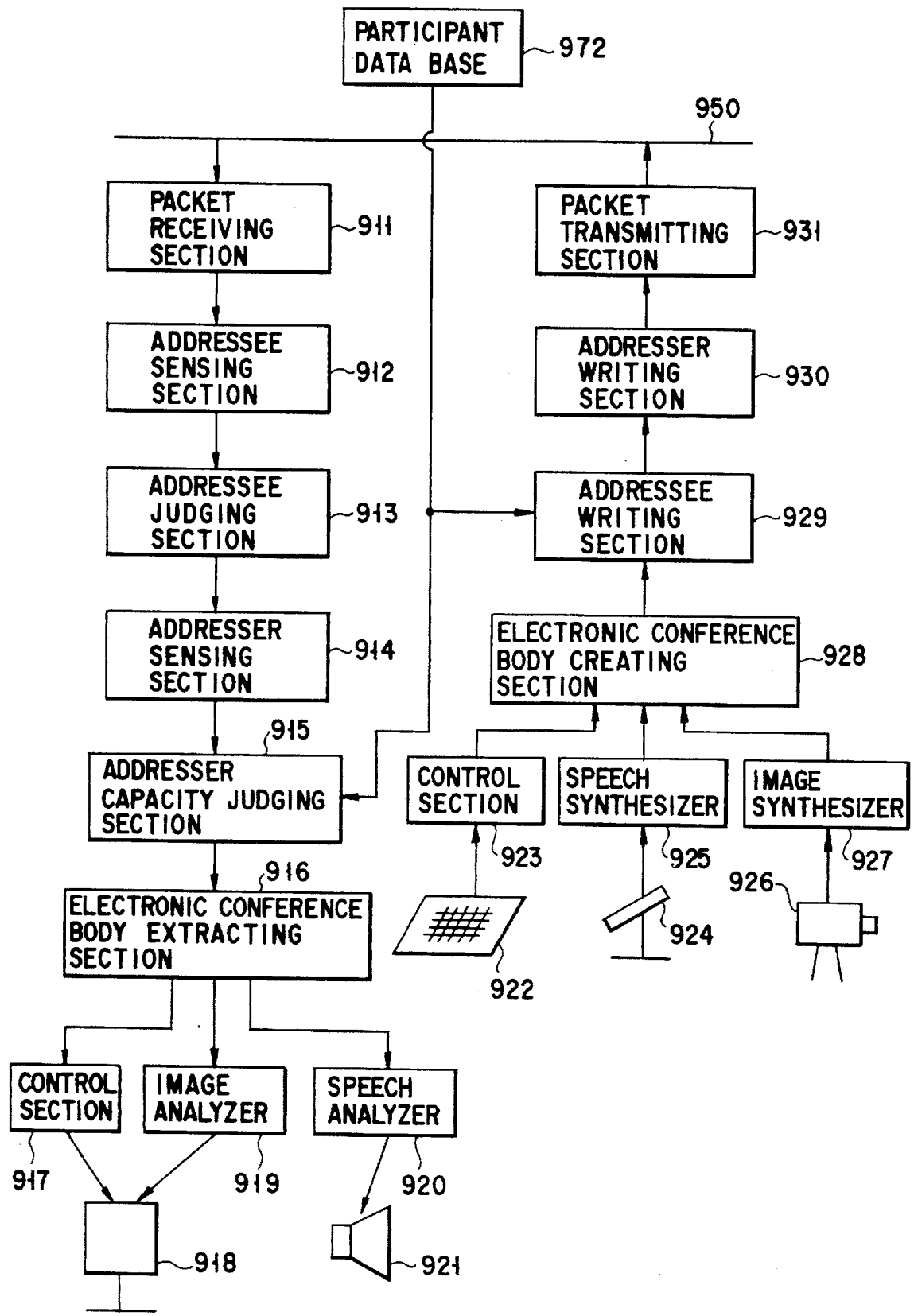
FIG. 82 is a schematic diagram of electronic conference terminals used in the fifth embodiment.

In transmitting packets, at step STC11, if YES, the secretariat unit judges whether it is indented for global communication aiming at communication with all the attendants or local communication aiming at communication with part of the attendants (step STC12). In this case, judgment is made from whether all the addressees or particular addressees are written in the addressee area 952a in the packet 952. Judgment may be made from input mode. For example, local communication is performed from the keyboard, and global communication is achieved by the input by a microphone. In this case, if it is judged that global communication is intended, in FIG. 82, after the electronic conference body creating section 928 has created the packet body 952c, the addressee writing section 929 writes all the addressees in the addressee area 952a in the packet 952 (step STC13), the addresser writing section 930 writes the terminal user as an addresser in the addresser area 952b in the packet 952, and the packet is transmitted to the transmission channel 950 via the packet transmitting section 931 (step STC14). In this case, if it is decided that a witness is allowed to accept only a question, a witness cannot be written in the addressee area 952a unless the question has been identified.

At step STC12, if it is judged that local communication is intended, after the electronic conference body creating section 928 has created the packet body 952c, the addressee writing section 929 writes specified addressees in the addressee area 952a in the packet 952 (step STC15), the addresser writing section 930 writes the terminal user as an addresser in the addresser area 952b in the packet 952, and the packet is transmitted to the transmission channel 950 via the packet transmitting section 931 (step STC14).

At step STC13, the process of rejecting global communication according to the addresser rank at steps STC5 and STC6 may be performed. In this case, the addresser is informed of rejection, reading "You cannot speak." At step STC15, the process of rejecting local communication according to the distance between the addressee and the addresser at steps STC8 and STC9 may be performed. In this case, the addresser is notified of rejection, reading "You cannot communicate with Mr. A."

In this state, it is judged whether or not the conference is closed (step STC16). If NO, control returns to step STC1 and the above operations are repeated until the judgment result is YES, then the process is terminated.

The program started the chairman terminal among the attendants at the conference, or electronic conference terminal 900f, will be explained, referring to FIG. 87.

The electronic conference terminal 900f, receiving member's flags from the secretariat unit 970, displays the face of each attendant at the conference in the order of seats determined by the secretariat unit 970 and stored in the attendant data base 972 (step STD1).

The packet receiving section 911 judges whether or not the packet 972 has been received (step STD2). At step STD2, if YES, the secretariat unit 970 judges whether it is intended for global communication aiming at communication with all the attendants or local communication aiming at communication with part of the attendants (step STD3). In this case, judgment is made from whether or not all the addressees are written in the addressee area 952a in the packet 952.

If it is judged that global communication is intended, a similar process to that of members in FIG. 86 is performed. If the secretariat unit 970 has decided that local communication is intended, it is judged whether the addressee is the chairman or not (step STD4). At step STD4, if YES, local display is started (step STD5). If it is an application for the change of the rank distance between attendants, a decision is made on the application (step STD6). At step STD6, if the application is not accepted, it is ignored, whereas if it is accepted, the definitions of distance in the attendant data base 972 is changed (step STD7). At step STD4, if NO, only the addresser and addressee of the packet 952 or as well as the packet body (contents) is extracted (step STD8). Chairman display is started (step STD9) to allow attendants other than chairman to monitor the contents of local communication.

In transmitting packets, if the packet receiving section 911 judges that the result is YES at step STD10, similar processes as those of members in FIG. 86 are executed. In this case, only the chairman may be allowed to transmit packets, interrupting another attendant's transmission. If it is judged that the result is NO, it is judged whether or not the time managing information is received from the time managing section of the secretariat unit 970 (step STD11). If NO, control returns to step STD1, and the same process is repeated until the result is YES, time is displayed (step STD12). The secretariat 970 judges whether or not the conference is closed (step STD13). If NO, control returns to the starting point and the same operation is repeated until the result is YES, and then the process is terminated.

Examples of display screens at the attendant's terminals in the electronic conference will be explained one by one.

Figure 89:
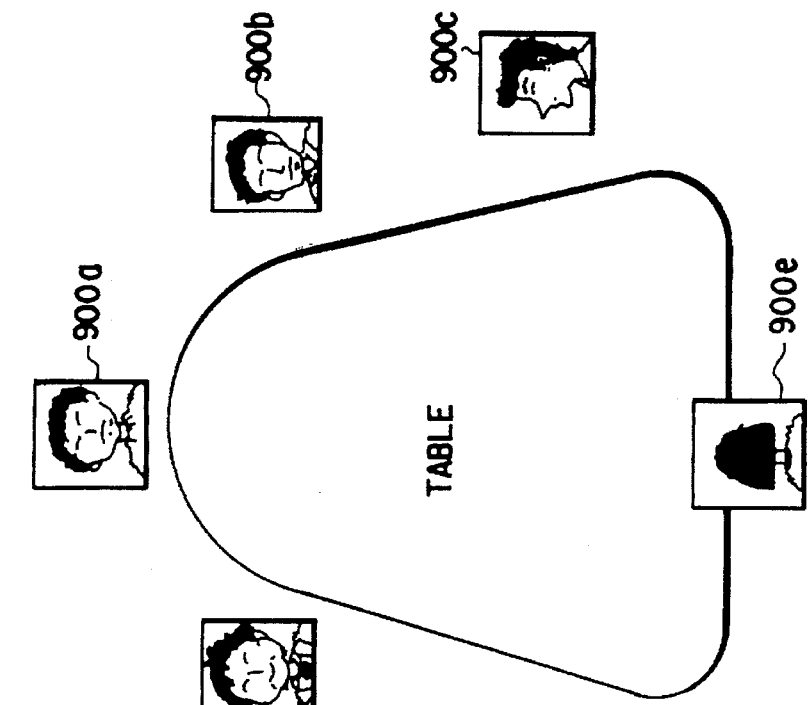
FIG. 89 illustrates an example of a screen display at an electronic conference terminal in the fifth embodiment.
Figure 88:
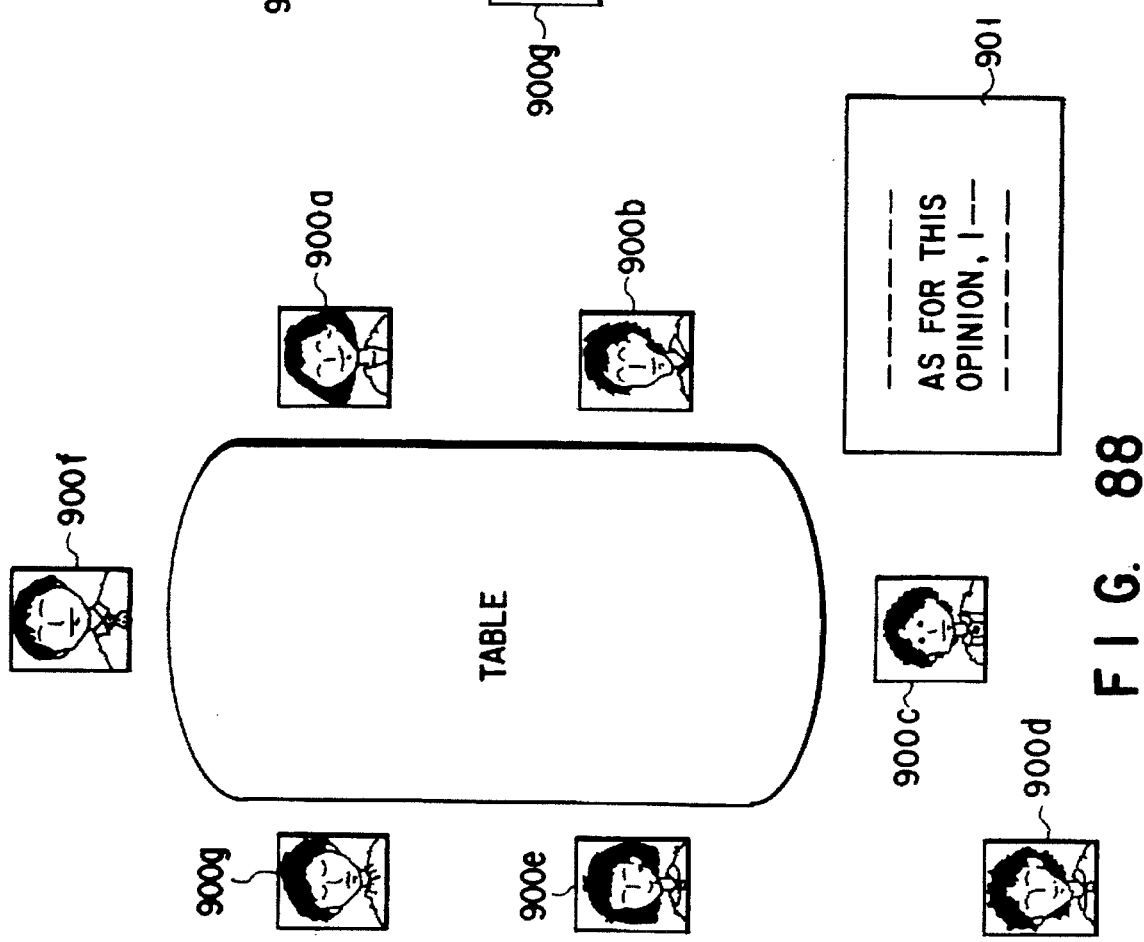
FIG. 88 illustrates an example of a screen display at an electronic conference terminal in the fifth embodiment.

FIG. 88 shows an example of screens when the conference is in progress. In this case, although the individual attendants at the conference are usually physically away from each other in different places, display is designed to create an atmosphere where it seems as if they were in conference, sitting around a table. In this example, use of a photograph of the face of each attendant allows each attendant to know who is in the conference. To create an atmosphere of speech, the contents of speech in the conference may be displayed in a different window 901, with the photograph of the speaker's face displayed reversely or the speaker's lips moving. The contents of speed may be displayed in a balloon near the speaker's face.

while FIG. 88 shows an example of a screen displaying the progress of the electronic conference centered around the chairman, it may be possible to see the progress of the electronic conference three-dimensionally, centered around a terminal user as shown in FIG. 89. FIG. 89 shows a state where the conference is viewed from electronic conference terminal 900e of a member. Display is designed to create an atmosphere where it seems as if they were actually in conference, sitting around a table.

For the individual attendants in the screen in FIG. 88, the order of their seats is determined based on the definitions of the distance between individual attendants. For example, for member's electronic conference terminal 900a, short distances from the chairman's electronic conference terminal 900f and from member's electronic conference terminal 900b are defined to enable local communication. On the other hand, for member's electronic conference 900a, long distances from member's electronic conference terminals 900e and 900g are defined to prevent local communication.

Definitions of the distance between attendants can be changed on application from individual attendants.

Figure 91:
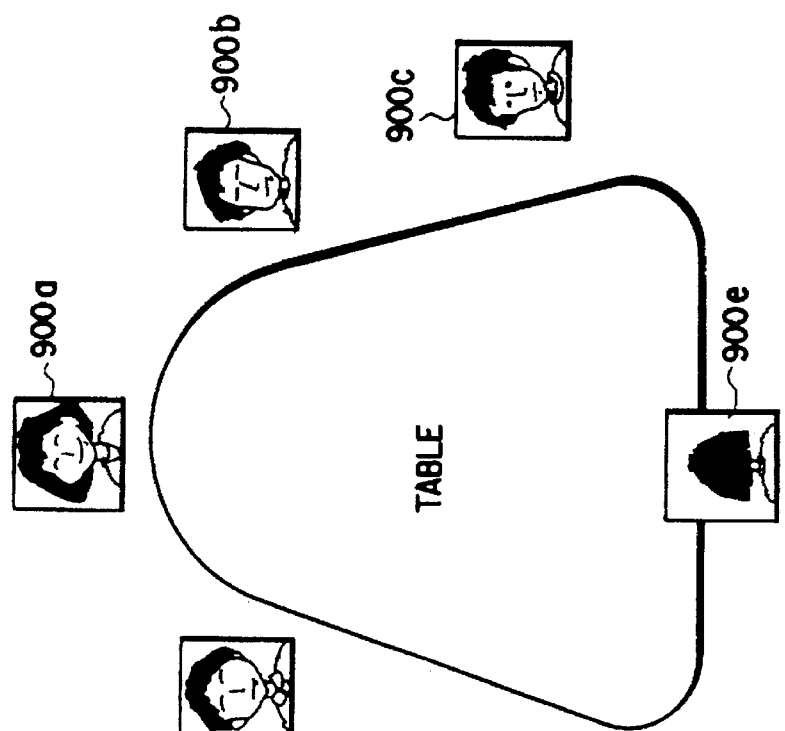
FIG. 91 illustrates an example of a screen display at an electronic conference terminal in the fifth embodiment.
Figure 90:
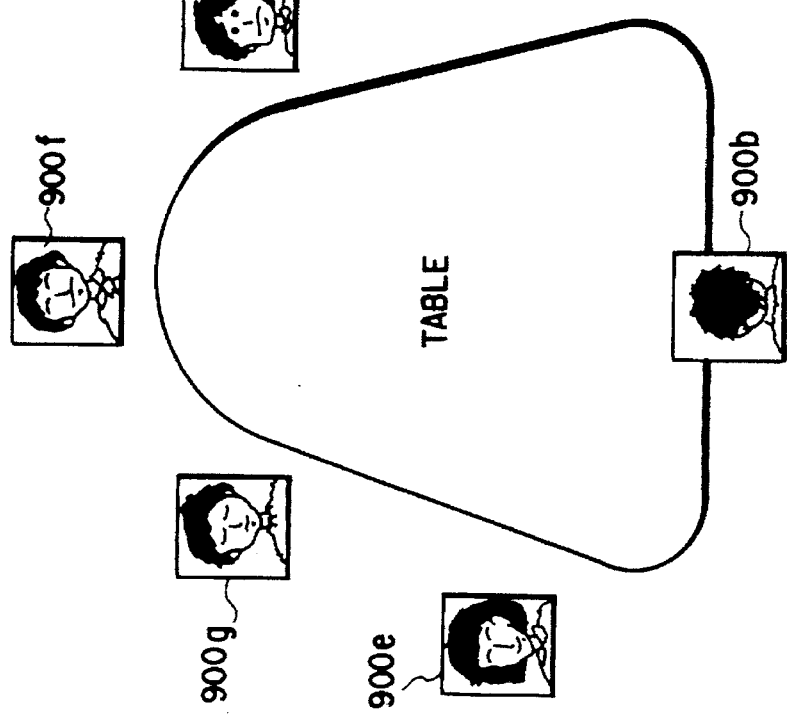
FIG. 90 illustrates an example of a screen display at an electronic conference terminal in the fifth embodiment.

FIG. 90 shows definitions of distance based on application from member's electronic conference terminal 900b. FIG. 91 shows definitions of distance based on application from member's electronic conference terminal 900e. It can be seen from both screens in FIGS. 90 and 91 that electronic conference terminal 900b defines a short distance from electronic conference terminal 900e, while electronic conference terminal 900e defines a long distance from electronic conference terminal 900b, which is a contradiction. In such a case, This may be reported to both electronic conference terminals 900b and 900e. Or, as long as the definitions at both terminals do not agree with each other, local communication may be prevented.

Figure 92:
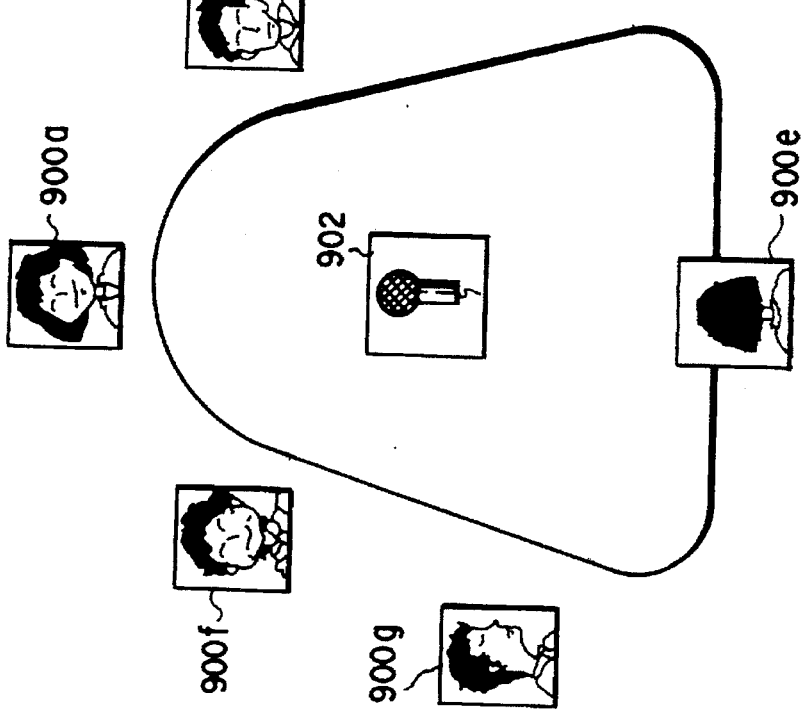
FIG. 92 illustrates an example of a screen display at an electronic conference terminal in the fifth embodiment.

FIG. 92 shows an example of screens for global communication and local communication. In this case, with the order of seats of electronic conference terminals 900a through 900g with a photograph of each attendant's face being displayed, these two types of communication are identified in such a manner that a screen for global communication has a microphone in the center and a screen for local communication has a microphone erased or displayed reversely. Display of a microphone 901 is used to switch between global communication and local communication and picking up the microphone portion enables one of them to be selected.

Figure 93:
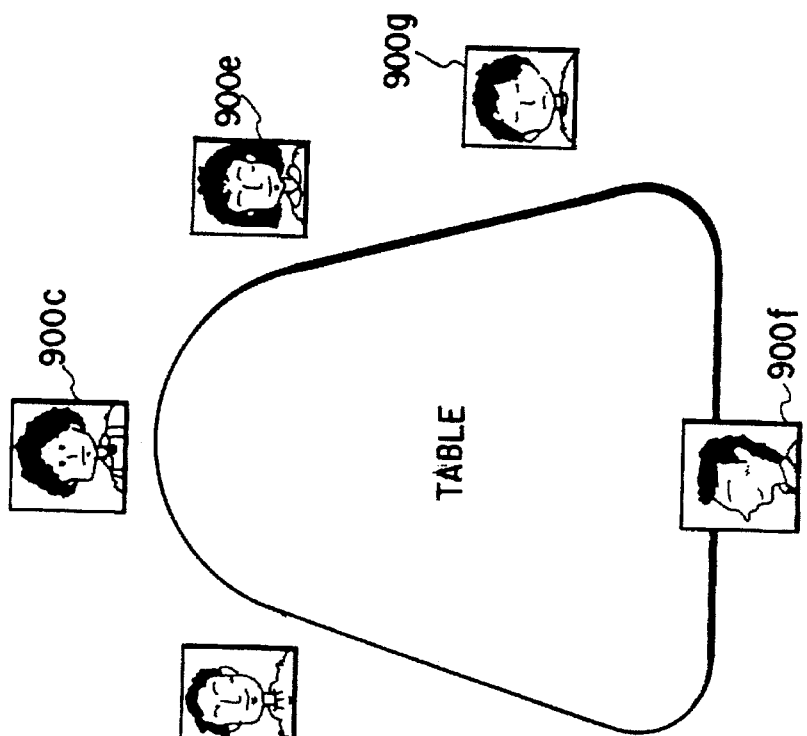
FIG. 93 illustrates an example of a screen display at an electronic conference terminal in the fifth embodiment.

In a screen for local communication, attendants in local communication with each other are displayed so that they face one another as shown in FIG. 93. In the figure, the chairman's electronic conference terminal 900f faces member's electronic conference terminal 900a.

Figure 94:
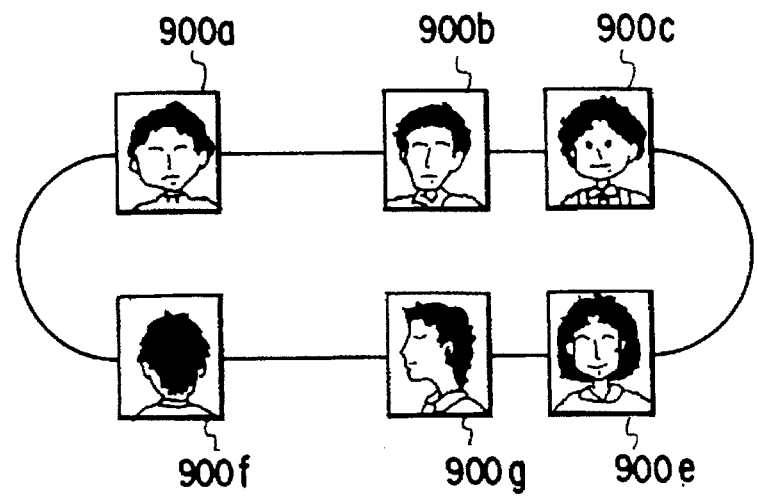
FIG. 94 illustrates an example of a screen display at an electronic conference terminal in the fifth embodiment.

FIG. 94 shows an example of screens viewed from another member's electronic conference terminal 900b when the chairman's electronic conference terminal 900f is communicating with member's electronic conference terminal 900a.

By doing this way, the theoretical distance between electronic conference terminals is obtained from the existing data in the attendant data base 972. Based on this, the order of seats of the users of electronic conference terminals 900a through 900g is determined. According to the order of seats, how the users of electronic conference terminals 900a through 900g are seated is displayed on the screen. Therefore, it is possible to create an atmosphere, using screen display, where it seems as if attendants were actually in conference, sitting around a table. For local communication between part of the electronic conference terminals, it is possible to determine whether or not local communication can be performed on the basis of the theoretical distance between electronic conference terminals related. Therefore, local communication is permitted only for electronic conference terminals close to each other, which allows the conference to progress under conditions close to reality. This frees the user from a sense of incongruity, making possible a smooth progress of the conference.

While in the fifth embodiment, global communication is distinguished from local communication on the basis of whether all the addressees are written in the addressee area 952a in the packet 952, a flag based on the distance between attendant may set in the packet 952 to distinguish global communication from local communication according the flag.

For secrecy of local communication, a flag indicating degree of secrecy may be set in the packet 952 to prevent even the chairman, for example, from referring to the contents of local communication.

Figure 95:
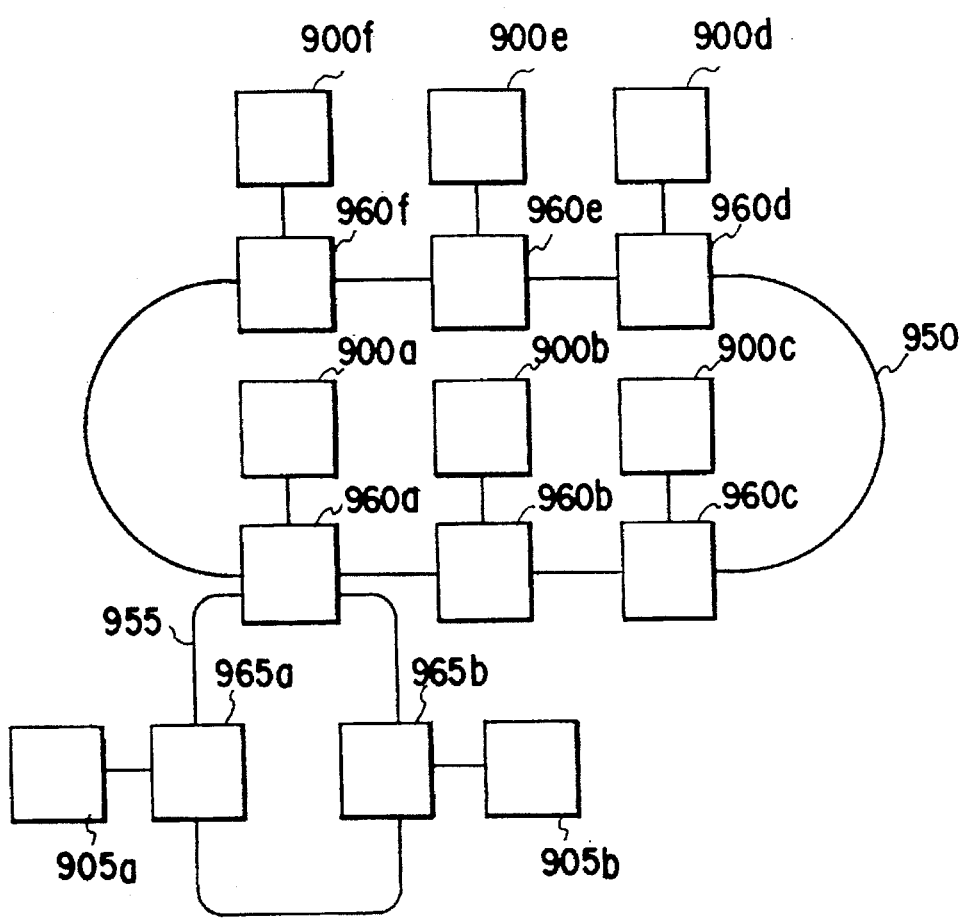
FIG. 95 is a schematic diagram of a modification of the fifth embodiment of the present invention.

While in the above embodiment, as shown in the example of FIG. 88, all the attendants can know the existence of the other attendants, the existence of attendants visible only to particular attendants may be defined. In this case, as shown in FIG. 95, electronic conference terminal 900a through 900g similar to those in FIG. 80 are connected to the transmission channel 950 via communication control node 960a through 960g. Another auxiliary transmission channel 955 is connected to the communication control nodes 960a. Electronic conference terminals 905a and 905b of witnesses are connected to the auxiliary transmission channel 955 via communication control nodes 965a and 965b to enable independent communication between the witnesses. The existence of electronic conference terminals 905a and 905b of the witnesses is unknown to the other electronic conference terminals 900b through 900g.

When member's electronic conference terminal 900a has a question during global communication over the transmission channel 950, he can solve it through local communication with witness' electronic conference terminals 905a and 905b via the auxiliary transmission channel 955. These witness electronic conference terminals 905a and 905b may be allowed to participate in the conference in the capacity of member or witness in global communication.

While local communication is achieved over the transmission channel over which global communication also is carried out, local communication may be achieved by means of telephones or electronic mails using a different transmission channel.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. In a human interface system constructed by connecting a plurality of computers via a network, at least one of said plurality of computers comprising:

a plurality of virtual sites, each virtual site including at least one object including people and instruments, each virtual site performing at least one of retaining and managing a plurality of pieces of data and a plurality of programs corresponding to characteristics of each object of said at least one object of said plurality of virtual sites;

access managing means for managing access rights of plural users to control access to each of the plurality of virtual sites, said access managing means including first and second communication channels, wherein said first communication channel is a communication channel between two of said plural users, and wherein said second communication channel is a communication channel between one of said plural users and said at least one object of one of said plurality of virtual sites, each of said first and second communication channels established by accessing said plurality of virtual sites via said plurality of pieces of data and said plurality of programs; and connecting means for connecting said at least two communication channels to each other, wherein said at least one of said plurality of computers includes a link information of sites existing on at least another one of said plurality of computers and is capable of establishing communication channels between each of said plurality of virtual sites of said at least one of said plurality of computers and said at least another one of said plurality of computers.

2. A human interface system according to claim 1, wherein each of said plurality of virtual sites comprises:

processing means comprising:

a model section for defining an internal state and operation of said each of said plurality of virtual sites;

a view section in which display information is stored; and a control section in which processing of an input from one of said plurality of users is written.

3. A human interface system according to claim 2, further comprising display means for displaying a state of an agent.

4. A human interface system according to claim 1, wherein each virtual site of said plurality of virtual sites contains an identifier that distinguishes said each virtual site from each other virtual site of said plurality of virtual sites.

5. A human interface system according to claim 4, further comprising retrieving means for retrieving said identifier for each of said plurality of virtual sites.

6. A human interface system according to claim 5, wherein said retrieving means comprises means for retrieving said identifier for a current site accessed by one of said plurality of users from said plurality of virtual sites.

7. A human interface system according to claim 5, wherein said retrieving means comprises means for retrieving said identifier of one of said plurality of sites under an instruction of one of said plurality of users.

8. A human interface system according to claim 5, wherein said retrieving means contains means for retrieving said identifier from said one of said plurality of virtual sites by using at least one of a telephone number and an address.

9. A human interface system according to claim 1, wherein said access managing means contains:

request analyzing means for recognizing the data entered by the user and analyzing its request; and response output means for creating a response to the analysis result of said request analyzing means and outputting the response; and is constructed as a site processing means for enabling a dialogue with said user.

10. A human interface system according to claim 9, wherein said access managing means further contains a knowledge retrieving means for storing knowledge information that said user has and retrieving said knowledge information on the basis of the analysis result at said request analyzing means.

11. A human interface system according to claim 1, wherein said access managing means comprises:

message creating means for creating a message by an addresser;

degree of urgency judging means for judging a degree of urgency concerning a message;

transmitting means for attaching said degree of urgency to said message and transmitting said message to a desired addressee;

state judging means for judging the state of said addressee;

degree of urgency arbitrating means for obtaining a degree of importance of said message based on the degree of urgency transmitted by said transmitting means and the state obtained by said state judging means;

media converting means for determining a method of processing said message based on the degree of importance obtained by said degree of urgency arbitrating means; and presenting means for presenting said message according to the method of processing said message determined by said media converting means.

12. A human interface system according to claim 1, wherein said access managing means includes:

information broadcasting means for collecting various types of information from said user at each of said sites, processing them, and distributing the results to said user at each of said sites;

information selecting means for selecting information distributed by said information broadcasting means;

presentation mode determining means for determining a presentation mode of the information selected at said information selecting means; and information presenting means for presenting said information according to the presentation mode determined by said presentation mode determining means.

13. A human interface system according to claim 1, wherein said access managing means includes:

input means for inputting a retrieving instruction to retrieve a desired program;

program retrieving means for retrieving a program directly usable from said computer in response to the retrieving instruction inputted from said input means;

message synthesizing means for converting said retrieving instruction into a transmission message expression to said network when program retrieving at said program retrieving means has failed;

network transmission/reception means for transmitting a transmission message created at said message synthesizing means to the network and receiving a reception message corresponding to said transmission message; and message analyzing means for relating said reception message from said network transmission/reception means, said transmission message, and said retrieving instruction with each other.

14. A human interface system according to claim 1, wherein said access managing means comprises:

means for determining a theoretical distance between individual users of said plurality of users when said plurality of users attend an electronic conference;

selecting means for selecting either global communication aiming at communication between all of said users attending the electronic conference or local communication aiming at communication between only part of said users attending the electronic conference; and means for determining the feasibility of local communication on the basis of the theoretical distance between the users available for local communication when local communication is selected at said selecting means.

* * * * *